US011939757B2

(12) United States Patent
Liao

(10) Patent No.: US 11,939,757 B2
(45) Date of Patent: Mar. 26, 2024

(54) DESCALING APPARATUS, SYSTEM, AND METHOD OF AN ELECTRONIC TOILET BIDET

(71) Applicant: Shanghai Kohler Electronics, Ltd., Shanghai (CN)

(72) Inventor: Desheng Liao, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 0 days.

(21) Appl. No.: 18/140,913

(22) Filed: Apr. 28, 2023

(65) Prior Publication Data

US 2023/0295910 A1 Sep. 21, 2023

Related U.S. Application Data

(63) Continuation of application No. 17/836,466, filed on Jun. 9, 2022, now Pat. No. 11,674,297, which is a (Continued)

(30) Foreign Application Priority Data

Dec. 29, 2018 (CN) ......................... 201811635251.1
Dec. 29, 2018 (CN) ......................... 201822246961.7
(Continued)

(51) Int. Cl.
*D06F 37/30* (2020.01)
*B08B 9/027* (2006.01)
(Continued)

(52) U.S. Cl.
CPC .............. *E03D 9/002* (2013.01); *B08B 9/027* (2013.01); *E03D 9/08* (2013.01)

(58) Field of Classification Search
CPC ...................................................... D06F 37/304
See application file for complete search history.

(56) References Cited

U.S. PATENT DOCUMENTS 7,111,330 B1 9/2006 Korf
10,450,733 B2 10/2019 Luettgen et al.

FOREIGN PATENT DOCUMENTS

CN 2257838 Y 7/1997
CN 2496942 Y 6/2002
(Continued)

OTHER PUBLICATIONS

Chinese Office Action for Chinese Application No. 201811635251.1 dated Aug. 4, 2020.
(Continued)

*Primary Examiner* — Jason Y Ko
(74) *Attorney, Agent, or Firm* — Lempia Summerfield Katz LLC

(57) ABSTRACT

The present disclosure provides a descaling apparatus of an electronic toilet bidet, the descaling apparatus comprising a descaling liquid storage tank, comprising a descaling agent chamber; a descaling agent storage box configured to house solid descaling agent and disposed in the descaling agent chamber; and a descaling apparatus connector disposed on the descaling liquid storage tank. The descaling apparatus connector comprising a first end in fluid communication with a descaling liquid inlet of the descaling agent chamber and a descaling liquid outlet of the descaling agent chamber and comprises a second end configured to be connected or disconnected to the electronic toilet bidet.

20 Claims, 48 Drawing Sheets

Related U.S. Application Data continuation of application No. 16/728,906, filed on Dec. 27, 2019, now Pat. No. 11,384,520.

(30) Foreign Application Priority Data

| | | |
|---|---|---|
| Dec. 29, 2018 | (CN) | 201822250001.8 |
| Jan. 16, 2019 | (CN) | 201910038873.4 |
| Jan. 31, 2019 | (CN) | 201910098793.8 |
| Jan. 31, 2019 | (CN) | 201910099614.2 |

(51) Int. Cl.
*E03D 9/00* (2006.01)
*E03D 9/08* (2006.01)

(56) References Cited

FOREIGN PATENT DOCUMENTS

| | | | |
|---|---|---|---|
| CN | 1373265 | A | 10/2002 |
| CN | 1563616 | A | 1/2005 |
| CN | 2777077 | Y | 5/2006 |
| CN | 2903212 | Y | 5/2007 |
| CN | 101233281 | A | 7/2008 |
| CN | 101886423 | A | 11/2010 |
| CN | 202099856 | U | 1/2012 |
| CN | 102535616 | A | 7/2012 |
| CN | 202936870 | U | 5/2013 |
| CN | 202954424 | U | 5/2013 |
| CN | 204645200 | U | 9/2015 |
| CN | 204645201 | U | 9/2015 |
| CN | 204728432 | U | 10/2015 |
| CN | 205839901 | U | 12/2016 |
| CN | 206496069 | U | 9/2017 |
| CN | 107419784 | A | 12/2017 |
| CN | 207331905 | U | 5/2018 |
| CN | 207553236 | U | 6/2018 |
| CN | 207727704 | U | 8/2018 |
| CN | 108603368 | A | 9/2018 |
| GB | 2287725 | A | 9/1995 |
| JP | 2009108507 | A | 5/2009 |
| JP | 2009257024 | A | 11/2009 |
| JP | 2011117264 | A | 6/2011 |
| JP | 2014051831 | A | 3/2014 |
| KR | 20170130154 | A | 11/2017 |

OTHER PUBLICATIONS

Chinese Office Action for Chinese Application No. 201811635251.1 dated Mar. 3, 2020.
Chinese Office Action for Chinese Application No. 201910038873.4 dated Feb. 3, 2020.
Chinese Office Action for Chinese Application No. 201910098793.8 dated Jan. 20, 2020.
Chinese Office Action for Chinese Application No. 201910099614.2 dated Mar. 2, 2020.
Chinese Office Action for Chinese Application No. 201910099614.2 dated Sep. 2, 2020.

40/48

DESCALING APPARATUS, SYSTEM, AND METHOD OF AN ELECTRONIC TOILET BIDET

CROSS REFERENCES TO RELATED APPLICATIONS

This application is a continuation of co-pending U.S. patent application Ser. No. 17/836,466, filed Jun. 9, 2022, which is hereby incorporated by reference in its entirety and is a continuation of co-pending U.S. patent application Ser. No. 16/728,906, filed Dec. 27, 2019, which is hereby incorporated by reference in its entirety, and which claims the benefit of priority to: Chinese Patent Application No. 201811635251.1 filed in the Chinese Intellectual Property Office on Dec. 29, 2018, which is hereby incorporated by reference in its entirety; Chinese Patent Application No. 201822250001.8 filed in the Chinese Intellectual Property Office on Dec. 29, 2018, which is hereby incorporated by reference in its entirety; Chinese Patent Application No. 201822246961.7 filed in the Chinese Intellectual Property Office on Dec. 29, 2018, which is hereby incorporated by reference in its entirety; Chinese Patent Application No. 201910038873.4 filed in the Chinese Intellectual Property Office on Jan. 16, 2019, which is hereby incorporated by reference in its entirety; Chinese Patent Application No. 201910099614.2 filed in the Chinese Intellectual Property Office on Jan. 31, 2019, which is hereby incorporated by reference in its entirety; Chinese Patent Application No. 201910098793.8 filed in the Chinese Intellectual Property Office on Jan. 31, 2019, which is hereby incorporated by reference in its entirety.

FIELD

The present disclosure relates to a technical field relating to bathroom equipment, and more particularly, to a descaling apparatus, system, and method of an electronic toilet bidet.

BACKGROUND

Limescales easily accumulate in internal pipes and rubber tubes of an electronic toilet bidet having been used for a long time, particularly in a region supplying hard water. This will impact the functioning properties of the electronic toilet bidet.

Descaling liquid is regularly and manually added to a passage and an opening of the electronic toilet bidet. Such a method cannot achieve a function of multiple automatic descaling by adding a descaling liquid at one time.

SUMMARY

There is a need to provide a descaling apparatus, system, and method of an electronic toilet bidet to solve the technical problem that the prior art cannot achieve a function of multiple automatic descaling by adding a descaling liquid at one time.

The present disclosure provides a descaling apparatus of an electronic toilet bidet, the descaling apparatus comprising: a descaling liquid storage tank comprising a descaling liquid chamber configured to house descaling liquid, wherein a pressure element is disposed and movable in the descaling liquid chamber, wherein the descaling liquid chamber comprises a descaling liquid outlet, wherein the descaling liquid storage tank further comprises a main body liquid outlet fixedly connected to and in communication with a bidet liquid inlet of the electronic toilet bidet, and wherein the main body liquid outlet is configured to be controlled by a controlling signal output by a controller of the electronic toilet bidet to connect or disconnect the descaling liquid outlet.

In one embodiment, the descaling liquid storage tank further comprises a divider dividing the descaling liquid storage tank into the descaling liquid chamber and a liquid discharging chamber, wherein the main body liquid outlet is disposed at the liquid discharging chamber, and wherein the pressure element is movable toward the divider in the descaling liquid chamber.

In one embodiment, the pressure element comprises a spring, a piston, and a spring lid, wherein the spring lid is configured to securely engage the descaling liquid storage tank, wherein the spring is connected to the spring lid at one end and to the piston at the other end, and wherein the piston is configured to be driven by the spring to move toward the divider.

In one embodiment, the pressure element further comprises a sealing ring winding around the piston.

In one embodiment, the descaling apparatus further comprises a descaling apparatus electromagnetic valve, wherein the descaling apparatus electromagnetic valve is connected to and in communication with the descaling liquid outlet and the main body liquid outlet, and wherein the descaling apparatus electromagnetic valve is configured to control a connection or a disconnection between the descaling liquid outlet and the main body liquid outlet according to the controlling signal output by the controller of the electronic toilet bidet.

In one embodiment, the descaling apparatus further comprises an isolation membrane disposed on the descaling apparatus electromagnetic valve.

In one embodiment, the descaling apparatus electromagnetic valve comprises a fixed iron core, a slidable iron core disposed below the fixed iron core, an electromagnetic valve spring disposed between the fixed iron core and the slidable iron core, a coil winding around the fixed iron core and the slidable iron core, and a valve body disposed below the slidable iron core, wherein the valve body comprises a valve liquid inlet and a valve liquid outlet, wherein the slidable iron core is configured to slide up and down to isolate or communicate the valve liquid inlet and the valve liquid outlet, and wherein the isolation membrane is disposed on the slidable iron core.

In one embodiment, the isolation membrane comprises an isolation flexible membrane housing a lower end of the slidable iron core and an isolation membrane upper block housing the slidable iron core to isolate the valve body and the coil.

In one embodiment, the descaling liquid storage tank further comprises a base, a shell disposed on the base and having an upward opening, and an outer lid configured to open or close the opening of the shell, wherein a self-locking element is disposed on the shell and configured to lock or unlock the outer lid, and wherein the main body liquid outlet is disposed on the shell.

The present disclosure provides a descaling system of an electronic toilet bidet, the descaling system comprising: the electronic toilet bidet and the foregoing descaling apparatus fixed on the electronic toilet bidet, wherein the electronic toilet bidet comprises a bidet main body, a bidet main body pipe housed in the bidet main body, and the controller disposed on the bidet main body, wherein one end of the bidet main body pipe is connected to and in communication with the bidet liquid inlet of the electronic toilet bidet, wherein the other end of the bidet main body pipe is connected to and in communication with a water output element, wherein the main body liquid outlet of the descaling apparatus is connected to and in communication with the bidet liquid inlet, and wherein the descaling apparatus electromagnetic valve is communicably coupled to the controller.

In one embodiment, the descaling system further comprises a three-way mixing valve comprising: a first liquid inlet passage connected to and in communication with the main body liquid outlet; a second liquid inlet passage connected to and in communication with an external water supply system; and a liquid output passage connected to and in communication with the bidet liquid inlet.

In one embodiment, the liquid output passage is connected to and in communication with the bidet liquid inlet via a check valve.

In one embodiment, a diameter of the second liquid inlet passage is larger than a diameter of the first liquid inlet passage.

In one embodiment, the descaling system further comprises a water inlet electromagnetic valve configured to control a connection or a disconnection between the second liquid inlet passage and the external water supply system, wherein the water inlet electromagnetic valve is communicably coupled to the controller.

In one embodiment, the descaling apparatus further comprises a descaling apparatus electromagnetic valve communicably coupled to the controller, wherein the descaling apparatus electromagnetic valve is connected to and in communication with the descaling liquid outlet and the main body liquid outlet, and wherein the descaling apparatus electromagnetic valve is configured to control a connection or a disconnection between the descaling liquid outlet and the main body liquid outlet according to the controlling signal output by the controller of the electronic toilet bidet.

The present disclosure provides a descaling method by using a descaling system of an electronic toilet bidet, the descaling system comprising: the electronic toilet bidet, wherein an external water supply system is configured to supply clean water to the electronic toilet bidet; and a descaling apparatus fixedly connected to the electronic toilet bidet and configured to supply descaling liquid to the electronic toilet bidet; and the method comprising: controlling the external water supply system to supply the clean water and controlling the descaling apparatus to supply the descaling liquid, wherein a mixture of the clean water supplied by the external water supply system and the descaling liquid supplied by the descaling apparatus is supplied to a bidet liquid inlet of the electronic toilet bidet; after a first predetermined time, controlling the external water supply system to stop supplying the clean water and controlling the descaling apparatus to stop supplying the descaling liquid; and after a second predetermined time, controlling the external water supply system to supply the clean water.

The descaling apparatus according to the present disclosure may, according to an instruction, supply the descaling liquid automatically and continuously to the internal pipes of the electronic toilet bidet for several times after the descaling liquid is added at one time. Thus, the descaling apparatus may avoid the lost function of the internal functional modules due to the clogging caused by the accumulation of limescales therein. The descaling apparatus may extend the service life of the modules and improve users' experience with the electronic toilet bidet.

There is a need to provide a descaling apparatus and system of an electronic toilet bidet to solve the technical problem that the prior art cannot achieve a function of multiple automatic descaling by adding a descaling liquid at one time.

The present disclosure provides a descaling apparatus of an electronic toilet bidet, the descaling apparatus comprising: a descaling liquid storage tank and a liquid suction pump, wherein the descaling liquid storage tank comprises a divider dividing the descaling liquid storage tank into a liquid discharging chamber disposed at a lower portion of the divider and a descaling liquid chamber disposed at an upper portion of the divider and configured to house descaling liquid, wherein the divider comprises a descaling liquid outlet, wherein the liquid discharging chamber comprises a main body liquid outlet, wherein a pump liquid inlet of the liquid suction pump is connected to and in communication with the descaling liquid outlet, and wherein a pump liquid outlet of the liquid suction pump is connected to and in communication with the main body liquid outlet.

In one embodiment, the descaling liquid storage tank further comprises a base, a shell disposed on the base and having an upward opening, and an outer lid configured to open or close the opening of the shell, wherein the divider is housed in the shell, wherein the main body liquid outlet is disposed on the shell, and wherein the liquid suction pump is housed in the liquid discharging chamber and fixed on the base.

In one embodiment, the descaling apparatus further comprises a pump fixing base having a U-shaped opening, wherein the pump fixing base is fixed on the base, and wherein the liquid suction pump is received by and fixed in the U-shaped opening of the pump fixing base.

In one embodiment, a self-locking element is disposed on the shell and configured to lock or unlock the outer lid.

In one embodiment, the descaling apparatus further comprises a descaling apparatus electromagnetic valve, wherein the pump liquid outlet of the liquid suction pump is connected to and in communication with the main body liquid outlet via the descaling apparatus electromagnetic valve.

In one embodiment, the descaling apparatus further comprises an internal input pipe and an internal output pipe, wherein the pump liquid inlet of the liquid suction pump is connected to and in communication with the descaling liquid outlet via the internal input pipe, and wherein the pump liquid outlet of the liquid suction pump is connected to and in communication with the main body liquid outlet via the internal output pipe.

The present disclosure provides a descaling system of an electronic toilet bidet, the descaling system comprising: the electronic toilet bidet and the foregoing descaling apparatus fixed on the electronic toilet bidet, wherein the electronic toilet bidet comprises a bidet main body, a bidet main body pipe housed in the bidet main body, and a controller disposed on the bidet main body, wherein one end of the bidet main body pipe is connected to and in communication with a bidet liquid inlet of the electronic toilet bidet, wherein the other end of the bidet main body pipe is connected to and in communication with a nozzle, wherein the main body liquid outlet of the descaling apparatus is connected to and in communication with the bidet liquid inlet, and wherein the liquid suction pump of the descaling apparatus is communicably coupled to the controller.

In one embodiment, wherein the descaling apparatus further comprises a descaling apparatus electromagnetic valve communicably coupled to the controller, and wherein the pump liquid outlet of the liquid suction pump is connected to and in communication with the main body liquid outlet via the descaling apparatus electromagnetic valve.

The descaling apparatus according to the present disclosure may, according to an instruction, supply the descaling liquid automatically and continuously to the internal pipes of the electronic toilet bidet for several times after the descaling liquid is added at one time. Thus, the descaling apparatus may solve the problem of the lost function of the internal modules due to the clogging caused by the accumulation of limescales therein. The descaling apparatus may extend the service life of the modules and improve users' experience with the electronic toilet bidet.

There is a need to provide a descaling apparatus and system of an electronic toilet bidet to solve the technical problems that the prior art cannot achieve a function of multiple automatic descaling by adding a descaling liquid at one time and cannot automatically detect whether the descaling liquid is adequate.

The present disclosure provides a descaling apparatus of an electronic toilet bidet, the descaling apparatus comprising: a descaling liquid storage tank comprising a descaling liquid chamber configured to house descaling liquid, wherein a pressure element is disposed and movable in the descaling liquid chamber, wherein the descaling liquid chamber comprises a descaling liquid outlet, wherein the descaling liquid storage tank further comprises a main body liquid outlet fixedly connected to and in communication with a bidet liquid inlet of the electronic toilet bidet, wherein the main body liquid outlet is configured to be connected or disconnected to the descaling liquid outlet, and wherein the descaling liquid storage tank further comprises a level sensor assembly configured to detect a liquid level of the descaling liquid housed in the descaling liquid chamber.

In one embodiment, the descaling liquid storage tank further comprises a divider dividing the descaling liquid storage tank into the descaling liquid chamber and a liquid discharging chamber, wherein the main body liquid outlet is disposed at the liquid discharging chamber, and wherein the pressure element is movable toward the divider in the descaling liquid chamber.

In one embodiment, the level sensor assembly comprises a movable sensing element disposed on the pressure element and a fixing sensing element disposed in the liquid discharging chamber.

In one embodiment, the movable sensing element is a magnet and fixing sensing element is a reed switch.

In one embodiment, the pressure element comprises a spring, a piston, and a spring lid, wherein the spring lid is configured to securely engage the descaling liquid storage tank, wherein the spring is connected to the spring lid at one end and to the piston at the other end, and wherein the piston is configured to be driven by the spring to move toward the divider.

In one embodiment, the movable sensing element is disposed on the piston.

The present disclosure provides a descaling system of an electronic toilet bidet, the descaling system comprising: the electronic toilet bidet and the foregoing descaling apparatus fixed on the electronic toilet bidet, wherein the electronic toilet bidet comprises a bidet main body, a bidet main body pipe housed in the bidet main body, and the controller disposed on the bidet main body, wherein one end of the bidet main body pipe is connected to and in communication with the bidet liquid inlet of the electronic toilet bidet, wherein the other end of the bidet main body pipe is connected to and in communication with a water output element, wherein the main body liquid outlet of the descaling apparatus is connected to and in communication with the bidet liquid inlet, wherein the main body liquid outlet is configured to be controlled by the controller to connect or disconnect the descaling liquid outlet, and wherein an output of the level sensor assembly is communicably coupled to an input of the controller.

In one embodiment, the descaling liquid storage tank further comprises a divider dividing the descaling liquid storage tank into the descaling liquid chamber and a liquid discharging chamber, wherein the main body liquid outlet is disposed at the liquid discharging chamber, wherein the pressure element is movable toward the divider in the descaling liquid chamber, wherein the level sensor assembly comprises a movable sensing element disposed on the pressure element and a fixing sensing element disposed in the liquid discharging chamber, and wherein an output of the fixing sensing element is communicably coupled to the input of the controller.

In one embodiment, the movable sensing element is a magnet and fixing sensing element is a reed switch, and wherein an output of the reed switch is communicably coupled to the input of the controller.

In one embodiment, the descaling apparatus further comprises an alerting element communicably coupled to the output of the level sensor assembly.

The descaling apparatus according to the present disclosure may, according to an instruction, supply the descaling liquid automatically and continuously to the internal pipes of the electronic toilet bidet for several times after the descaling liquid is added at one time. Thus, the descaling apparatus may avoid the lost function of the internal functional modules due to the clogging caused by the accumulation of limescales therein. The descaling apparatus may extend the service life of the modules and improve users' experience with the electronic toilet bidet. In addition, the level sensor assembly may detect the liquid level of the descaling liquid and alert users to replenish the descaling liquid timely.

There is a need to provide a descaling apparatus, system, and method of an electronic toilet bidet to solve the technical problem that the prior art cannot achieve a function of multiple automatic descaling by adding a descaling liquid at one time.

The present disclosure provides a descaling apparatus of an electronic toilet bidet, the descaling apparatus comprising: a descaling liquid storage tank; a descaling agent storage box configured to house solid descaling agent; a main body liquid outlet; and a main body liquid inlet, wherein the descaling liquid storage tank comprises a descaling agent chamber, wherein the descaling agent storage box is disposed in the descaling agent chamber, wherein an internal space of the descaling agent storage box is in communication with the descaling agent chamber, wherein the descaling agent chamber comprises a descaling liquid inlet and a descaling liquid outlet, wherein an input of the main body liquid outlet is connected to and in communication with the descaling liquid outlet, and an output of the main body liquid outlet is configured to be connected to and in communication with a bidet liquid inlet of the electronic toilet bidet, wherein an input of the main body liquid inlet is configured to be connected to and in communication with an external water supply system, and an output of the main body liquid inlet is configured to be controlled by a controlling signal output by a controller of the electronic toilet bidet to connect or disconnect the descaling liquid inlet. In one embodiment, the descaling liquid storage tank further comprises a divider, wherein the descaling liquid outlet and the descaling liquid inlet are disposed on the divider, wherein the divider divides the descaling liquid storage tank into the descaling agent chamber and a liquid discharging chamber, and wherein the main body liquid inlet is disposed in the liquid discharging chamber.

In one embodiment, the descaling apparatus further comprises a stream guiding groove disposed on the divider, wherein the descaling agent storage box is disposed in the stream guiding groove, and wherein the descaling liquid outlet is disposed outside the stream guiding groove and the descaling liquid inlet is disposed outside the stream guiding groove.

In one embodiment, a first gap is disposed between the stream guiding groove and a wall of the descaling agent storage box and in communication with the internal space of the descaling agent storage box, wherein a portion of a bottom of the descaling agent storage box contacts the stream guiding groove and a second gap, wherein the second gap is disposed between another portion of the bottom of the descaling agent storage box and the divider and in communication with the internal space of the descaling agent storage box, and wherein the descaling liquid outlet is in communication with the first gap and the descaling liquid inlet is in communication with the second gap, or the descaling liquid outlet is in communication with the second gap and the descaling liquid inlet is in communication with the first gap.

In one embodiment, the descaling apparatus further comprises a switching valve of the solid descaling agent, the switching valve comprising: a switching valve water inlet connected to and in communication with the output of the main body liquid inlet; a main water input passage connected to and in communication with the input of the main body liquid outlet; a secondary water input passage connected to and in communication with the descaling liquid inlet; and an electromagnetic on-off valve configured to control a connection or disconnection between the switching valve water inlet and the secondary water input passage according to the controlling signal output by the controller of the electronic toilet bidet, wherein the main water input passage is connected to and in communication with the switching valve water inlet.

In one embodiment, a diameter of the main water input passage is larger than a diameter of the secondary water input passage.

In one embodiment, the descaling apparatus further comprises a three-way mixing valve comprising: a first liquid inlet passage connected to and in communication with the descaling liquid outlet; a second liquid inlet passage connected to and in communication with the main water input passage; and a liquid output passage connected to and in communication with the input of the main body liquid outlet.

In one embodiment, a diameter of the second liquid inlet passage is larger than a diameter of the first liquid inlet passage.

In one embodiment, the descaling liquid outlet is connected to and in communication with the first liquid inlet passage via a check valve.

In one embodiment, the descaling agent storage box comprises a box frame; a box screen mesh; and a box upper lid, wherein the box frame comprises multiple through holes, wherein the box screen mesh is disposed in the box frame, and wherein the box upper lid is disposed on the box frame and configured to open and close the descaling agent storage box.

In one embodiment, a box sealing ring is disposed between the upper lid and the descaling liquid storage tank.

In one embodiment, the descaling liquid storage tank further comprises a base; a shell disposed on the base and having an upward opening; and an outer lid configured to open or close the opening of the shell, wherein a main body connector is disposed on the shell and the main body liquid outlet passes through and extends from an inner space of the main body connector.

In one embodiment, the main body liquid inlet passes through and extends from an inner space of the main body connector.

In one embodiment, the descaling liquid storage tank further comprises a self-locking element disposed on the shell and configured to lock or unlock the outer lid.

The present disclosure provides a descaling system of an electronic toilet bidet, the descaling system comprising: the electronic toilet bidet and the foregoing descaling apparatus fixed on the electronic toilet bidet, the electronic toilet bidet comprising: a bidet main body; a bidet main body pipe housed in the bidet main body; and the controller disposed on the bidet main body, wherein one end of the bidet main body pipe is connected to and in communication with the bidet liquid inlet of the electronic toilet bidet, and the other end of the bidet main body pipe is connected to and in communication with a water output element, wherein the output of the main body liquid outlet is connected to and in communication with the bidet liquid inlet of the electronic toilet bidet, wherein the input of the main body liquid inlet is connected to and in communication with an external water supply system, wherein the output of the main body liquid inlet is controlled by the controlling signal output by the controller of the electronic toilet bidet to connect or disconnect a descaling liquid inlet. In one embodiment, the descaling apparatus further comprises a switching valve of the solid descaling agent, the switching valve comprising: a switching valve water inlet connected to and in communication with the output of the main body liquid inlet; a main water input passage connected to and in communication with the input of the main body liquid outlet; a secondary water input passage connected to and in communication with the descaling liquid inlet; and an electromagnetic on-off valve configured to control a connection or disconnection between the switching valve water inlet and the secondary water input passage according to the controlling signal output by the controller of the electronic toilet bidet, wherein the main water input passage is connected to and in communication with the switching valve water inlet.

In one embodiment, the descaling liquid storage tank further comprises a base; a shell disposed on the base and having an upward opening; and an outer lid configured to open or close the opening of the shell, wherein a main body connector is disposed on the shell, wherein the electronic toilet bidet comprises a fixing base connected to the main body connector, and wherein the main body liquid outlet passes through and extends from an inner space of the main body connector and is connected to the bidet liquid inlet via the fixing base.

In one embodiment, the bidet liquid inlet of the electronic toilet bidet is configured to be connected to the external water supply system, and wherein the main body liquid inlet passes through and extends from the inner space of the main body connector and is connected to the bidet liquid inlet via the fixing base.

In one embodiment, the descaling system further comprises a water inlet electromagnetic valve configured to control a connection or disconnection between the bidet liquid inlet of the electronic toilet bidet and the external water supply system, wherein the water inlet electromagnetic valve is communicably coupled to the controller.

The present disclosure provides a descaling method by using the foregoing descaling system of the electronic toilet bidet, the method comprising: in response to a descaling request, controlling the external water supply system to supply water to the input of the main body liquid inlet and controlling the output of the main body liquid inlet to be connected to and in communication with the descaling liquid inlet, wherein the water from the descaling liquid inlet dissolves the solid descaling agent in the descaling agent storage box to form descaling solution; and supplying a mixture of the water supplied by the main body liquid inlet and the descaling solution supplied by the descaling liquid outlet to the bidet liquid inlet of the electronic toilet bidet.

In one embodiment, the descaling method further comprises: in response to a flushing request, controlling the external water supply system to supply the water to the input of the main body liquid inlet and controlling the output of the main body liquid inlet to be disconnected to the descaling liquid inlet, wherein, the water supplied by the main body liquid inlet is supplied to the bidet liquid inlet of the electronic toilet bidet.

The descaling apparatus according to the present disclosure may, according to an instruction, supply the descaling solution to the internal pipes of the electronic toilet bidet for several times after the solid descaling agent is added at one time and also automatically and continuously dissolved by the clean water. Thus, the descaling apparatus may avoid the lost function of the internal functional modules due to the clogging caused by the accumulation of limescales therein. The descaling apparatus may extend the service life of the modules and improve users' experience with the electronic toilet bidet.

There is a need to provide a descaling apparatus, system, and method of an electronic toilet bidet to solve the technical problem that the prior art cannot achieve a function of multiple automatic descaling by adding a descaling liquid at one time.

The present disclosure provides a descaling apparatus of an electronic toilet bidet, the descaling apparatus comprising: a descaling liquid storage tank; a descaling agent storage box configured to house solid descaling agent; and a descaling apparatus connector fixed on the descaling liquid storage tank, wherein the descaling liquid storage tank comprises a descaling agent chamber, wherein the descaling agent storage box is disposed in the descaling agent chamber and an internal space of the descaling agent storage box is in communication with the descaling agent chamber, wherein the descaling agent chamber comprises a descaling liquid inlet and a descaling liquid outlet, wherein a first end of the descaling apparatus connector is connected to and in communication with the descaling liquid outlet and the descaling liquid inlet, wherein a second end of the descaling apparatus connector is configured to be connected or disconnected to an electronic toilet bidet, and wherein an air exhaust assembly is disposed on the descaling agent storage box and configured to release air in the descaling liquid storage tank.

In one embodiment, the descaling agent storage box comprises an air exhaust hole, wherein the air exhaust assembly comprises: an air exhaust plate disposed in the descaling agent storage box; an air exhaust rod comprising a first end of the air exhaust rod connected to the air exhaust plate and a second end of the air exhaust rod extending from the descaling agent storage box through the air exhaust hole; and an air exhaust spring comprising a first end of the air exhaust spring connected to the second end of the air exhaust rod and a second end of the air exhaust spring securely engaging the descaling agent storage box, wherein a diameter of the air exhaust hole is larger than a diameter of the air exhaust rod, and wherein the air exhaust plate is configured to cover the air exhaust hole.

In one embodiment, the air exhaust assembly further comprises an air exhaust sealing ring disposed between an inner surface of the descaling agent storage box and the air exhaust plate.

In one embodiment, the descaling agent storage box comprises: a box frame, comprising a plurality of through holes; a box screen mesh disposed in the box frame; and a box upper lid disposed on the box frame and configured to open and close the descaling agent storage box, and wherein the air exhaust assembly is disposed on the box upper lid.

In one embodiment, the box upper lid comprises an air exhaust chamber configured to house the air exhaust assembly, and wherein the air exhaust hole is disposed at a bottom of the air exhaust chamber.

In one embodiment, the descaling liquid storage tank further comprises: a base; a shell disposed on the base and having an upward opening; and an outer lid configured to open or close the opening of the shell, and wherein the descaling apparatus connector is disposed on the shell.

In one embodiment, the shell is transparent or translucent.

In one embodiment, the descaling apparatus further comprises a level sensor assembly disposed in the descaling agent storage box.

The present disclosure provides a descaling system of an electronic toilet bidet, the descaling system comprising: the electronic toilet bidet and the foregoing descaling apparatus, the electronic toilet bidet comprising a bidet main body and a bidet main body pipe housed in the bidet main body, wherein the bidet main body comprises a bidet connector configured to be connected or disconnected to the descaling apparatus connector, wherein the bidet connector comprises a first end connected to and in communication with an external water supply system and a second end connected to and in communication with a first end of the bidet main body pipe, and wherein a second end of the bidet main body pipe is connected to and in communication with a water output element.

In one embodiment, the electronic toilet bidet further comprises a controller, and wherein the descaling agent storage box comprises a level sensor assembly communicably coupled to the controller.

The present disclosure provides a descaling method by using the foregoing descaling system of the electronic toilet bidet, the method comprising: predetermining parameters for a pre-processing procedure after the descaling apparatus connector is connected to the bidet connector; and in response to a descaling request, performing the pre-processing procedure according to the predetermined parameters and when the pre-processing procedure is completed, resetting the parameters for the pre-processing procedure and performing a flushing procedure for at least one time until an exit condition is triggered, wherein the pre-processing procedure comprises: controlling the external water supply system to supply the clean water to the bidet connector main passage of the bidet connector for a predetermined pre-processing time; controlling the external water supply system to stop supplying the clean water to the bidet connector main passage of the bidet connector for a predetermined suspension time after the predetermined pre-processing time lapses; and resetting the parameters for the pre-processing procedure and performing the flushing procedure after the air exhaust assembly releases the air in the descaling liquid storage tank 1 to outside of the descaling liquid storage tank, and wherein the flushing procedure comprises: controlling the external water supply system to supply the clean water to the bidet connector main passage of the bidet connector.

In one embodiment, the electronic toilet bidet further comprises a controller, wherein the descaling agent storage box comprises a level sensor assembly communicably coupled to the controller, wherein after the air exhaust assembly releases the air to the outside of the descaling liquid storage tank, the controller resets the parameters for the pre-processing procedure and performs the flushing procedure, and wherein when the controller receives, from the level sensor assembly, the liquid level information indicating that a liquid level reaches a predetermined level, the controller resets the parameters for the pre-processing procedure and performs the flushing procedure.

The descaling apparatus according to the present disclosure may, according to an instruction, supply the descaling solution to the internal pipes of the electronic toilet bidet for several times after the solid descaling agent is added at one time and also automatically and continuously dissolved by the clean water. Thus, the descaling apparatus may avoid the lost function of the internal functional modules due to the clogging caused by the accumulation of limescales therein. The descaling apparatus may extend the service life of the modules and improve users' experience with the electronic toilet bidet. In addition, an air exhaust assembly is added to release air in the descaling liquid storage tank so as to improve the dissolution rate of the solid descaling agent.

There is a need to provide a descaling apparatus, system, and method of an electronic toilet bidet to solve the technical problem that the prior art cannot achieve a function of multiple automatic descaling by adding a descaling liquid at one time.

The present disclosure provides a descaling apparatus of an electronic toilet bidet, the descaling apparatus comprising: a descaling liquid storage tank; a descaling agent storage box configured to house solid descaling agent; and a descaling apparatus connector fixed on the descaling liquid storage tank, wherein the descaling liquid storage tank comprises a descaling agent chamber, wherein the descaling agent storage box is disposed in the descaling agent chamber and an internal space of the descaling agent storage box is in communication with the descaling agent chamber, wherein the descaling agent chamber comprises a descaling liquid inlet and a descaling liquid outlet, wherein the descaling apparatus connector comprises a first end configured to be connected or disconnected to an electronic toilet bidet, and wherein the descaling apparatus connector comprises a descaling apparatus connector output connected to and in communication with the descaling liquid outlet and a descaling apparatus connector input connected to and in communication with the descaling liquid inlet.

In one embodiment, the first end of the descaling apparatus connector comprises a first end of the descaling apparatus connector output configured to be connected or disconnected to the electronic toilet bidet and a first end of the descaling apparatus connector input configured to be connected or disconnected to the electronic toilet bidet, and wherein at least one connector sealing ring is disposed on the first end of the descaling apparatus connector output or the first end of the descaling apparatus connector input.

In one embodiment, a descaling apparatus connector locker is disposed on the first end of the descaling apparatus connector.

In one embodiment, the first end of the descaling apparatus connector comprises a first end of the descaling apparatus connector output configured to be connected or disconnected to the electronic toilet bidet and a first end of the descaling apparatus connector input configured to be connected or disconnected to the electronic toilet bidet, wherein at least one connector output protruding portion is disposed on the first end of the descaling apparatus connector output, wherein the connector output protruding portion comprises a connector output groove connected to and in communication with the descaling apparatus connector output, wherein at least one connector input protruding portion is disposed on the first end of the descaling apparatus connector input, and wherein the connector input protruding portion comprises a connector input groove connected to and in communication with the descaling apparatus connector input.

In one embodiment, a level sensor assembly is disposed on the descaling apparatus connector and is communicably coupled to a controller of the electronic toilet bidet.

In one embodiment, the descaling liquid storage tank further comprises a divider, the descaling liquid outlet and the descaling liquid inlet are disposed on the divider, and the divider divides the descaling liquid storage tank into the descaling agent chamber and a liquid discharging chamber.

In one embodiment, a stream guiding groove is disposed on the divider, and wherein the descaling liquid outlet is disposed inside the stream guiding groove and the descaling liquid inlet is disposed outside the stream guiding groove, or the descaling liquid outlet is disposed outside the stream guiding groove and the descaling liquid inlet is disposed inside the stream guiding groove.

In one embodiment, the descaling agent storage box is disposed in the stream guiding groove; wherein a first gap is disposed between the stream guiding groove and a wall of the descaling agent storage box and in communication with the internal space of the descaling agent storage box, wherein a second gap is disposed between a bottom of the descaling agent storage box and the divider and in communication with the internal space of the descaling agent storage box, and wherein the descaling liquid outlet is in communication with the first gap and the descaling liquid inlet is in communication with the second gap, or the descaling liquid outlet is in communication with the second gap and the descaling liquid inlet is in communication with the first gap.

In one embodiment, a bottom of the descaling agent storage box contacts a top of the stream guiding groove.

In one embodiment, at least one stream guiding hole is disposed on the top of the stream guiding groove.

In one embodiment, the descaling agent storage box comprises: a box frame, comprising a plurality of through holes; a box screen mesh disposed in the box frame; and a box upper lid disposed on the box frame and configured to open and close the descaling agent storage box.

In one embodiment, the descaling liquid storage tank further comprises: a base; a shell disposed on the base and having an upward opening; and an outer lid configured to open or close the opening of the shell, and wherein the descaling apparatus connector is disposed on the shell.

In one embodiment, the shell is transparent or translucent.

In one embodiment, the descaling apparatus further comprises a check valve, wherein the descaling liquid outlet is connected to and in communication with the descaling apparatus connector output via the check valve.

The present disclosure provides a descaling system of an electronic toilet bidet, the descaling system comprising: the electronic toilet bidet and the foregoing descaling apparatus, the electronic toilet bidet comprising a bidet main body and a bidet main body pipe housed in the bidet main body, wherein the bidet main body comprises a bidet connector configured to be connected or disconnected to the descaling apparatus connector, wherein the bidet connector comprises: a connector main passage comprising a first end connected to and in communication with an external water supply system and a second end connected to and in communication with a first end of the bidet main body pipe, a bidet connector output passage; and a bidet connector input passage, wherein a second end of the bidet main body pipe is connected to and in communication with a water output element, wherein when the descaling apparatus connector input is connected to the bidet connector output passage and the descaling apparatus connector output is connected to the bidet connector input passage, the bidet connector main passage is connected to and in communication with the bidet connector output passage and the bidet connector input passage, and wherein when the descaling apparatus connector input is disconnected to the bidet connector output passage and the descaling apparatus connector output is disconnected to the bidet connector input passage, the bidet connector main passage is disconnected to the bidet connector output passage or the bidet connector input passage.

In one embodiment, the bidet connector output passage comprises a first check valve configured to open or close the bidet connector main passage, wherein the bidet connector input passage comprises a second check valve configured to open or close the bidet connector main passage, wherein when the descaling apparatus connector input is connected to the bidet connector output passage, the first check valve is opened, wherein when the descaling apparatus connector output is connected to the bidet connector input passage, the second check valve is opened, wherein when the descaling apparatus connector input is disconnected to the bidet connector output passage, the first check valve is closed, and wherein when the descaling apparatus connector output is disconnected to the bidet connector input passage, the second check valve is closed.

In one embodiment, the first check valve comprises: a first check valve guiding pipe; a first check valve core configured to move inwards and outwards in the first check valve guiding pipe; a first check valve spring comprising a first end fixedly connected to the first check valve guiding pipe and a second end securely engaging the first check valve core; and a first check valve sealing ring disposed on a first end of the first check valve core, wherein an output gap is disposed between the first end of the first check valve core and an inner wall of the bidet connector output passage and in communication with an internal space of the bidet connector main passage, wherein a preload of the first check valve spring is configured to push the first check valve sealing ring to engage an end of the inner wall of the bidet connector output passage so as to block the output gap, wherein the second check valve comprises: a second check valve guiding pipe; a second check valve core configured to move inwards and outwards in the second check valve guiding pipe; a second check valve spring comprising a first end fixedly connected to the second check valve guiding pipe and a second end securely engaging the second check valve core; and a second check valve sealing ring disposed on a first end of the second check valve core, wherein an input gap is disposed between the first end of the second check valve core and an inner wall of the bidet connector inlet passage and in communication with the internal space of the bidet connector main passage, and wherein a preload of the second check valve spring is configured to push the second check valve sealing ring to engage an end of the inner wall of the bidet connector input passage so as to block the input gap.

In one embodiment, the end of the inner wall of the bidet connector output passage is conical and the end of the inner wall of the bidet connector input passage is conical.

In one embodiment, a diameter of a main passage inlet of the bidet connector main passage is larger than a diameter of the descaling apparatus connector input.

In one embodiment, a descaling apparatus connector locker is disposed on the first end of the descaling apparatus connector, and wherein a bidet connector locker is disposed in the bidet connector matched with the descaling apparatus connector locker.

In one embodiment, the descaling system further comprises a water inlet electromagnetic valve configured to control a connection or disconnection between the bidet connector main passage and the external water supply system.

In one embodiment, the bidet main body comprises a bidet chamber configured to house the bidet connector, and wherein a bidet connector cover is disposed outside the bidet chamber and configured to open or close the bidet chamber.

In one embodiment, the electronic toilet bidet further comprises a controller, and wherein the descaling apparatus connector comprises a level sensor assembly communicably coupled to the controller.

The present disclosure provides a descaling method by using the foregoing descaling system of the electronic toilet bidet, the method comprising: predetermining parameters for a pre-processing procedure after the descaling apparatus connector is connected to the bidet connector; and in response to a descaling request, performing the pre-processing procedure according to the predetermined parameters and when the pre-processing procedure is completed, resetting the parameters for the pre-processing procedure and performing a flushing procedure for at least one time until an exit condition is triggered, wherein the pre-processing procedure comprises: controlling the external water supply system to supply the clean water to the bidet connector main passage of the bidet connector for a predetermined pre-processing time; controlling the external water supply system to stop supplying the clean water to the bidet connector main passage of the bidet connector for a predetermined suspension time after the predetermined pre-processing time lapses; and resetting the parameters for the pre-processing procedure and performing the flushing procedure after the predetermined suspension time lapses, and wherein the flushing procedure comprises: controlling the external water supply system to supply the clean water to the bidet connector main passage of the bidet connector.

In one embodiment, a level sensor assembly is disposed on the descaling apparatus connector and is communicably coupled to a controller of the electronic toilet bidet, and wherein the predetermined parameters for the pre-processing procedure is reset after the descaling apparatus connector is connected to the bidet connector and the controller receives, from the level sensor assembly, information indicating that a liquid level reaches a predetermined level.

The descaling apparatus according to the present disclosure may, according to an instruction, supply the descaling solution to the internal pipes of the electronic toilet bidet for several times after the solid descaling agent is added at one time and also automatically and continuously dissolved by the clean water. Thus, the descaling apparatus may avoid the lost function of the internal functional modules due to the clogging caused by the accumulation of limescales therein. The descaling apparatus may extend the service life of the modules and improve users' experience with the electronic toilet bidet.

DETAILED DESCRIPTION

Example 1

Figure 1:
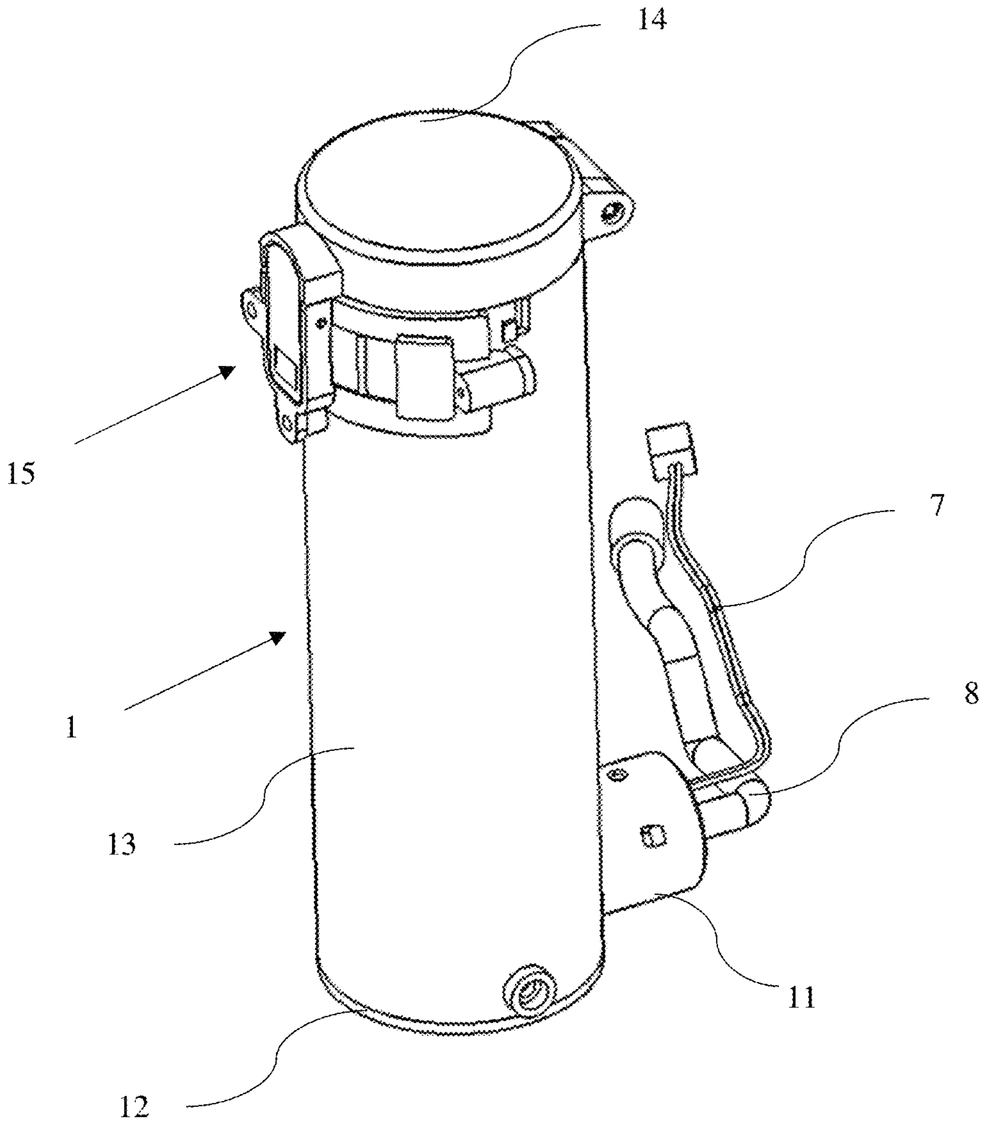
FIG. 1 illustrates a structure of a descaling apparatus of an electronic toilet bidet according to one embodiment of the present disclosure.
Figure 2:
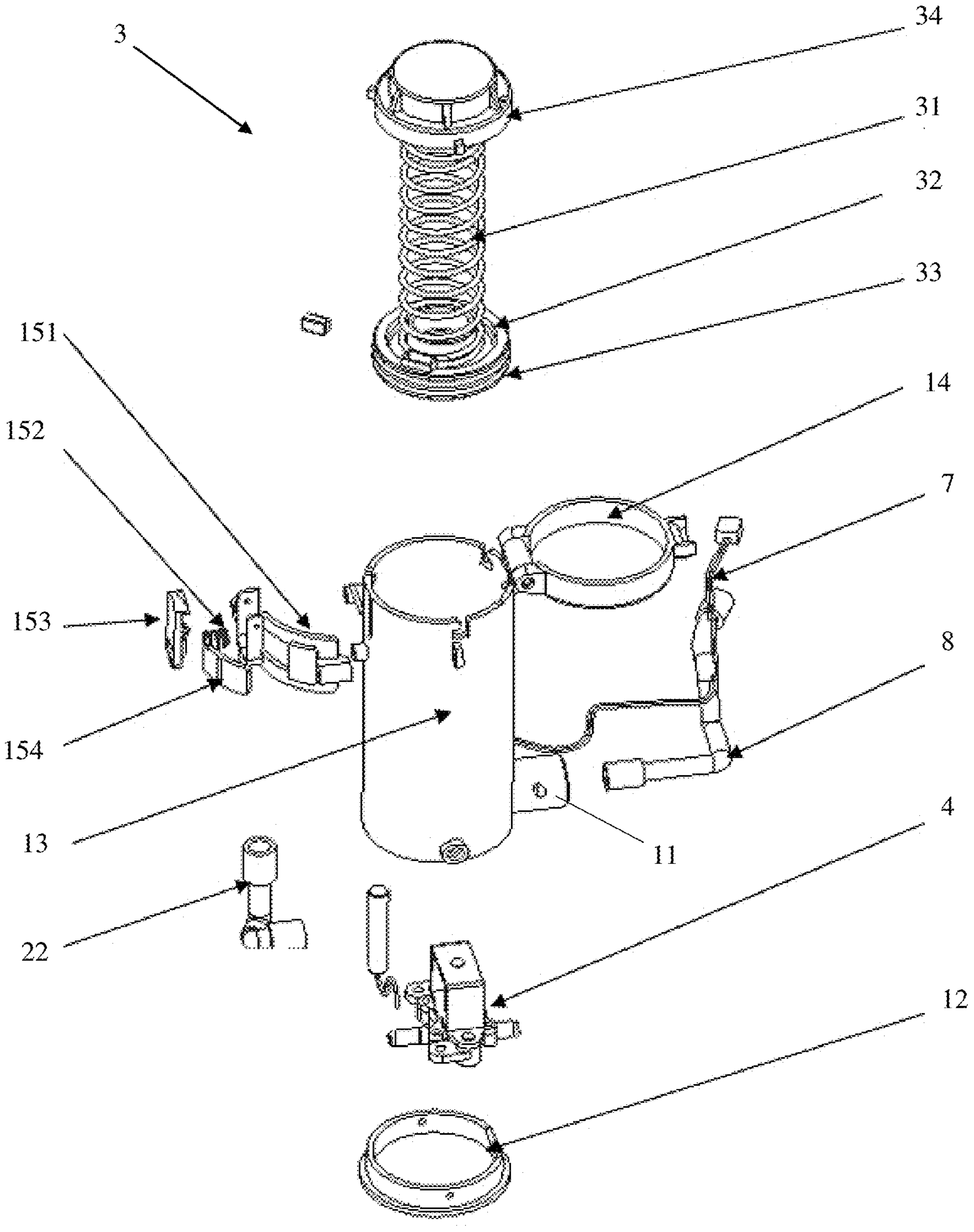
FIG. 2 illustrates, in an exploded view, a structure of the descaling apparatus of the electronic toilet bidet according to one embodiment of the present disclosure.
Figure 3:
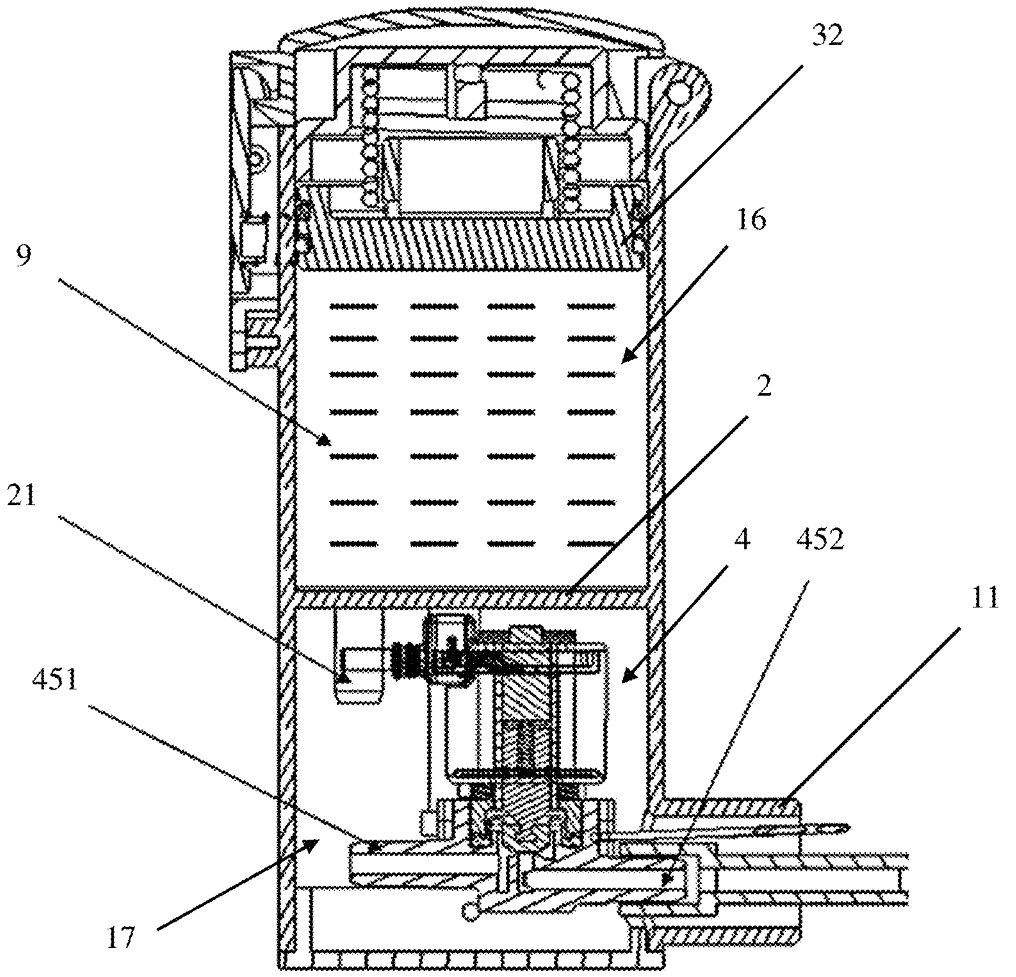
FIG. 3 illustrates a state when a descaling liquid storage tank is fully filled with descaling liquid according to one embodiment of the present disclosure.
Figure 4:
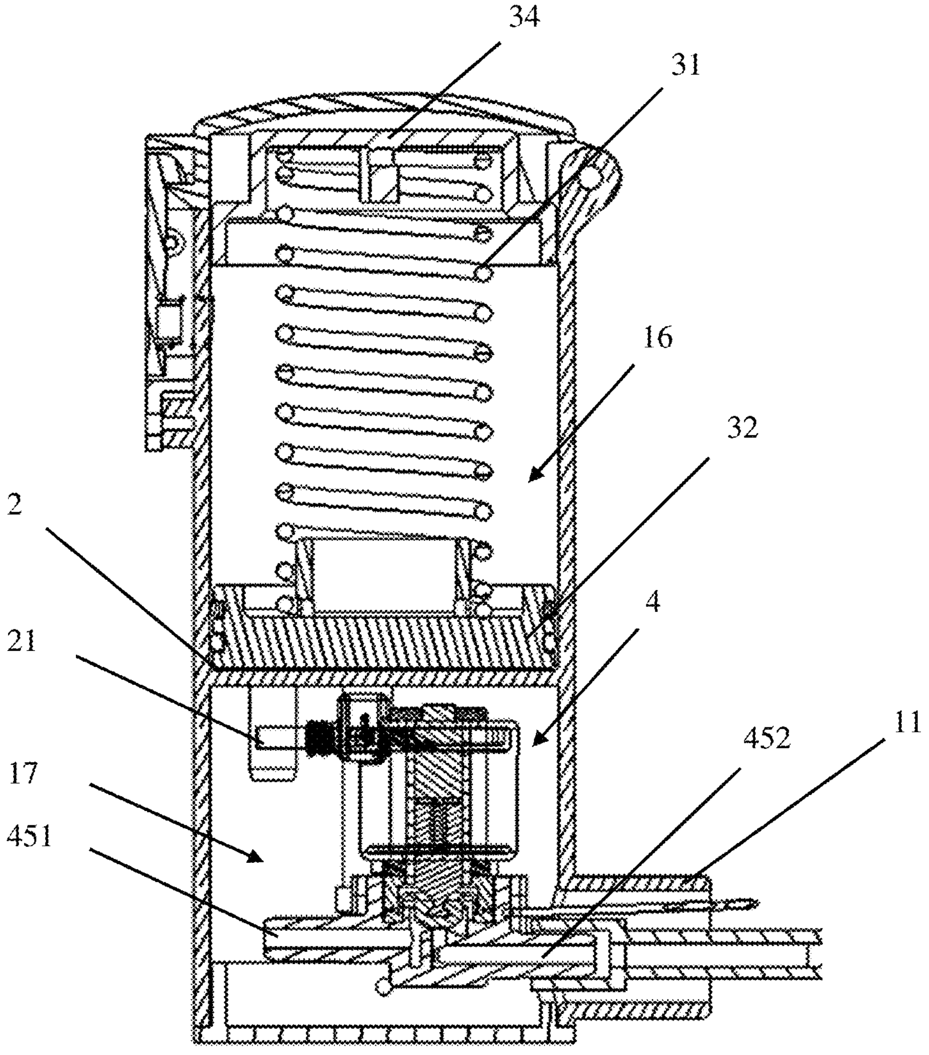
FIG. 4 illustrates a state when the descaling liquid is exhausted according to one embodiment of the present disclosure.

As shown in FIGS. 1-4, a descaling apparatus of an electronic toilet bidet according to one embodiment of the present disclosure comprises a descaling liquid storage tank 1. FIG. 1 illustrates a structure of a descaling apparatus of an electronic toilet bidet according to one embodiment of the present disclosure. FIG. 2 illustrates, in an exploded view, a structure of the descaling apparatus of the electronic toilet bidet according to one embodiment of the present disclosure. FIG. 3 illustrates a state when a descaling liquid storage tank is fully filled with descaling liquid according to one embodiment of the present disclosure. FIG. 4 illustrates a state when the descaling liquid is exhausted according to one embodiment of the present disclosure.

The descaling liquid storage tank 1 comprises a descaling liquid chamber 16 configured to house descaling liquid 9. A pressure element 3 (also shown in FIG. 7) is disposed and movable in the descaling liquid chamber 16. The descaling liquid chamber 16 comprises a descaling liquid outlet 21. The descaling liquid storage tank 1 further comprises a main body liquid outlet 11 fixedly connected to and in communication with a bidet liquid inlet of the electronic toilet bidet. The main body liquid outlet 11 is controlled by a controlling signal output by a controller of the electronic toilet bidet to connect or disconnect the descaling liquid outlet 21.

Specifically, the descaling apparatus according to the present disclosure comprises the main elements including the descaling liquid storage tank 1 configured to house the descaling liquid 9 and the pressure element 3 configured to provide an output power to convey the descaling liquid 9. The descaling liquid chamber 16 comprises the descaling liquid outlet 21 configured to discharge the descaling liquid 9.

The pressure element 3 provides a continuous output power for discharging the descaling liquid. The main body liquid outlet 11 is controlled by the controlling signal output by the controller of the electronic toilet bidet to connect or disconnect the descaling liquid outlet 21. Thus, the discharge of the descaling liquid depends on the connection or disconnection between the main body liquid outlet 11 and the descaling liquid outlet 21. Thus, the descaling liquid may be automatically and continuously supplied to internal pipes of the electronic toilet bidet 5 for several times after the descaling liquid 9 is added at one time. The controlling signal output by the controller of the electronic toilet bidet is received by a cable and a terminal 7 communicably coupled to the controller. The main body liquid outlet 11 supplies the descaling liquid to the electronic toilet bidet through the connection between a descaling liquid rubber tube 8 and a liquid inlet of the electronic toilet bidet.

The descaling apparatus according to the present disclosure may, according to an instruction, supply the descaling liquid automatically and continuously to the internal pipes of the electronic toilet bidet 5 for several times after the descaling liquid 9 is added at one time. Thus, the descaling apparatus may avoid the lost function of the internal functional modules due to the clogging caused by the accumulation of limescales therein. The descaling apparatus may extend the service life of the modules and improve users' experience with the electronic toilet bidet 5.

In one embodiment, the descaling liquid storage tank 1 further comprises a divider 2 dividing the descaling liquid storage tank 1 into the descaling liquid chamber 16 and a liquid discharging chamber 17. The main body liquid outlet 11 is disposed at the liquid discharging chamber 17. The pressure element 3 is movable toward the divider 2 in the descaling liquid chamber 16.

According to the embodiment, the divider 2 divides the descaling liquid storage tank 1 into the descaling liquid chamber 16 and the liquid discharging chamber 17. The descaling liquid chamber 16 and the liquid discharging chamber 17 may be vertically arranged. For example, the upper portion and the lower portion of the descaling liquid storage tank 1 may be respectively the descaling liquid chamber 16 and the liquid discharging chamber 17. However, the descaling liquid chamber 16 and the liquid discharging chamber 17 may also be horizontally arranged or inside-outside arranged. For example, the left portion and the right portion of the descaling liquid storage tank 1 may be respectively the descaling liquid chamber 16 and the liquid discharging chamber 17. Alternatively, the descaling liquid chamber 16 may be a cylinder or cube having the same axis as the descaling liquid storage tank 1. The liquid discharging chamber 17 may be the space between the cylinder or cube and the descaling liquid storage tank 1. The descaling liquid chamber 16 houses the descaling liquid. Other elements may be disposed inside or individually outside the liquid discharging chamber 17.

In one embodiment, the pressure element 3 comprises a spring 31, a piston 32, and a spring lid 34. The spring lid 34 securely engages the descaling liquid storage tank 1. The spring 31 is connected to the spring lid 34 at one end and to the piston 32 at the other end. The piston 32 is configured to be driven by the spring 31 to move toward the divider 2. As shown in FIG. 2, the pressure element 3 comprises the spring 31, the piston 32, and the spring lid 34. The piston 32 is configured to be driven by the spring 31 to output the descaling liquid.

In one embodiment, the pressure element 3 further comprises a sealing ring 33 winding around the piston 32. According to the embodiment, the sealing ring 33 seals the gap between the piston 32 and a wall of the descaling liquid storage tank 1 to achieve the sealing effect. FIG. 3 illustrates the situation where the descaling liquid 9 is filled in the descaling liquid chamber 16 and the piston 32 is disposed at the top of the descaling liquid chamber 16 and applies a downward force. FIG. 4 illustrates the situation where the descaling liquid 9 is exhausted and the piston 32 is disposed at the bottom of the descaling liquid chamber 16.

In one embodiment, the descaling apparatus further comprises a descaling apparatus electromagnetic valve 4. The descaling apparatus electromagnetic valve 4 is connected to the descaling liquid outlet 21 and the main body liquid outlet 11. The descaling apparatus electromagnetic valve 4 is configured to control the connection or disconnection between the descaling liquid outlet 21 and the main body liquid outlet 11 according to the controlling signal output by the controller of the electronic toilet bidet. The descaling apparatus electromagnetic valve 4 controlled by the controller is added to control the connection or disconnection between the descaling liquid outlet 21 and the main body liquid outlet 11. The descaling apparatus electromagnetic valve 4 may be disposed inside or individually outside the liquid discharging chamber 17.

Figure 9:
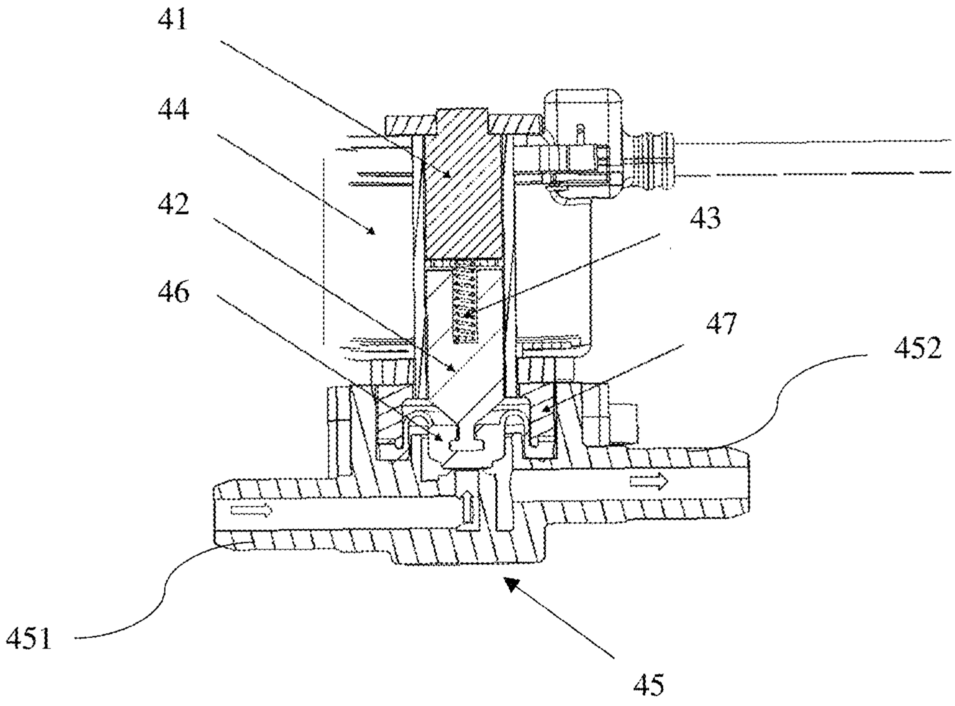
FIG. 9 illustrates a descaling apparatus electromagnetic valve according to one embodiment of the present disclosure.

In one embodiment as shown in FIG. 9, the descaling apparatus further comprises an isolation membrane disposed on the descaling apparatus electromagnetic valve 4. The isolation membrane is added to isolate the internal elements of the descaling apparatus electromagnetic valve 4 from the corrosive descaling liquid. Thus, the internal elements of the descaling apparatus electromagnetic valve 4 are protected from being corroded by the descaling liquid so as to increase their service life.

In one embodiment, the descaling apparatus electromagnetic valve 4 comprises a fixed iron core 41. The descaling apparatus electromagnetic valve 4 further comprises a slidable iron core 42 disposed below the fixed iron core 41. The descaling apparatus electromagnetic valve 4 further comprises an electromagnetic valve spring 43 disposed between the fixed iron core 41 and the slidable iron core 42. The descaling apparatus electromagnetic valve 4 further comprises a coil 44 winding around the fixed iron core 41 and the slidable iron core 42. The descaling apparatus electromagnetic valve 4 further comprises a valve body 45 disposed below the slidable iron core 42. The valve body 45 comprises a valve liquid inlet 451 and a valve liquid outlet 452. The slidable iron core 42 slides up and down so as to isolate or communicate the valve liquid inlet 451 and the valve liquid outlet 452. The isolation membrane is disposed on the slidable iron core 42.

As shown in FIG. 9, the descaling apparatus electromagnetic valve 4 comprises the fixed iron core 41, the slidable iron core 42, the electromagnetic valve spring 43, the coil 44, and the valve body 45. The coil 44 receives an external instruction to be powered on or off and thus attract or release the slidable iron core 42. Thus, the valve body 45 is turned on or off. As shown in FIG. 3 and FIG. 4, the valve body 45 comprises the valve liquid inlet 451 and the valve liquid outlet 452. The valve liquid inlet 451 is connected to and in communication with the descaling liquid outlet 21 via an internal input pipe 22 (shown in FIG. 12). The valve liquid outlet 452 is connected to and in communication with the main body liquid outlet 11. When the descaling apparatus electromagnetic valve 4 is turned on, the descaling liquid outlet 21 is connected to and in communication with the main body liquid outlet 11. Under the pressure applied by the pressure element 3, the descaling liquid 9 in the descaling liquid storage tank 1 discharges from the descaling liquid outlet 21 and the main body liquid outlet 11 in turn. Then, the descaling liquid 9 enters the electronic toilet bidet to remove the limescales therein. When the descaling apparatus electromagnetic valve 4 is turned off, the descaling liquid outlet 21 is disconnected to the main body liquid outlet 11. The descaling liquid 9 is not discharged from the main body liquid outlet 11. Preferably, the electromagnetic valve spring 43 may be a fretting spring.

In one embodiment, the isolation membrane comprises an isolation flexible membrane 46 housing a lower end of the slidable iron core 42. The isolation membrane further comprises an isolation membrane upper block 47 housing the slidable iron core 42 to isolate the valve body 45 and the coil 44. According to the embodiment, the slidable iron core 42 and the electromagnetic valve spring 43 are isolated from the corrosive descaling liquid. Thus, these internal elements of the descaling apparatus electromagnetic valve 4 are protected from being corroded by the descaling liquid so as to increase their service life.

In one embodiment, the descaling liquid storage tank 1 further comprises a base 12, a shell 13 disposed on the base 12 and having an upward opening, and an outer lid 14 configured to open or close the opening of the shell 13. A self-locking element 15 is disposed on the shell 13 and configured to lock or unlock the outer lid 14. The divider 2 is disposed in the shell 13. The main body liquid outlet 11 is disposed on the shell 13.

Specifically, the self-locking element 15 comprises a locking base 151 disposed on the shell 13, a locking spring 152 disposed on the locking base 151, a locking press switch 153 connected to the locking spring 152 and configured to lock or unlock the outer lid 14, and a slidable self-locking button 154 configured to control the locking press switch 153. After the outer lid 14 is closed, the locking press switch 153 will securely engage the outer lid 14 with the help of the locking spring 152 and the slidable self-locking button 154. To open the outer lid 14, the slidable self-locking button 154 is operated to unlock the locking press switch 153.

When the descaling liquid is exhausted, a certain amount of the descaling liquid 9 may be added to the descaling liquid storage tank 1 by opening the self-locking element 15 and the outer lid 14 and removing the pressure element 3. Then, the pressure element 3 is reinstalled into the descaling liquid storage tank 1 and the outer lid 14 is closed. According to the embodiment, the self-locking element 15 disposed on the outer lid 14 may prevent children from opening the descaling apparatus. Thus, this may avoid any injuries to the children caused by the leakage of the descaling liquid.

Figure 5:
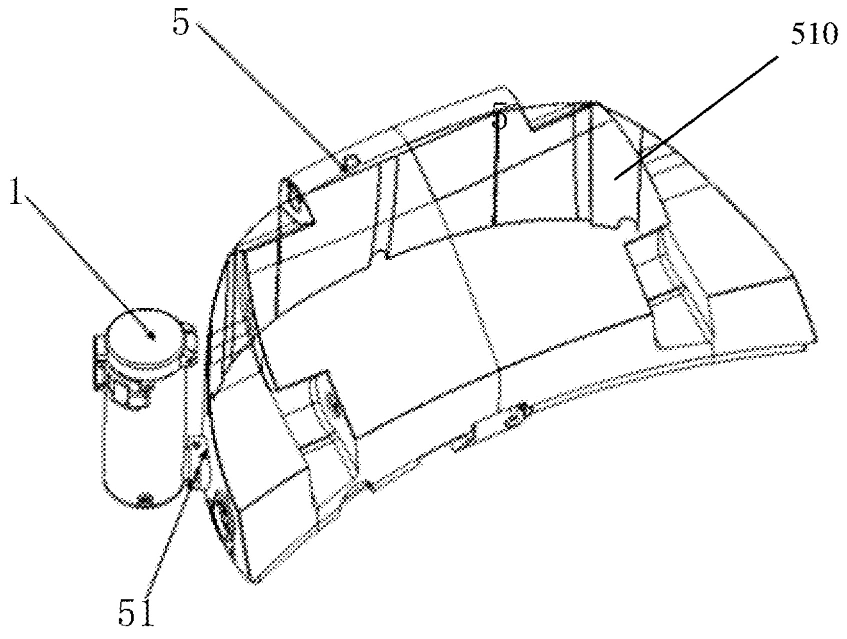
FIG. 5 illustrates a structure of a descaling system of an electronic toilet bidet according to one embodiment of the present disclosure.

As shown in FIG. 5, a descaling system of an electronic toilet bidet according to the present disclosure comprises an electronic toilet bidet 5 and the foregoing descaling apparatus. The descaling apparatus is fixed on the electronic toilet bidet 5. The electronic toilet bidet 5 comprises a bidet main body 510, a bidet main body pipe housed in the bidet main body 510, and a controller disposed on the bidet main body 510. One end of the bidet main body pipe is connected to and in communication with a bidet liquid inlet of the electronic toilet bidet 5. The other end of the bidet main body pipe is connected to and in communication with a water output element, preferably a nozzle. The main body liquid outlet 11 of the descaling apparatus is connected to and in communication with the bidet liquid inlet. The main body liquid outlet 11 is controlled by the controller to connect or disconnect the descaling liquid outlet 21.

Figure 6:
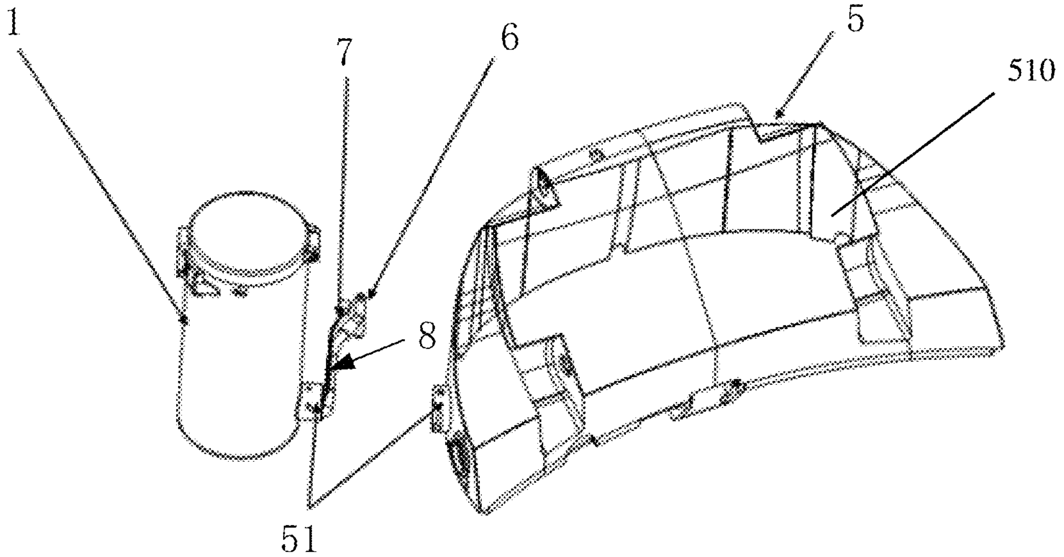
FIG. 6 illustrates an assembly of the descaling system of the electronic toilet bidet according to one embodiment of the present disclosure.
Figure 7:
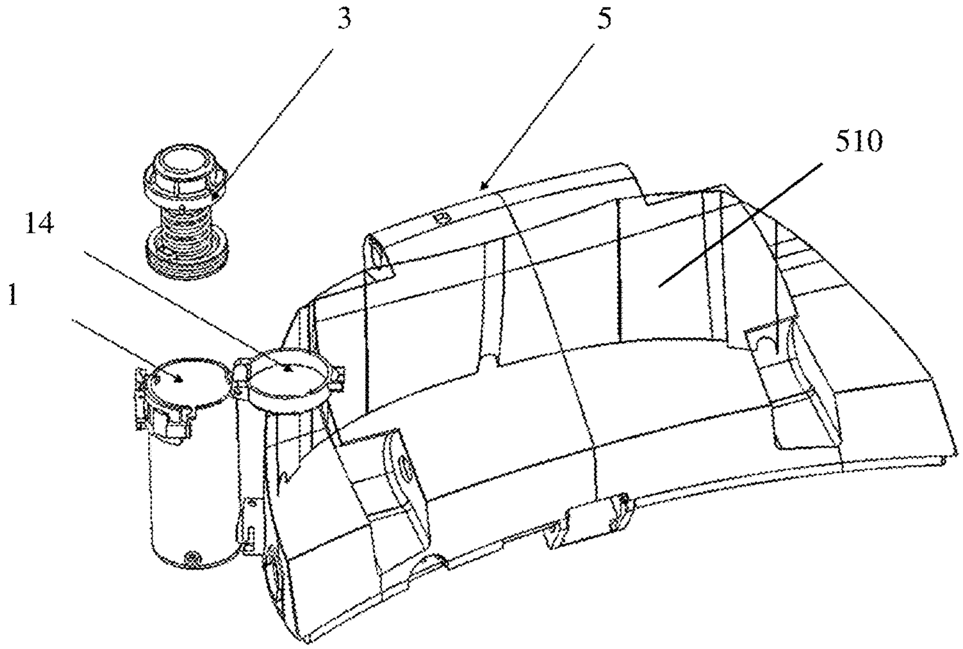
FIG. 7 illustrates how the descaling liquid is added to the descaling system according to one embodiment of the present disclosure.

Specifically, as shown in FIG. 6, the descaling apparatus is fixed on the electronic toilet bidet 5. The descaling apparatus is communicably coupled to the controller of the electronic toilet bidet 5 via a cable and a terminal 7 to receive an on-off instruction. The main body liquid outlet 11 is connected to and in communication with the bidet liquid inlet via the descaling liquid rubber tube 8 to supply the descaling liquid 9 to the electronic toilet bidet 5. As shown in FIG. 7, the descaling liquid is added to the descaling liquid storage tank 1 after the pressure element 3 is removed.

Preferably, the descaling apparatus is disposed on the side of the bidet main body 510 and fixedly connected to a fixing base 51 at a bidet upper lid of the electronic toilet bidet 5. The cable, the terminal 7, and the descaling liquid rubber tube 8 of the descaling apparatus are connected to the internal elements of the electronic toilet bidet 5 via an internal passage of the fixing base 51.

The descaling apparatus according to the present disclosure may supply the descaling liquid 9 automatically and continuously to the internal pipes of the electronic toilet bidet 5 for several times after the descaling liquid 9 is added at one time. Thus, the descaling apparatus may avoid the lost function of the internal function modules due to the clogging by the accumulation of limescales therein. The descaling apparatus may extend the service life of the modules and improve users' experience with the electronic toilet bidet 5.

Figure 8:
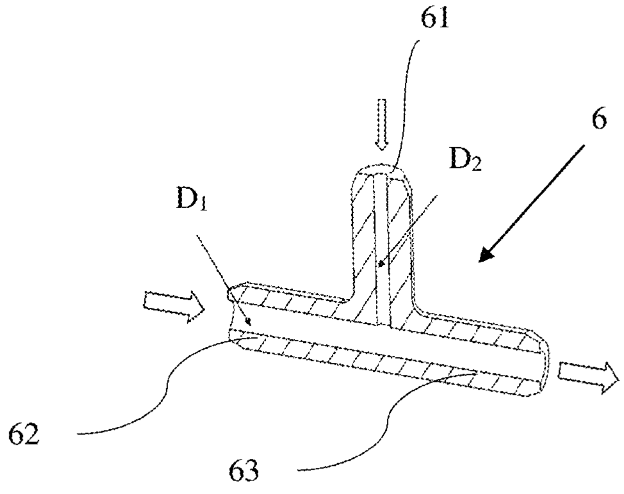
FIG. 8 illustrates a three-way mixing valve according to one embodiment of the present disclosure.

As shown in FIG. 8, in one embodiment, the descaling system further comprises a three-way mixing valve 6 comprising a first liquid inlet passage 61, a second liquid inlet passage 62, and a liquid output passage 63. The first liquid inlet passage 61 is connected to and in communication with the main body liquid outlet 11. The second liquid inlet passage 62 is connected to and in communication with an external water supply system 10 (shown in FIG. 11). The liquid output passage 63 is connected to and in communication with the bidet liquid inlet. According to the embodiment, the three-way mixing valve 6 is configured to mix the descaling liquid and the clean water supplied by the external water supply system 10 and deliver the mixture to the electronic toilet bidet 5.

Figure 11:
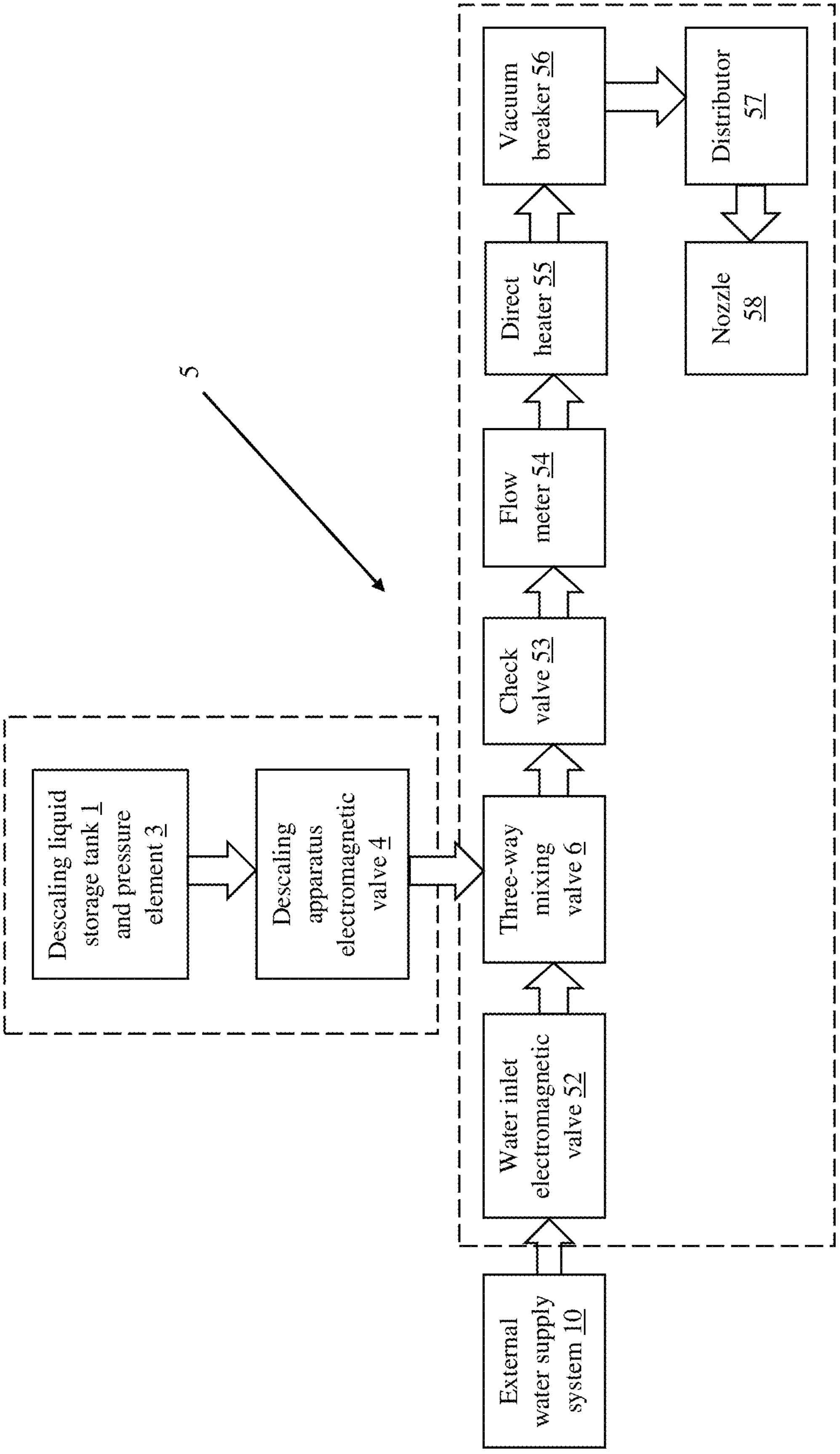
FIG. 11 illustrates a schematic diagram of the descaling system according to one embodiment of the electronic toilet bidet.

In one embodiment, the liquid output passage 63 is connected to and in communication with the bidet liquid inlet via a check valve 53 (shown in FIG. 11). The check valve 53 is configured to prevent the clean water flushed by the electronic toilet bidet 5 from flowing backwards into the descaling apparatus.

In one embodiment, the diameter of the second liquid inlet passage 62 is larger than the diameter of the first liquid inlet passage 61. According to the embodiment, only a small amount of the descaling liquid is needed to fill in the internal pipes of the electronic toilet bidet 5. The descaling liquid is mixed with the clean water to enter the electronic toilet bidet through the three-way mixing valve 6 at a certain ratio. The diameter of the second liquid inlet passage 62 is larger than the diameter of the first liquid inlet passage 61. Thus, this reduces the amount of the descaling liquid needed for removing the limescales every time. Accordingly, the descaling system according to the present disclosure may achieve the function of multiple automatic descaling by adding the descaling liquid 9 to the descaling liquid storage tank 1 at one time. The mixing ratio of the clean water to the descaling liquid may be adjusted by changing the diameter ratio of the second liquid inlet passage 62 to the first liquid inlet passage 61, e.g. 10:1.

In one embodiment, the descaling system further comprises a water inlet electromagnetic valve 52 configured to control the connection or disconnection between the second liquid inlet passage 62 and the external water supply system. The water inlet electromagnetic valve 52 is communicably coupled to the controller. According to the embodiment, the descaling apparatus is disposed behind the water inlet electromagnetic valve 52. Thus, the descaling liquid is prevented from flowing backwards to pollute the external water supply system.

In one embodiment, the descaling apparatus further comprises a descaling apparatus electromagnetic valve 4 communicably coupled to the controller. The descaling apparatus electromagnetic valve 4 is connected to the descaling liquid outlet 21 and the main body liquid outlet 11. The descaling apparatus electromagnetic valve 4 is configured to control the connection or disconnection between the descaling liquid outlet 21 and the main body liquid outlet 11 according to the controlling signal output by the controller of the electronic toilet bidet 5. The descaling apparatus electromagnetic valve 4 is communicably coupled to the controller of the electronic toilet bidet 5 via a cable and a terminal 7 to receive an on-off instruction.

Figure 10:
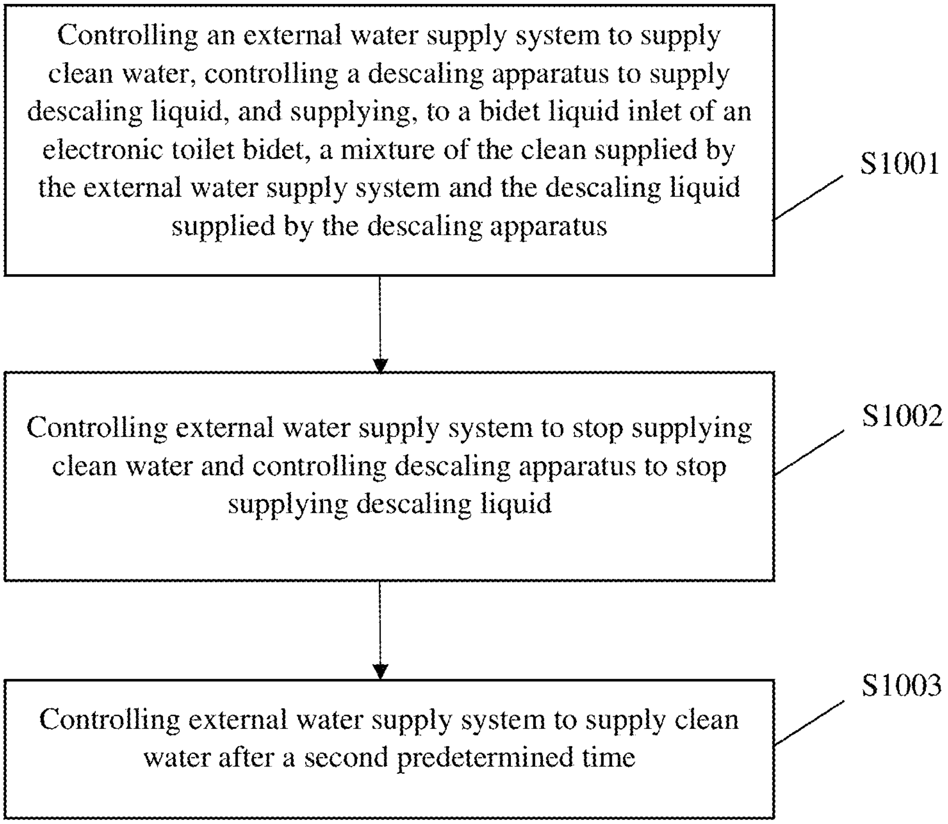
FIG. 10 illustrates a flow chart of a descaling method according to one embodiment of the present disclosure.

FIG. 10 is a flow chart illustrating a descaling method by using a descaling system of an electronic toilet bidet according to the present disclosure. The descaling system comprises an electronic toilet bidet and a descaling apparatus fixedly connected to the electronic toilet bidet. An external water supply system 10 (shown in FIG. 11) supplies clean water to the electronic toilet bidet. The descaling apparatus supplies descaling liquid to the electronic toilet bidet. The descaling method comprises:

In the step S1001, a controller controls the external water supply system to supply the clean water and controls the descaling apparatus to supply the descaling liquid. A mixture of the clean water supplied by the external water supply system 10 and the descaling liquid supplied by the descaling apparatus is supplied to a bidet liquid inlet of the electronic toilet bidet.

In step S1002, after a first predetermined time, the controller controls the external water supply system to stop supplying the clean water and controls the descaling apparatus to stop supplying the descaling liquid.

In Step S1003, after a second predetermined time, the controller controls the external water supply system to supply the clean water.

Specifically, when the descaling function is turned on, the controller controls the external water supply system to supply the clean water and controls the descaling apparatus to supply the descaling liquid. A pressure element 3 drives the descaling liquid to enter internal pipes of the electronic toilet bidet. The descaling liquid is mixed with the clean water in the internal pipes at a certain ratio. After the first predetermined time, the mixture reaches a nozzle of the electronic toilet bidet. At this moment, the controller controls the external water supply system to stop supplying the clean water and the descaling apparatus to stop supplying the descaling liquid. Inputs of the clean water and the descaling liquid are cut off. The mixture comprising the descaling liquid remains in the internal pipes of the electronic toilet bidet for a second predetermined time, e.g. 5-10 minutes. A chemical reaction occurs between the descaling liquid and the accumulated limescales in the electronic toilet bidet so as to remove the limescales. Then, the controller controls the external water supply system to supply the clean water. Thus, the clean water carries the mixture and the removed limescales to leave the electronic toilet bidet 5 through the nozzle 58. Accordingly, the descaling process is completed. In one embodiment, a water inlet electromagnetic valve may control or stop the external water supply system supplying the clean water. A descaling apparatus electromagnetic valve may control or stop the descaling apparatus supplying the descaling liquid.

As shown in FIG. 5 and FIG. 11, in one embodiment, a descaling system comprises an electronic toilet bidet 5 and a descaling apparatus fixed on the electronic toilet bidet 5. FIG. 5 illustrates a structure of a descaling system of an electronic toilet bidet according to one embodiment of the present disclosure. FIG. 11 illustrates a schematic diagram of the descaling system according to one embodiment of the electronic toilet bidet.

The electronic toilet bidet 5 comprises a bidet main body 510, a bidet main body pipe housed in the bidet main body 510, and a controller disposed on the bidet main body 510. One end of the bidet main body pipe is connected to and in communication with a bidet liquid inlet of the electronic toilet bidet 5. The other end of the bidet main body pipe is connected to and in communication with a water output element, preferably a nozzle 58, via a flowmeter 54, a direct heater 55, a vacuum breaker 56, and a distributor 57.

The descaling apparatus comprises a descaling liquid storage tank 1 configured to house descaling liquid 9, a pressure element 3 configured to apply a pressure on the descaling liquid 9, and a descaling apparatus electromagnetic valve 4. The descaling liquid storage tank 1 comprises a divider 2 dividing the descaling liquid storage tank 1 into a lower portion i.e. a liquid discharging chamber 17 and an upper portion i.e. a descaling liquid chamber 16 configured to house the descaling liquid 9. The pressure element 3 is disposed in the descaling liquid chamber 16. The divider 2 comprises a descaling liquid outlet 21. The liquid discharging chamber 17 comprises a main body liquid outlet 11 fixedly connected to and in communication with a bidet liquid inlet of the electronic toilet bidet 5. The descaling apparatus electromagnetic valve 4 is connected to the descaling liquid outlet 21 and the main body liquid outlet 11. The descaling apparatus electromagnetic valve 4 is configured to control the connection or disconnection between the descaling liquid outlet 21 and the main body liquid outlet 11 according to the controlling signal output by the controller of the electronic toilet bidet.

The pressure element 3 comprises a spring 31, a piston 32, a sealing ring 33, and a spring lid 34. The spring lid 34 securely engages the descaling liquid storage tank 1. The spring 31 is connected to the spring lid 34 at one end and to the piston 32 at the other end. The piston 32 is configured to be driven by the spring 31 to move toward the divider 2. The sealing ring 33 winds around the piston 32.

The descaling apparatus electromagnetic valve 4 comprises a fixed iron core 41. The descaling apparatus electromagnetic valve 4 further comprises a slidable iron core 42 disposed below the fixed iron core 41. The descaling apparatus electromagnetic valve 4 further comprises an electromagnetic valve spring 43 disposed between the fixed iron core 41 and the slidable iron core 42. The descaling apparatus electromagnetic valve 4 further comprises a coil 44 winding around the fixed iron core 41 and the slidable iron core 42. The descaling apparatus electromagnetic valve 4 further comprises a valve body 45 disposed below the slidable iron core 42. The valve body 45 comprises a valve liquid inlet 451 and a valve liquid outlet 452. The slidable iron core 42 slides up and down so as to isolate or communicate the valve liquid inlet 451 and the valve liquid outlet 452. The isolation membrane is disposed on the slidable iron core 42. An isolation flexible membrane 46 houses a lower end of the slidable iron core 42. An isolation membrane upper block 47 houses the slidable iron core 42 to isolate the valve body 45 and the coil 44. The electromagnetic valve spring 43 may be a fretting spring.

The descaling liquid storage tank 1 comprises a base 12, a shell 13 disposed on the base 12 and having an upward opening, and an outer lid 14 configured to open or close the opening of the shell 13. A self-locking element 15 is disposed on the shell 13 and configured to lock or unlock the outer lid 14. The divider 12 is housed in the shell 13. The main body liquid outlet 11 is disposed on the shell 13.

The main body liquid outlet 11 of the descaling apparatus is connected to and in communication with the bidet liquid inlet via a three-way mixing valve 6. The descaling apparatus electromagnetic valve 4 is communicably coupled to the controller. The three-way mixing valve 6 comprising a first liquid inlet passage 61, a second liquid inlet passage 62, and a liquid output passage 63. The first liquid inlet passage 61 is connected to and in communication with the main body liquid outlet 11. The second liquid inlet passage 62 is connected to and in communication with an external water supply system 10 (shown in FIG. 11). The liquid output passage 63 is connected to and in communication with the bidet liquid inlet via a check valve 53. The diameter of the second liquid inlet passage 62 is larger than the diameter of the first liquid inlet passage 61 diameter. The electronic toilet bidet 5 further comprises a water inlet electromagnetic valve 52 configured to control the connection or disconnection between the second liquid inlet passage 62 and the external water supply system 10. The water inlet electromagnetic valve 52 is communicably coupled to the controller.

When the descaling function is turned on, the water inlet electromagnetic valve 52 and the descaling apparatus electromagnetic valve 4 are opened. A spring in the descaling liquid storage tank 1 drives the descaling liquid to enter internal pipes of the electronic toilet bidet 5. The descaling liquid is mixed, at the three-way mixing valve 6, with the clean water in the internal pipes at a certain ratio. The diameter $D_1$ of the second liquid inlet passage 62 (i.e. bidet clean water inlet of the three-way mixing valve 6) is larger than the diameter $D_2$ of the first liquid inlet passage 61 (i.e. descaling liquid inlet of the three-way mixing valve 6). The mixing ratio of the clean water to the descaling liquid 9 may be adjusted by changing the diameter ratio of the second liquid inlet passage 62 to the first liquid inlet passage 61, e.g. 10:1. When the mixture reaches a nozzle 58 of the electronic toilet bidet, the electronic toilet bidet 5 turns off the water inlet electromagnetic valve 52 and the descaling apparatus electromagnetic valve 4. Inputs of the clean water and the descaling liquid 9 are cut off. The mixture comprising the descaling liquid 9 remains in the internal pipes of the electronic toilet bidet for a certain amount of time, e.g. 5-10 minutes. A chemical reaction occurs between the descaling liquid 9 and the accumulated limescales in the electronic toilet bidet so as to remove the limescales. Then, the electronic toilet bidet 5 opens the water inlet electromagnetic valve 52. Thus, the clean water carries the mixture and the removed limescales to leave the electronic toilet bidet 5 through the nozzle 58. Accordingly, the descaling process is completed. A check valve 53 is disposed behind the three-way mixing valve 6 to prevent the clean water flushed by the electronic toilet bidet 5 from making the descaling apparatus electromagnetic valve 4 open and thus flowing backwards into the descaling apparatus.

Only a small amount of the descaling liquid is needed to fill in the internal pipes of the electronic toilet bidet 5. The descaling liquid 9 is mixed with the clean water to enter the electronic toilet bidet 5 through the three-way mixing valve 6 at a certain ratio. Thus, this reduces the amount of the descaling liquid 9 needed for removing the limescales every time. Accordingly, the present disclosure may achieve the function of multiple automatic descaling by adding the descaling liquid 9 to the descaling liquid storage tank 1 at one time.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

Example 2

Figure 12:
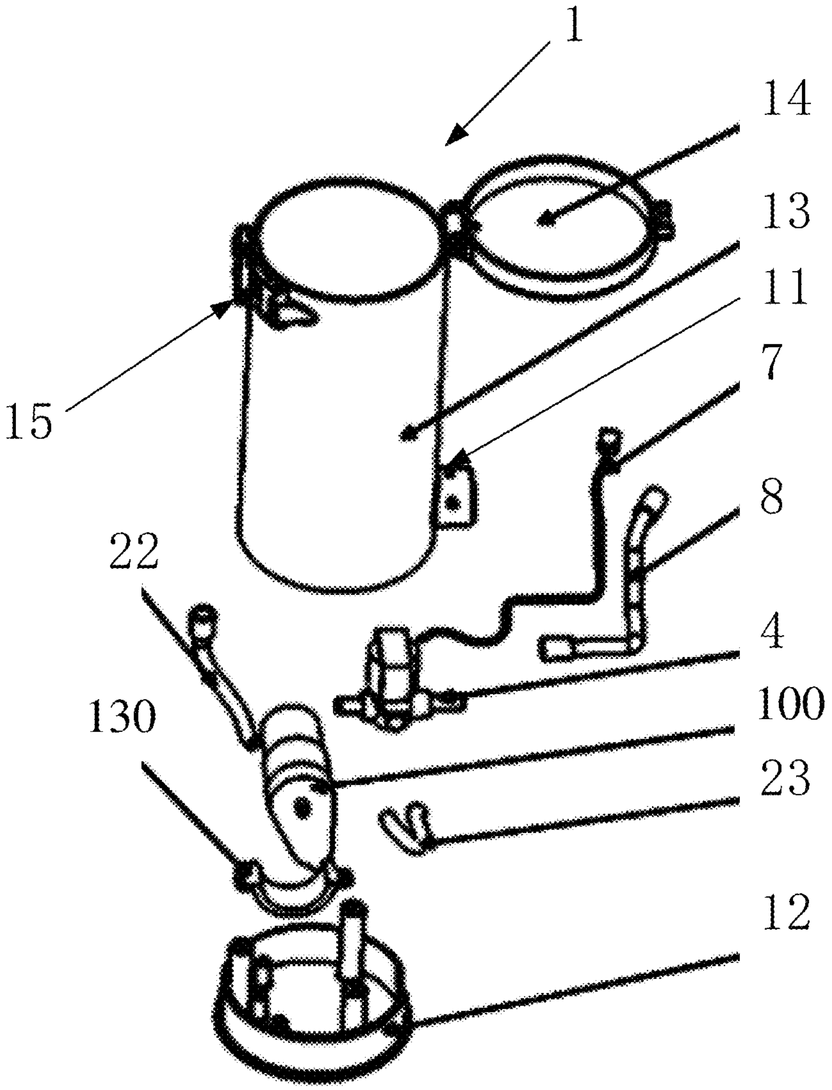
FIG. 12 illustrates, in an exploded view, a structure of the descaling apparatus of the electronic toilet bidet according to one embodiment of the present disclosure.
Figure 13:
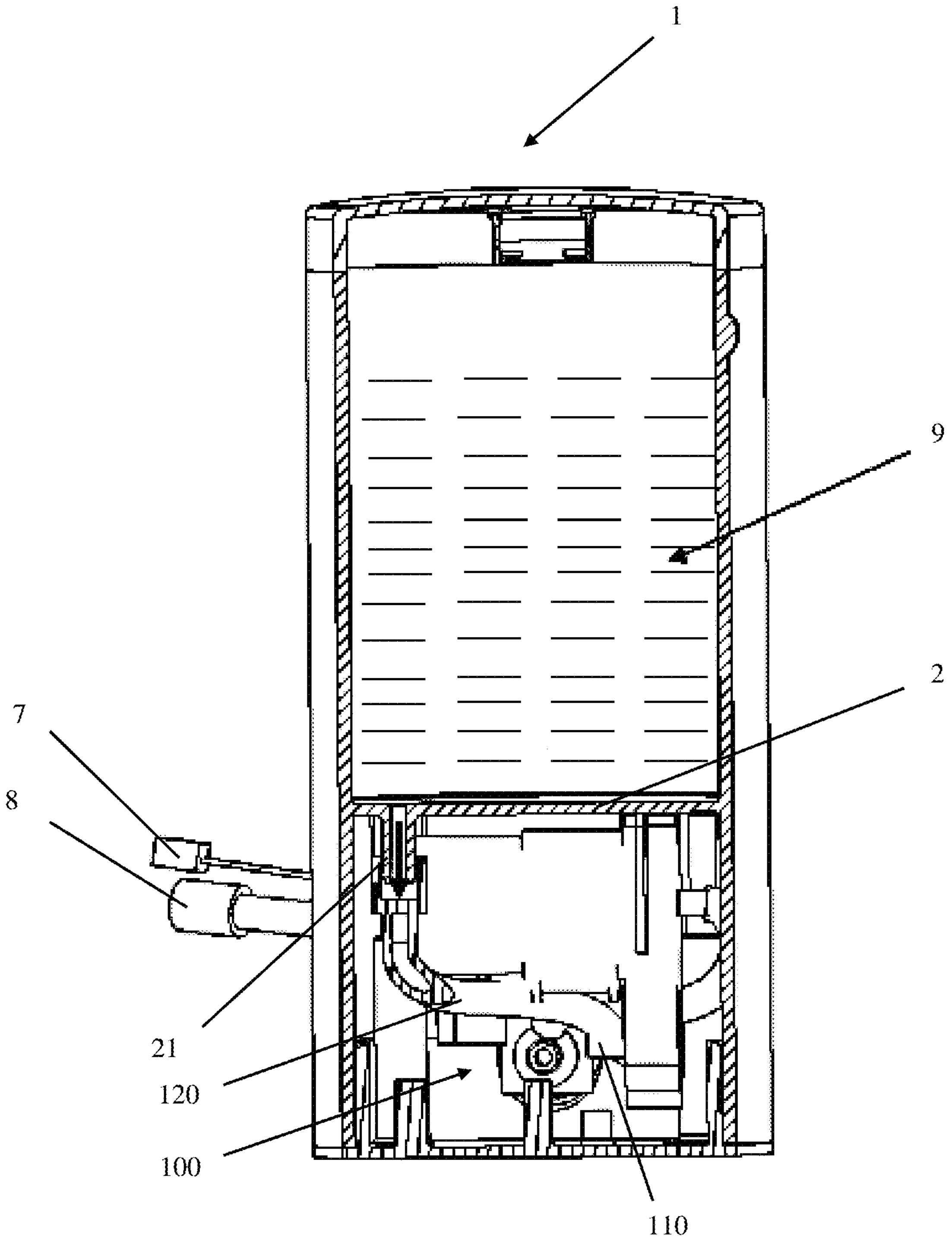
FIG. 13 illustrates, in a sectioned view, a state when a descaling liquid storage tank is fully filled with descaling liquid according to one embodiment of the present disclosure.

FIG. 1 illustrates a structure of a descaling apparatus of an electronic toilet bidet according to one embodiment of the present disclosure. FIG. 12 illustrates, in an exploded view, a structure of the descaling apparatus of the electronic toilet bidet according to one embodiment of the present disclosure. FIG. 13 illustrates, in a sectioned view, a state when a descaling liquid storage tank is fully filled with descaling liquid according to one embodiment of the present disclosure.

As shown in FIGS. 1, 12, and 13, a descaling apparatus of an electronic toilet bidet comprises a descaling liquid storage tank 1 and a liquid suction pump 100. The descaling liquid storage tank 1 comprises a divider 2 dividing the descaling liquid storage tank 1 into a lower portion i.e. a liquid discharging chamber 17 and an upper portion i.e. a descaling liquid chamber 16 configured to house descaling liquid 9. The divider 2 comprises a descaling liquid outlet 21. The liquid discharging chamber 17 comprises a main body liquid outlet 11. A pump liquid inlet 110 of the liquid suction pump 100 is connected to and in communication with the descaling liquid outlet 21. A pump liquid outlet 120 of the liquid suction pump 100 is connected to and in communication with the main body liquid outlet 11.

Specifically, the descaling apparatus of the electronic toilet bidet comprises a descaling liquid storage tank 1 configured to house the descaling liquid 9 and a liquid suction pump 100 configured to provide an output power to convey the descaling liquid 9. The divider 2 divides the descaling liquid storage tank 1 into the lower portion i.e. the liquid discharging chamber 17 and the upper portion i.e. the descaling liquid chamber 16 configured to house descaling liquid.

The liquid suction pump 100 is configured to provide the output power for the descaling liquid 9. When the liquid suction pump 100 is opened, the liquid suction pump 100 withdraws the descaling liquid 9 from the descaling liquid chamber 16 through the descaling liquid outlet 21 and conveys the descaling liquid 9 to the main body liquid outlet 11. The liquid suction pump 100 is configured to control the output of the descaling liquid 9 by receiving an opening instruction or a closing instruction. Thus, the descaling liquid 9 may be automatically and continuously supplied to internal pipes of the electronic toilet bidet for several times after the descaling liquid is added at one time. The liquid suction pump 100 is communicably coupled to a controller of the electronic toilet bidet via a cable and a terminal 7 to receive an opening instruction or a closing instruction. The main body liquid outlet 11 is connected to and in communication with a bidet liquid inlet via a descaling liquid rubber tube 8 to supply the descaling liquid 9 to the electronic toilet bidet.

The descaling apparatus according to the present disclosure may, according to an instruction, supply the descaling liquid automatically and continuously to the internal pipes of the electronic toilet bidet 5 for several times after the descaling liquid 9 is added at one time. Thus, the descaling apparatus may avoid the lost function of internal functional modules due to the clogging caused by the accumulation of limescales therein. The descaling apparatus may extend the service life of the modules and improve users' experience with the electronic toilet bidet.

As shown in FIG. 12 and FIG. 13, in one embodiment, the descaling liquid storage tank 1 further comprises a base 12, a shell 13 disposed on the base 12 and having an upward opening, and an outer lid 14 configured to open or close the opening of the shell 13. The divider 2 is housed in the shell 13. The main body liquid outlet 11 is disposed on the shell 13. The liquid suction pump 100 is housed in the liquid discharging chamber 17 and fixed on the base 12.

In one embodiment, the descaling apparatus further comprises a pump fixing base 130 having a U-shaped opening. The pump fixing base 130 is fixed on the base 12. The liquid suction pump 100 is received by and fixed in the U-shaped opening of the pump fixing base 130. According to the embodiment, the pump fixing base 130 having the U-shaped opening is configured to fixedly connect the liquid suction pump 100 so that the liquid suction pump 100 can stably proceed its operation.

In one embodiment, a self-locking element 15 is disposed on the shell 13 and configured to lock or unlock the outer lid 14. Please refer to FIG. 2 and the above description of Example 1 for the specific structure and operation of the self-locking element 15.

When the descaling liquid is exhausted, a certain amount of the descaling liquid 9 may be added to the descaling liquid storage tank 1 by opening the self-locking element 15 and the outer lid 14. Then, the outer lid 14 is closed. According to the embodiment, the self-locking element 15 disposed on the outer lid 14 may prevent children from opening the descaling apparatus. Thus, this may avoid any injuries to the children caused by the leakage of the descaling liquid 9.

In one embodiment, the descaling apparatus further comprises a descaling apparatus electromagnetic valve 4. The pump liquid outlet 120 of the liquid suction pump 100 is connected to and in communication with the main body liquid outlet 11 via the descaling apparatus electromagnetic valve 4. The descaling apparatus electromagnetic valve 4 is configured to control the output of the descaling liquid 9. As discussed above the liquid suction pump 100 may also control the output of the descaling liquid 9 by connecting and disconnecting a descaling liquid passage in the descaling apparatus. Thus, in another embodiment, the descaling apparatus electromagnetic valve 4 may be removed to reduce the cost. Please refer to FIG. 9 and the above description of Example 1 for the specific structure and operation of the descaling apparatus electromagnetic valve 4.

According to the embodiment, the isolation membrane is added on the slidable iron core 42 so as to isolate the internal elements of the descaling apparatus electromagnetic valve 4 from the corrosive descaling liquid. For example, the slidable iron core 42 and the electromagnetic valve spring 43, which may be a fretting spring, are isolated. Thus, the internal elements of the descaling apparatus electromagnetic valve 4 are protected from being corroded by the descaling liquid 9 so as to increase their service life. Please refer to FIG. 9 and the above description of Example 1 for the specific structure and operation of the isolation membrane.

As shown in FIG. 12, in one embodiment, the descaling apparatus further comprises an internal input pipe 22 and an internal output pipe 23. The pump liquid inlet 110 of the liquid suction pump 100 is connected to and in communication with the descaling liquid outlet 21 via the internal input pipe 22. The pump liquid outlet 120 of the liquid suction pump 100 is connected to and in communication with the main body liquid outlet 11 via the internal output pipe 23. The connection between the liquid suction pump 100 and the internal input pipe 22 and the connection between the liquid suction pump 100 and the internal output pipe 23 facilitate the conveyance of the descaling liquid 9.

Please refer to FIG. 5 and the above description of Example 1 for the specific structure and operation of the descaling system. Specifically, as shown in FIG. 6, the descaling apparatus is fixed on the electronic toilet bidet 5. The liquid suction pump 100 is communicably coupled to the controller of the electronic toilet bidet 5 via a cable and a terminal 7 to receive an opening instruction or a closing instruction. The main body liquid outlet 11 is connected to and in communication with the bidet liquid inlet via the descaling liquid rubber tube 8 to supply the descaling liquid 9 to the electronic toilet bidet 5. The descaling liquid is added to the descaling liquid storage tank 1.

Preferably, as shown in FIG. 12 and FIG. 5, the descaling apparatus is disposed on the side of the bidet main body and fixedly connected to a fixing base 51 at a bidet upper lid of the electronic toilet bidet 5. The cable, the terminal 7, and the descaling liquid rubber tube 8 of the descaling apparatus are connected to the internal elements of the electronic toilet bidet 5 via an internal passage of the fixing base 51.

The descaling apparatus according to the present disclosure may supply the descaling liquid automatically and continuously to the internal pipes of the electronic toilet bidet 5 for several times after the descaling liquid is added at one time. Thus, the descaling apparatus may solve the problem of the lost function of the internal function modules due to the clogging by the accumulation of limescales therein. The descaling apparatus may extend the service life of the modules and improve users' experience with the electronic toilet bidet 5.

As shown in FIG. 8, in one embodiment, the descaling system further comprises a three-way mixing valve 6. Please refer to FIG. 8, and the above description of Example 1 for the specific structure and operation of mixing three-way valve 6.

Figure 14:
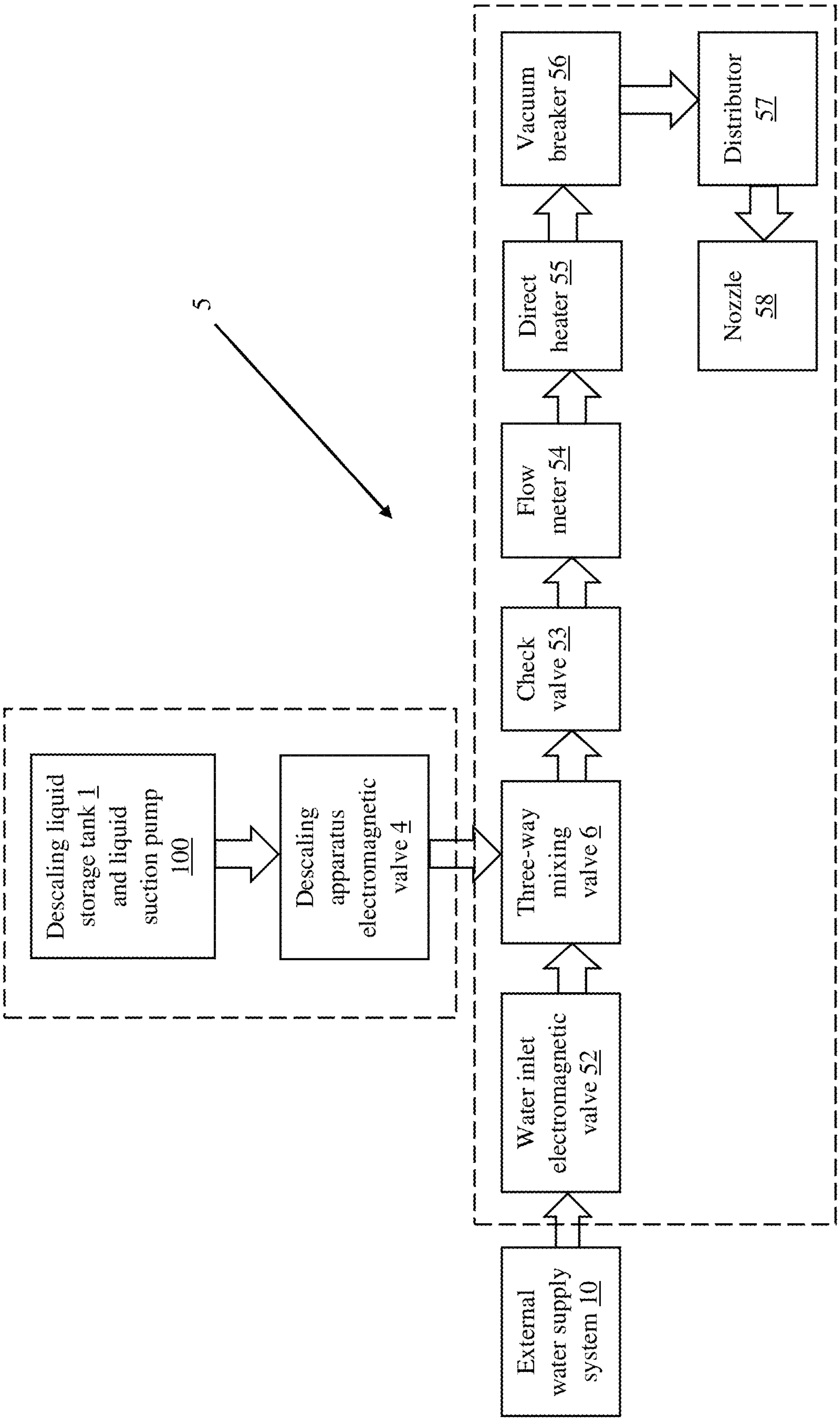
FIG. 14 illustrates a schematic diagram of the descaling system according to one embodiment of the electronic toilet bidet.

In one embodiment, the liquid output passage 63 is connected to and in communication with the bidet liquid inlet via a check valve 53 (shown in FIG. 14). The check valve 53 is configured to prevent the clean water flushed by the electronic toilet bidet 5 from flowing backwards into the descaling apparatus.

In one embodiment, the diameter of the second liquid inlet passage 62 is larger than the diameter of the first liquid inlet passage 61. Please refer to FIG. 8, and the above description of Example 1 for the specific structure and operation of mixing three-way valve 6.

In one embodiment, the descaling system further comprises a water inlet electromagnetic valve 52 configured to control the connection or disconnection between the second liquid inlet passage 62 and the external water supply system 10. The water inlet electromagnetic valve 52 is communicably coupled to the controller. According to the embodiment, the descaling apparatus is disposed behind the water inlet electromagnetic valve. Thus, the descaling liquid is prevented from flowing backwards to pollute the external water supply system 10 after the descaling apparatus does not work.

In one embodiment, the descaling apparatus further comprises a descaling apparatus electromagnetic valve 4 communicably coupled to the controller. The pump liquid outlet 120 of the liquid suction pump 100 is connected to and in communication with the main body liquid outlet 11 via the descaling apparatus electromagnetic valve 4. Specifically, the descaling apparatus electromagnetic valve 4 is communicably coupled to the controller to receive an on-off instruction.

As shown in FIG. 14, in one embodiment, a descaling system comprises an electronic toilet bidet 5 and a descaling apparatus fixed on the electronic toilet bidet 5. The electronic toilet bidet 5 comprises a bidet main body, a bidet main body pipe housed in the bidet main body, and a controller disposed on the bidet main body. One end of the bidet main body pipe is connected to and in communication with a bidet liquid inlet of the electronic toilet bidet 5. The other end of the bidet main body pipe is connected to and in communication with a water output element, preferably a nozzle 58, at the other end via a flowmeter 54, a direct heater 55, a vacuum breaker 56, and a distributor 57.

The descaling apparatus comprises a descaling liquid storage tank 1 configured to house descaling liquid 9, a liquid suction pump 100 configured to withdraw the descaling liquid 9, and a descaling apparatus electromagnetic valve 4. The descaling liquid storage tank 1 comprises a divider 2 dividing the descaling liquid storage tank 1 into a lower portion i.e. a liquid discharging chamber 17 and an upper portion i.e. a descaling liquid chamber 16 configured to house the descaling liquid 9. The liquid suction pump 100 is disposed in the liquid discharging chamber 17. The divider 2 comprises a descaling liquid outlet 21. The liquid discharging chamber 17 comprises a main body liquid outlet 11 fixedly connected to and in communication with the bidet liquid inlet of the electronic toilet bidet 5. A pump liquid inlet 110 of the liquid suction pump 100 is connected to and in communication with the descaling liquid outlet 21 via an internal input pipe 22. A pump liquid outlet 120 of the liquid suction pump 100 is connected to and in communication with the main body liquid outlet 11 via the descaling apparatus electromagnetic valve 4 and an internal output pipe 23. Please refer to FIG. 9 and the above description of Example 1 for the specific structure and operation of the descaling apparatus electromagnetic valve 4.

As shown in FIG. 12 and FIG. 13, in one embodiment, the descaling liquid storage tank 1 further comprises a base 12, a shell 13 disposed on the base 12 and having an upward opening, and an outer lid 14 configured to open or close the opening of the shell 13. A self-locking element 15 is disposed on the shell 13 and configured to lock or unlock the outer lid 14. The divider 2 is housed in the shell 13. The main body liquid outlet 11 is disposed on the shell 13. The descaling apparatus further comprises a pump fixing base 130 having a U-shaped opening. The pump fixing base 130 is fixed on the base 12. The liquid suction pump 100 is received by and fixed in the U-shaped opening of the pump fixing base 130.

The main body liquid outlet 11 is connected to and in communication with the bidet liquid inlet of the electronic toilet bidet 5 via a three-way mixing valve 6. The liquid suction pump 100 and the descaling apparatus electromagnetic valve 4 are communicably coupled to the controller of the electronic toilet bidet via a cable and a terminal 7. The three-way mixing valve 6 comprises a first liquid inlet passage 61, a second liquid inlet passage 62, and a liquid output passage 63. The first liquid inlet passage 61 is connected to and in communication with the main body liquid outlet 11 via a descaling liquid rubber tube 8. The second liquid inlet passage 62 is connected to and in communication with an external water supply system 10 (shown in FIG. 14). The liquid output passage 63 is connected to and in communication with the bidet liquid inlet via a check valve 53. The diameter of the second liquid inlet passage 62 is larger than the diameter of the first liquid inlet passage 61 diameter. The electronic toilet bidet 5 further comprises a water inlet electromagnetic valve 52 configured to control the connection or disconnection between the second liquid inlet passage 62 and the external water supply system 10. The water inlet electromagnetic valve 52 is communicably coupled to the controller.

When the descaling function is turned on, the water inlet electromagnetic valve 52, the descaling apparatus electromagnetic valve 4, and the liquid suction pump 100 are opened. The descaling liquid 9 is withdrawn by the liquid suction pump 100 to enter internal pipes of the electronic toilet bidet 5. The descaling liquid is mixed, at the three-way mixing valve 6, with the clean water in the internal pipes at a certain ratio. The diameter $D_1$ of the second liquid inlet passage 62 (i.e. bidet clean water inlet of the three-way mixing valve 6) is larger than the diameter $D_2$ of the first liquid inlet passage 61 (i.e. descaling liquid inlet of the three-way mixing valve 6). The mixing ratio of the clean water to the descaling liquid 9 may be adjusted by changing the diameter ratio of the second liquid inlet passage 62 to the first liquid inlet passage 61, e.g. 10:1. When the mixture reaches a nozzle 58 of the electronic toilet bidet 5, the electronic toilet bidet 5 turns off the water inlet electromagnetic valve 52, the descaling apparatus electromagnetic valve 4, and the liquid suction pump 100. Inputs of the clean water and the descaling liquid 9 are cut off. The mixture comprising the descaling liquid 9 remains in the internal pipes of the electronic toilet bidet for a certain amount of time, e.g. 5-10 minutes. A chemical reaction occurs between the descaling liquid 9 and the accumulated limescales in the electronic toilet bidet so as to remove the limescales. Then, the electronic toilet bidet 5 opens the water inlet electromagnetic valve 52. Thus, the clean water carries the mixture and the removed limescales to leave the electronic toilet bidet 5 through the nozzle 58. Accordingly, the descaling process is completed. A check valve 53 is disposed behind the three-way mixing valve 6 to prevent the clean water flushed by the electronic toilet bidet 5 from making the descaling apparatus electromagnetic valve 4 open and thus flowing backwards into the descaling apparatus.

Only a small amount of the descaling liquid is needed to fill in the internal pipes of the electronic toilet bidet 5. The descaling liquid 9 is mixed with the clean water to enter the electronic toilet bidet 5 through the three-way mixing valve 6 at a certain ratio. Thus, this reduces the amount of the descaling liquid 9 needed for removing the limescales every time. Accordingly, the present disclosure may achieve the function of multiple automatic descaling by adding the descaling liquid 9 to the descaling liquid storage tank 1 at one time.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

Example 3

As shown in FIGS. 1-4, a descaling apparatus of an electronic toilet bidet according to the present disclosure comprises a descaling liquid storage tank 1. The descaling liquid storage tank 1 comprises a descaling liquid chamber 16 configured to house descaling liquid 9. A pressure element 3 (also shown in FIG. 7) is disposed and movable in the descaling liquid chamber 16. The descaling liquid chamber 16 comprises a descaling liquid outlet 21. The descaling liquid storage tank 1 further comprises a main body liquid outlet 11 configured to connect or disconnect the descaling liquid outlet 21. The descaling liquid storage tank 1 further comprises a level sensor assembly configured to detect a liquid level of the descaling liquid 9 housed in the descaling liquid chamber 16.

Specifically, the descaling apparatus according to the present disclosure comprises the main elements including the descaling liquid storage tank 1 configured to house the descaling liquid 9 and the pressure element 3 configured to provide an output power to convey the descaling liquid 9. The descaling liquid chamber 16 comprises the descaling liquid outlet 21 configured to discharge the descaling liquid 9. The connection or disconnection between the main body liquid outlet 11 and the descaling liquid outlet 21 may be performed by a descaling apparatus electromagnetic valve 4.

The descaling apparatus electromagnetic valve 4 is configured to control the connection or disconnection between the descaling liquid outlet 21 and the main body liquid outlet 11. Please refer to FIG. 9 and the above description of Example 1 for the specific structure and operation of the descaling apparatus electromagnetic valve 4. The descaling apparatus electromagnetic valve 4 is configured to control the output of the descaling liquid 9. Accordingly, the descaling liquid may be automatically and continuously supplied to internal pipes of the electronic toilet bidet for several times after the descaling liquid 9 is added at one time.

In one embodiment, the descaling liquid storage tank 1 further comprises a divider 2 dividing the descaling liquid storage tank 1 into the descaling liquid chamber 16 and a liquid discharging chamber 17. Please refer to FIG. 3 and the above description of Example 1 for the internal structure of the descaling liquid storage tank 1 and the specific structure and operation of the divider 2. Other elements, e.g. the descaling apparatus electromagnetic valve 4, may be disposed inside or individually outside the liquid discharging chamber 17.

Figure 15:
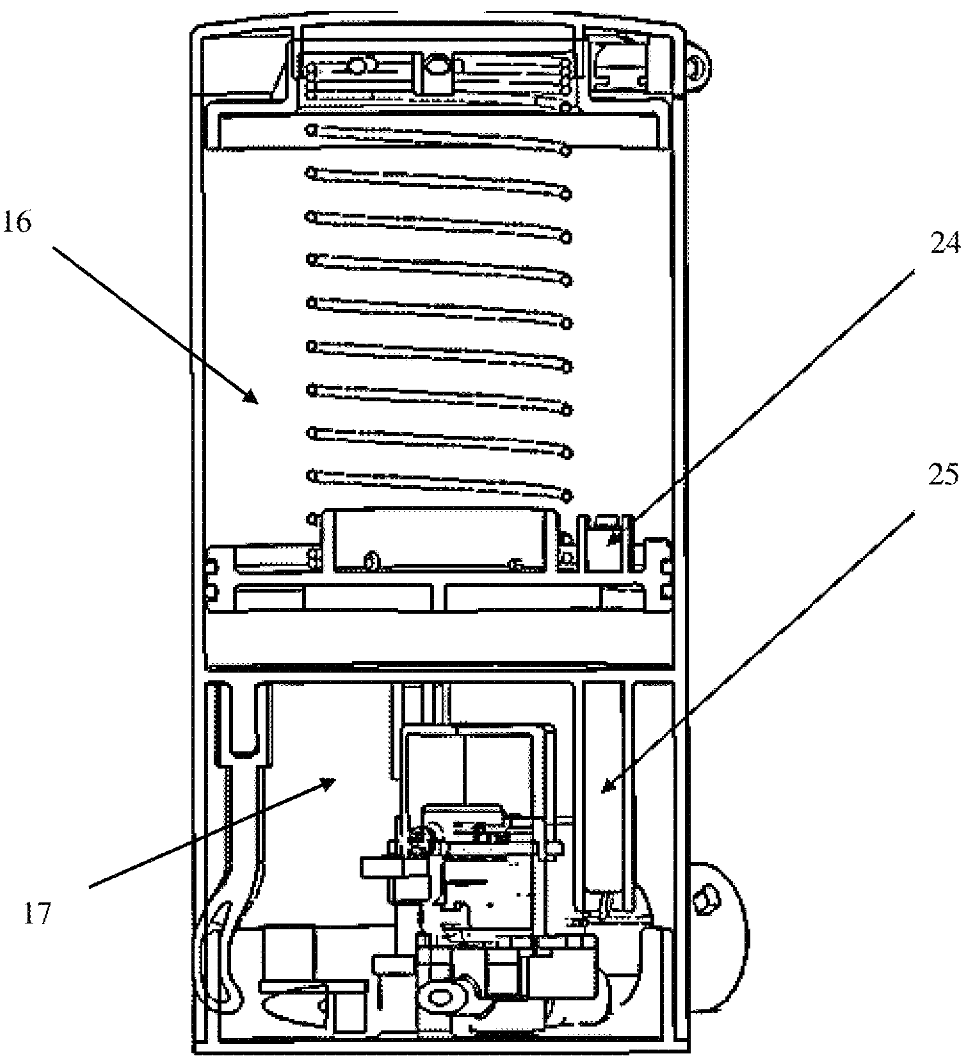
FIG. 15 illustrates, in a sectioned view, the descaling apparatus of the electronic toilet bidet according to one embodiment of the present disclosure.

FIG. 2 illustrates, in an exploded view, a structure of the descaling apparatus of the electronic toilet bidet according to one embodiment of the present disclosure. FIG. 15 illustrates, in a sectioned view, the descaling apparatus of the electronic toilet bidet according to one embodiment of the present disclosure.

As shown in FIG. 2 and FIG. 15, in one embodiment, the level sensor assembly comprises a movable sensing element 24 disposed on the pressure element 3 and a fixing sensing element 25 disposed in the liquid discharging chamber 17. Because the movable sensing element 24 is disposed on the pressure element 3, the movable sensing element 24 moves together with the pressure element 3. The pressure element 3 applies a pressure onto the descaling liquid 9 by moving towards or away from the divider 2. When the pressure element 3 is away from the divider 2, the liquid level of the descaling liquid 9 is away from the divider 2. The movable sensing element 24 is also away from the fixing sensing element 25. Thus, the large distance between the movable sensing element 24 and the fixing sensing element 25 does not trigger an alert. When the pressure element 3 is close to the divider 2, the liquid level of the descaling liquid 9 is close to the divider 2. The distance, detected by the fixing sensing element 25, between the movable sensing element 24 and the fixing sensing element 25 may be small enough to reach a predetermined threshold value of the distance. Thus, a signal is sent to alert users to replenish the descaling liquid 9. In one embodiment, the movable sensing element 24 is a magnet and fixing sensing element 25 is a reed switch.

In one embodiment, the pressure element 3 comprises a spring 31, a piston 32, and a spring lid 34. Please refer to FIG. 3, FIG. 4, and the above description of Example 1 for the specific structure and operation of the pressure element 3.

In one embodiment, the movable sensing element 24 is disposed on the piston 32. As shown in FIG. 15, when the descaling liquid 9 is exhausted, the piston 32 is disposed at the bottom of the descaling liquid chamber 16. Thus, the movable sensing element 24 disposed on the piston 32 is close to the fixing sensing element 25 disposed in the liquid discharging chamber 17 and the close distance triggers an alerting signal.

As shown in FIG. 10, in one embodiment, the descaling apparatus electromagnetic valve 4 comprises a fixed iron core 41. Please refer to FIG. 9 and the above description of Example 1 for the specific structure and operation of the descaling apparatus electromagnetic valve 4.

According to the embodiment, the isolation membrane is added on the slidable iron core 42 so as to isolate the internal elements of the descaling apparatus electromagnetic valve 4 from the corrosive descaling liquid. For example, the slidable iron core 42 and the electromagnetic valve spring 43, which may be a fretting spring, are isolated. Thus, the internal elements of the descaling apparatus electromagnetic valve 4 are protected from being corroded by the descaling liquid 9 so as to increase their service life.

In one embodiment, the isolation membrane comprises an isolation flexible membrane 46 housing a lower end of the slidable iron core 42. Please refer to FIG. 9 and the above description of Example 1 for the specific structure and operation of the isolation membrane.

In one embodiment, the descaling liquid storage tank 1 further comprises a base 12, a shell 13 disposed on the base 12 and having an upward opening, and an outer lid 14 configured to open or close the opening of the shell 13. A self-locking element 15 is disposed on the shell 13 and configured to lock or unlock the outer lid 14. The divider 2 is disposed in the shell 13. The main body liquid outlet 11 is disposed on the shell 13. Please also refer to FIG. 1 and the above description of Example 1 for the specific structure of the descaling liquid storage tank 1. Please further refer to FIG. 2 and the above description of Example 1 for the specific structure and operation of the self-locking element 15.

When the descaling liquid is exhausted, a certain amount of the descaling liquid 9 may be added to the descaling liquid storage tank 1 by opening the self-locking element 15 and the outer lid 14 and removing the pressure element 3. Then, the pressure element 3 is reinstalled into the descaling liquid storage tank 1 and the outer lid 14 is closed. According to the embodiment, the self-locking element 15 disposed on the outer lid 14 may prevent children from opening the descaling apparatus. Thus, this may avoid any injuries to the children caused by the leakage of the descaling liquid.

As shown in FIG. 6, a descaling system of an electronic toilet bidet according to the present disclosure comprises an electronic toilet bidet 5 and the foregoing descaling apparatus. Please refer to FIG. 5 and the above description of Example 1 for the specific structure and operation of the descaling system. An output of the level sensor assembly is communicably coupled to an input of the controller.

Specifically, as shown in FIG. 7, the descaling apparatus is fixed on the electronic toilet bidet 5. The main body liquid outlet 11 is controlled by the controller of the electronic toilet bidet to connect or disconnect the descaling liquid outlet 21. Preferably, the descaling apparatus electromagnetic valve 4 is connected to the descaling liquid outlet 21 and the main body liquid outlet 11. The descaling apparatus electromagnetic valve 4 is configured to control the connection or disconnection between the descaling liquid outlet 21 and the main body liquid outlet 11. The descaling apparatus electromagnetic valve 4 is communicably coupled to the controller of the electronic toilet bidet 5 via a cable and a terminal 7 to receive an on-off instruction. The main body liquid outlet 11 is connected to and in communication with the bidet liquid inlet via the descaling liquid rubber tube 8 to supply the descaling liquid 9 to the electronic toilet bidet 5. The descaling liquid 9 is sprayed from the water output element, preferably a nozzle, after the internal pipes of the electronic toilet bidet 5 is cleaned by the descaling liquid 9.

The output of the level sensor assembly is, preferably, communicably coupled to the controller of the electronic toilet bidet 5 via the cable and the terminal 7. The level sensor assembly sends an alerting signal when detecting that the liquid level of the descaling liquid 9 is lower than a predetermined threshold value of the liquid level.

As shown in FIG. 8, the descaling liquid is added to the descaling liquid storage tank 1 after the pressure element 3 is removed.

Preferably, the descaling apparatus is disposed on the side of the bidet main body and fixedly connected to a fixing base 51 at a bidet upper lid of the electronic toilet bidet 5. The cable, the terminal 7, and the descaling liquid rubber tube 8 of the descaling apparatus are connected to the internal elements of the electronic toilet bidet 5 via an internal passage of the fixing base 51.

The descaling apparatus according to the present disclosure may supply the descaling liquid 9 automatically and continuously to the internal pipes of the electronic toilet bidet 5 for several times after the descaling liquid 9 is added at one time. Thus, the descaling apparatus may avoid the lost function of the internal function modules due to the clogging by the accumulation of limescales therein. The descaling apparatus may extend the service life of the modules and improve users' experience with the electronic toilet bidet 5.

In one embodiment, the descaling liquid storage tank 1 further comprises a divider 2 dividing the descaling liquid storage tank 1 into the descaling liquid chamber 16 and a liquid discharging chamber 17. The main body liquid outlet 11 is disposed at the liquid discharging chamber 17. The pressure element 3 is movable toward the divider 2 in the descaling liquid chamber 16. The level sensor assembly comprises a movable sensing element 24 disposed on the pressure element 3 and a fixing sensing element 25 disposed in the liquid discharging chamber 17. An output of the fixing sensing element 25 is communicably coupled to the input of the controller. Specifically, the fixing sensing element 25 is communicably coupled to the controller of the electronic toilet bidet 5 via the cable and the terminal 7. The fixing sensing element 25 sends an alerting signal when detecting that the distance between the movable sensing element 25 and the fixing sensing element 25 is smaller than a predetermined threshold value of the distance.

In one embodiment, the movable sensing element 24 is a magnet and the fixing sensing element 25 is a reed switch. An output of the reed switch is communicably coupled to the input of the controller.

In one embodiment, the descaling apparatus further comprises an alerting element communicably coupled to the output of the level sensor assembly. Specifically, the output of the level sensor assembly is communicably coupled to the alerting element directly via the cable and the terminal 7 to output an alerting signal. In another embodiment, the output of the level sensor assembly is communicably coupled to the alerting element via the controller to output the alerting signal.

As shown in FIG. 8, in one embodiment, the descaling system further comprises a three-way mixing valve 6 comprising a first liquid inlet passage 61, a second liquid inlet passage 62, and a liquid output passage 63. Please refer to FIG. 8, and the above description of Example 1 for the specific structure and operation of mixing three-way valve 6.

Please refer to FIG. 11 and the above description of Example 1 for the specific structure and operation of the descaling system. The descaling liquid storage tank 1 further comprises a level sensor assembly configured to detect a liquid level of the descaling liquid 9 housed in the descaling liquid chamber 16.

Please refer to FIG. 3, FIG. 4, and the above description of Example 1 for the specific structure and operation of the pressure element 3.

The level sensor assembly comprises a movable sensing element 24 disposed on the pressure element 3 and a fixing sensing element 25 disposed in the liquid discharging chamber 17. The fixing sensing element 25 is communicably coupled to the controller. The movable sensing element 24 is a magnet and the fixing sensing element 25 is a reed switch.

The descaling apparatus electromagnetic valve 4 comprises a fixed iron core 41. Please refer to FIG. 9 and the above description of Example 1 for the specific structure and operation of the descaling apparatus electromagnetic valve 4. Please also refer to FIG. 1 and the above description of Example 1 for the specific structure of the descaling liquid storage tank 1" in the combined specification. Please further refer to FIG. 2 and the above description of Example 1 for the specific structure and operation of the self-locking element The main body liquid outlet 11 of the descaling apparatus is connected to and in communication with the bidet liquid inlet via a three-way mixing valve 6. Please refer to FIG. 8, and the above description of Example 1 for the specific structure and operation of mixing three-way valve 6.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

Example 4

Figure 16:
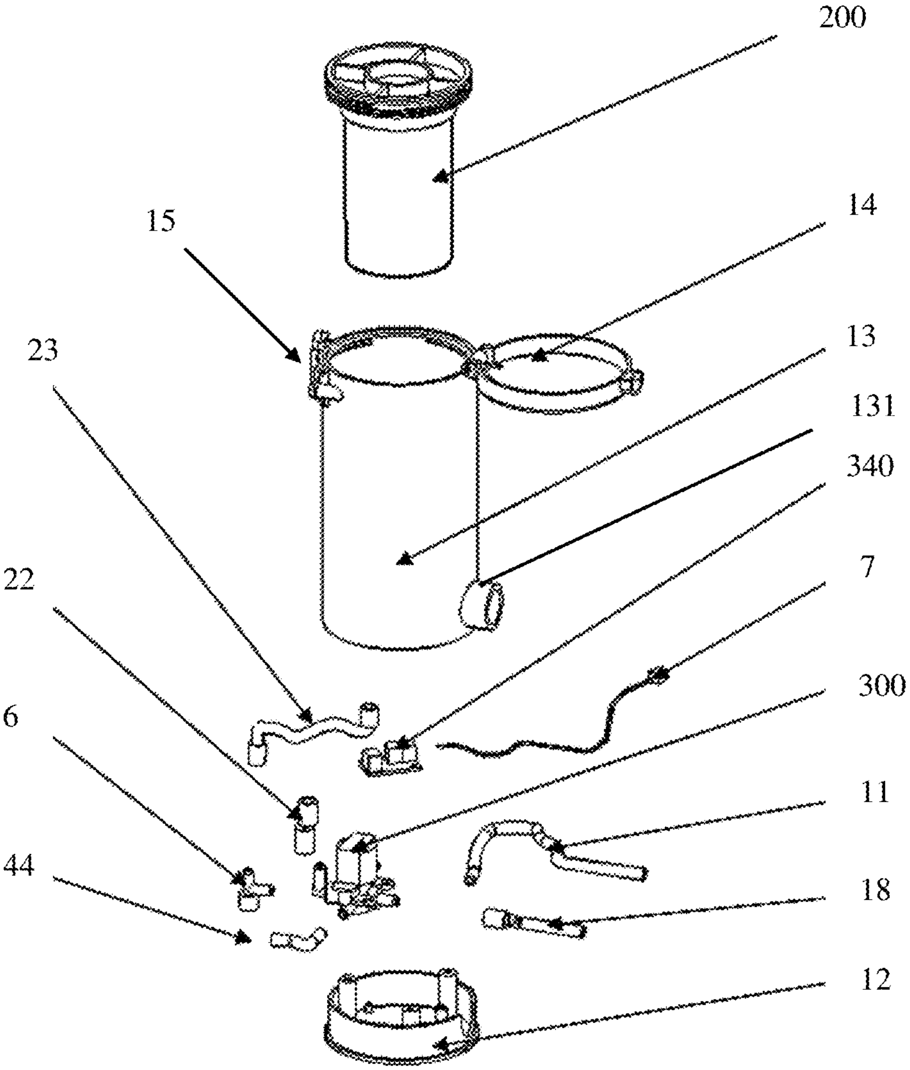
FIG. 16 illustrates, in an exploded view, a structure of the descaling apparatus of the electronic toilet bidet according to one embodiment of the present disclosure.
Figure 17:
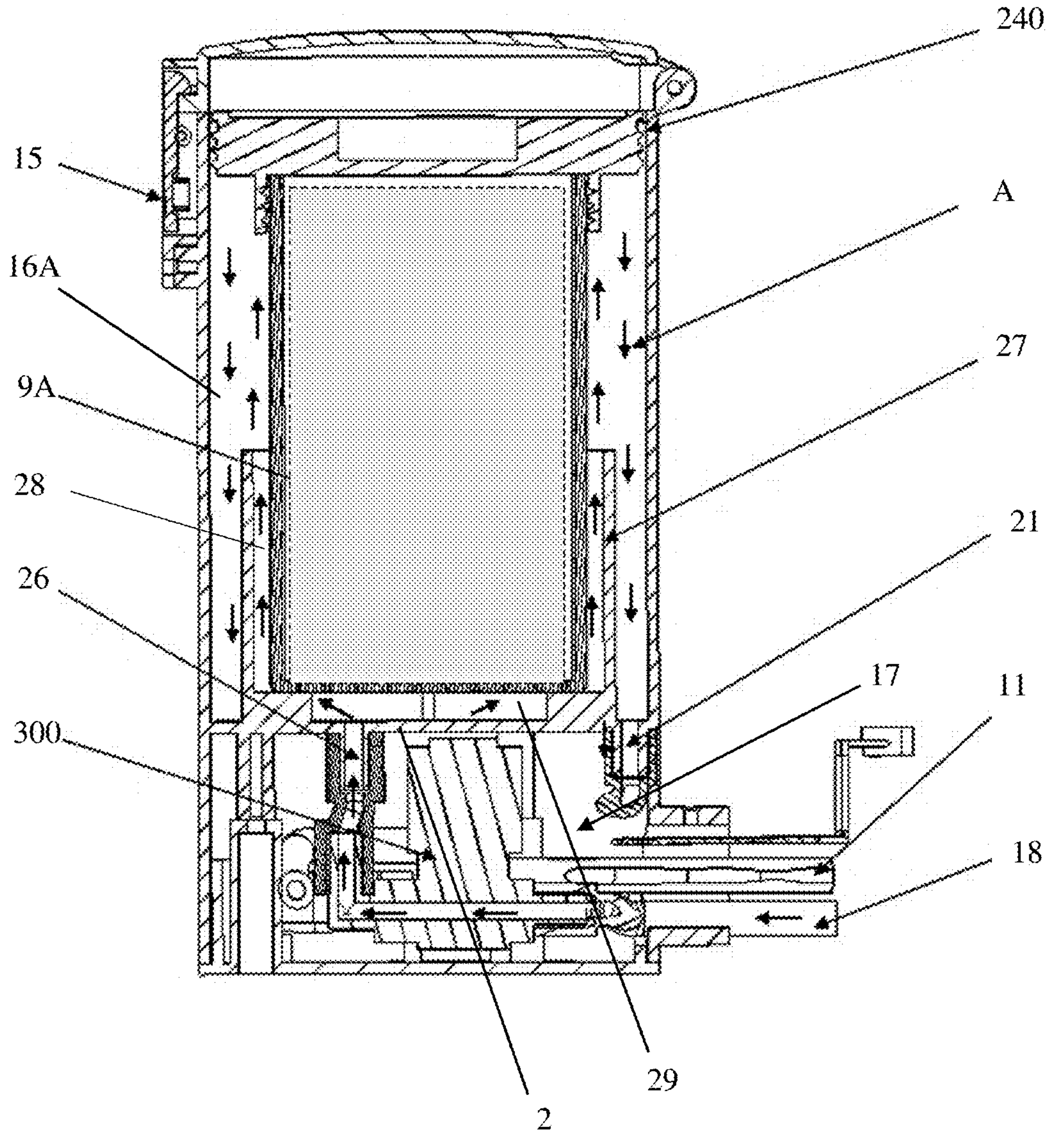
FIG. 17 illustrates, in a sectioned view, a structure of the descaling apparatus of the electronic toilet bidet according to one embodiment of the present disclosure.

FIG. 1 illustrates a structure of a descaling apparatus of an electronic toilet bidet according to one embodiment of the present disclosure. FIG. 16 illustrates, in an exploded view, a structure of the descaling apparatus of the electronic toilet bidet according to one embodiment of the present disclosure. FIG. 17 illustrates, in a sectioned view, a structure of the descaling apparatus of the electronic toilet bidet according to one embodiment of the present disclosure.

As shown in FIGS. 1, 16, and 17, a descaling apparatus of an electronic toilet bidet according to the present disclosure comprises a descaling liquid storage tank 1, a descaling agent storage box 200 configured to house solid descaling agent 9A, a main body liquid outlet 11, and a main body liquid inlet 18. The descaling liquid storage tank 1 comprises a descaling agent chamber 16A. The descaling agent storage box 200 is disposed in the descaling agent chamber 16A. An internal space of the descaling agent storage box 200 is in communication with the descaling agent chamber 16A. The descaling agent chamber 16A comprises a descaling liquid inlet 26 and a descaling liquid outlet 21. An input of the main body liquid outlet 11 is connected to and in communication with the descaling liquid outlet 21. An output of the main body liquid outlet 11 is configured to be connected to and in communication with a bidet liquid inlet of the electronic toilet bidet 5. An input of the main body liquid inlet 18 is configured to be connected to and in communication with an external water supply system. An output of the main body liquid inlet 18 is configured to be controlled by a controlling signal output by a controller of the electronic toilet bidet to connect or disconnect the descaling liquid inlet 26.

Specifically, the descaling agent storage box 200 is disposed and installed in the descaling liquid storage tank 1. The descaling agent storage box 200 is configured to house the solid descaling agent 9A, e.g. citrate solids or other solid descaling agents. The internal space of the descaling agent storage box 200 is in communication with the descaling agent chamber 16A. The descaling liquid inlet 26 and the descaling liquid outlet 21 are disposed in the descaling agent chamber 16A. Thus, clean water from the external water supply system may be conveyed, through the main body liquid inlet 18 and the descaling liquid inlet 26, into the descaling agent chamber 16A via the connection between the output of the main body liquid inlet 18 and the descaling liquid inlet 26. Then, the solid descaling agent 9A is slowly dissolved by the clean water in the descaling agent chamber 16A of to form a saturated descaling solution. The descaling solution is supplied to electronic toilet bidet through the descaling liquid outlet 21 and the main body liquid outlet 11. Accordingly, the descaling apparatus according to the present disclosure may achieve the function of multiple automatic supply of the descaling solution to the electronic toilet bidet by adding the solid descaling agent 9A at one time. The controlling signal output by the controller of the electronic toilet bidet is received by a cable and a terminal 7 communicably coupled to the controller. The main body liquid outlet 11 is connected to and in communication with the bidet liquid inlet via a descaling liquid rubber tube 8 to supply the descaling solution to the electronic toilet bidet 5.

The descaling apparatus according to the present disclosure may, according to an instruction, supply the descaling solution to the internal pipes of the electronic toilet bidet 5 for several times after the solid descaling agent 9A is added at one time and also automatically and continuously dissolved by the clean water. Thus, the descaling apparatus may avoid the lost function of the internal functional modules due to the clogging caused by the accumulation of limescales therein. The descaling apparatus may extend the service life of the modules and improve users' experience with the electronic toilet bidet 5.

As shown in FIG. 17, in one embodiment, the descaling liquid storage tank 1 further comprises a divider 2. The descaling liquid outlet 21 and the descaling liquid inlet 26 are disposed on the divider 2. The divider 2 divides the descaling liquid storage tank 1 into the descaling agent chamber 16A and a liquid discharging chamber 17. The main body liquid inlet 18 is disposed in the liquid discharging chamber 17.

According to the embodiment, the divider 2 divides the descaling liquid storage tank 1 into the descaling agent chamber 16A and the liquid discharging chamber 17. The descaling agent chamber 16A and the liquid discharging chamber 17 may be vertically arranged. For example, the upper portion and the lower portion of the descaling liquid storage tank 1 may be respectively the descaling agent chamber 16A and the liquid discharging chamber 17. However, the descaling agent chamber 16 and the liquid discharging chamber 17 may also be horizontally arranged or inside-outside arranged. For example, the left portion and the right portion of the descaling liquid storage tank 1 may be respectively the descaling agent chamber 16A and the liquid discharging chamber 17. Alternatively, the descaling agent chamber 16A may be a cylinder or cube having the same axis as the descaling liquid storage tank 1. The liquid discharging chamber 17 may be the space between the cylinder or cube and the descaling liquid storage tank 1. The descaling agent chamber 16A houses the descaling agent storage box 200. Other mechanical or electrical elements may be disposed inside or individually outside the liquid discharging chamber 17.

As shown in FIG. 17, in one embodiment, a stream guiding groove 27 is disposed on the divider 2. The descaling agent storage box 200 is disposed in the stream guiding groove 27. The descaling liquid outlet 21 is disposed outside the stream guiding groove 27 and the descaling liquid inlet 26 is disposed outside the stream guiding groove 27.

According to the embodiment, the stream guiding groove 27 isolates the descaling liquid inlet 26 and the descaling liquid outlet 21 to form a liquid inlet stream passage and a liquid outlet stream passage. Thus, a flowing duration of the clean water entering the descaling agent chamber 16A may be increased so that the solid descaling agent 9A may sufficiently contact the clean water to ensure the saturation. The stream guiding groove 27 may not be needed. When no stream guiding groove 27 is added, the internal space of the descaling agent storage box 200 is directly in communication with the descaling agent chamber 16A.

As shown in FIG. 17, in one embodiment, a first gap 28 is disposed between the stream guiding groove 27 and a wall of the descaling agent storage box 200 and in communication with the internal space of the descaling agent storage box 200. A portion of a bottom of the descaling agent storage box 200 contacts the stream guiding groove 27 and a second gap 29. The second gap 29 is disposed between another portion of the bottom of the descaling agent storage box 200 and the divider 2 and in communication with the internal space of the descaling agent storage box 200.

The descaling liquid outlet 21 is in communication with the first gap 28 and the descaling liquid inlet 26 is in communication with the second gap 29. Alternatively, the descaling liquid outlet 21 is in communication with the second gap 29 and the descaling liquid inlet 26 is in communication with the first gap 28.

Specifically, the clean water enters the descaling liquid inlet 26. The descaling agent storage box 200 isolates the first gap 28 and the second gap 29. If the descaling liquid outlet 21 is in communication with the first gap 28 and the descaling liquid inlet 26 is in communication with the second gap 29, the clean water passing through the second gap 29 must also pass through the descaling agent storage box 200. The descaling solution obtained from the dissolved solid descaling agent 9A leaves from the first gap 28 and enters the bidet liquid inlet of the electronic toilet bidet through the descaling liquid outlet 21. If the descaling liquid outlet 21 is in communication with the second gap 29 and the descaling liquid inlet 26 is in communication with the first gap 28, the clean water enters descaling agent storage box 200 through the first gap 28. The descaling solution obtained from the dissolved solid descaling agent 9A leaves from the second gap 29 and enters the bidet liquid inlet of the electronic toilet bidet through the descaling liquid outlet 21.

Figure 18:
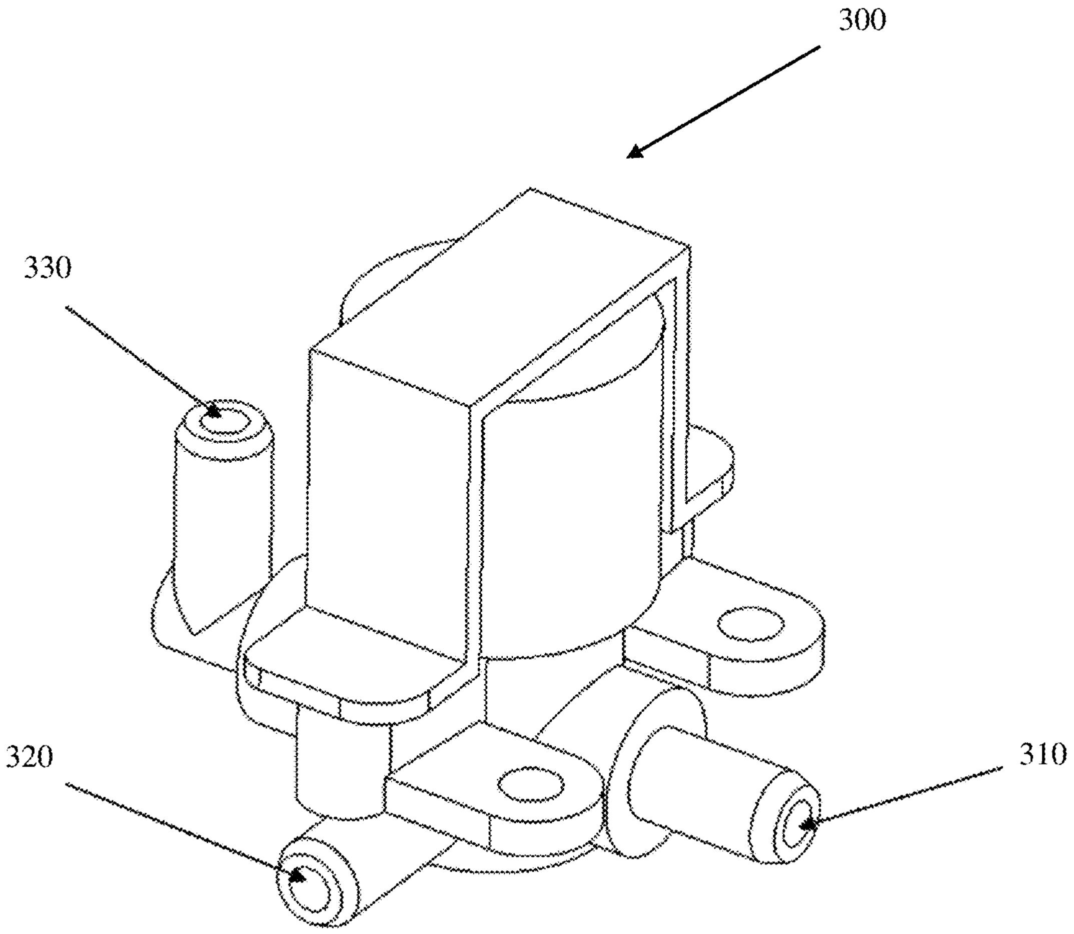
FIG. 18 illustrates a structure of a switching valve of the descaling apparatus of the electronic toilet bidet according to one embodiment of the present disclosure.

As shown in FIG. 18, in one embodiment, the descaling apparatus further comprises a switching valve 300 of the solid descaling agent 9A. The switching valve 300 comprises a switching valve water inlet 310 connected to and in communication with the output of the main body liquid inlet 18. The switching valve 300 further comprises a main water input passage 320 connected to and in communication with the input of the main body liquid outlet 11. The switching valve 300 further comprises a secondary water input passage 330 connected to and in communication with the descaling liquid inlet 26. The switching valve 300 further comprises an electromagnetic on-off valve configured to control a connection or disconnection between the switching valve water inlet 310 and the secondary water input passage 330 according to the controlling signal output by the controller of the electronic toilet bidet 5. The main water input passage 320 is connected to and in communication with the switching valve water inlet 310.

Specifically, the switching valve 300 of the solid descaling agent 9A is preferably a switching electromagnetic valve. The switching valve 300 comprises the switching valve water inlet 310, the main water input passage 320, the secondary water input passage 330, and an electromagnetic on-off valve (not shown in the figures). When the electronic toilet bidet 5 performs a normal flushing function, the switching valve 300 is closed and thus the clean water enters the bidet liquid inlet of the electronic toilet bidet through the switching valve water inlet 310, the main water input passage 320, and the main body liquid outlet 11 in turn. Accordingly, the flushing function is completed.

When the electronic toilet bidet 5 performs a descaling function, the switching valve 300 is opened. A portion of the clean water enters the descaling agent chamber 16A through the secondary water input passage 330 and the descaling liquid inlet 26 in turn while another portion of the clean water enters the main water input passage 320. The solid descaling agent 9A in the descaling agent storage box 200 is dissolved to form the saturated descaling solution. The saturated descaling solution enters the descaling liquid outlet 21 and is mixed with the clean water from the main water input passage 320 at a certain ratio. The mixture then enters the bidet liquid inlet of the electronic toilet bidet through the main body liquid outlet 11 to remove the limescales in the internal pipes of the electronic toilet bidet 5.

The switching valve 300 may be disposed inside or individually outside the liquid discharging chamber 17. In one embodiment, a diameter of the main water input passage 320 is larger than a diameter of the secondary water input passage 330. According to the embodiment, because the diameter of the main water input passage 320 is larger than the diameter of the secondary water input passage 330, the entered clean water creates a pressure and the clean water flowing in the main water input passage 320 creates a vacuum effect. Under these two impacts, the clean water enters the descaling agent chamber 16A of the descaling liquid storage tank 1 through the secondary water input passage 330 and the descaling liquid inlet 26 in turn. The solid descaling agent 9A in the descaling agent storage box 200 is dissolved by the clean water to form the saturated descaling solution, which then leaves the descaling apparatus from the descaling liquid outlet 21.

FIG. 5 illustrates a structure of a descaling system of an electronic toilet bidet according to one embodiment of the present disclosure. FIG. 16 illustrates, in an exploded view, a structure of the descaling apparatus of the electronic toilet bidet according to one embodiment of the present disclosure.

As shown in FIG. 16 and FIG. 5, in one embodiment, the descaling apparatus further comprises a three-way mixing valve 6 comprising a first liquid inlet passage 61, a second liquid inlet passage 62, and a liquid output passage 63. The first liquid inlet passage 61 is connected to and in communication with the descaling liquid outlet 21. The second liquid inlet passage 62 is connected to and in communication with the main water input passage 320. The liquid output passage 63 is connected to and in communication with the input of the main body liquid outlet 11. According to the embodiment, the clean water from the main water input passage 320 is mixed, by the three-way mixing valve 6, with the saturated descaling solution from the descaling liquid outlet 21 at a certain ratio. The mixture then enters the bidet liquid inlet of the electronic toilet bidet through the main body liquid outlet 11 to remove the limescales in the internal pipes of the electronic toilet bidet 5.

In one embodiment, the diameter $D_1$ of the second liquid inlet passage 62 is larger than the diameter $D_2$ of the first liquid inlet passage 61. According to the embodiment, only a small amount of the descaling liquid is needed to fill in the internal pipes of the electronic toilet bidet 5. The clean water from the main water input passage 320 is mixed, by the three-way mixing valve 6, with the saturated descaling solution from the descaling liquid outlet 21 at a certain ratio. The diameter $D_1$ of the second liquid inlet passage 62 is larger than the diameter $D_2$ of the first liquid inlet passage 61. Thus, this reduces the amount of the descaling liquid needed for removing the limescales every time. Accordingly, the descaling apparatus according to the present disclosure may achieve the function of multiple automatic supply of the descaling solution to the electronic toilet bidet by adding the solid descaling agent 9A to the descaling agent storage box 200 at one time. The mixing ratio of the clean water from the main water input passage 320 to the saturated descaling solution from the descaling liquid outlet 21 may be adjusted by changing the diameter ratio of the second liquid inlet passage 62 to the first liquid inlet passage 61, e.g. 10:1.

Figure 23:
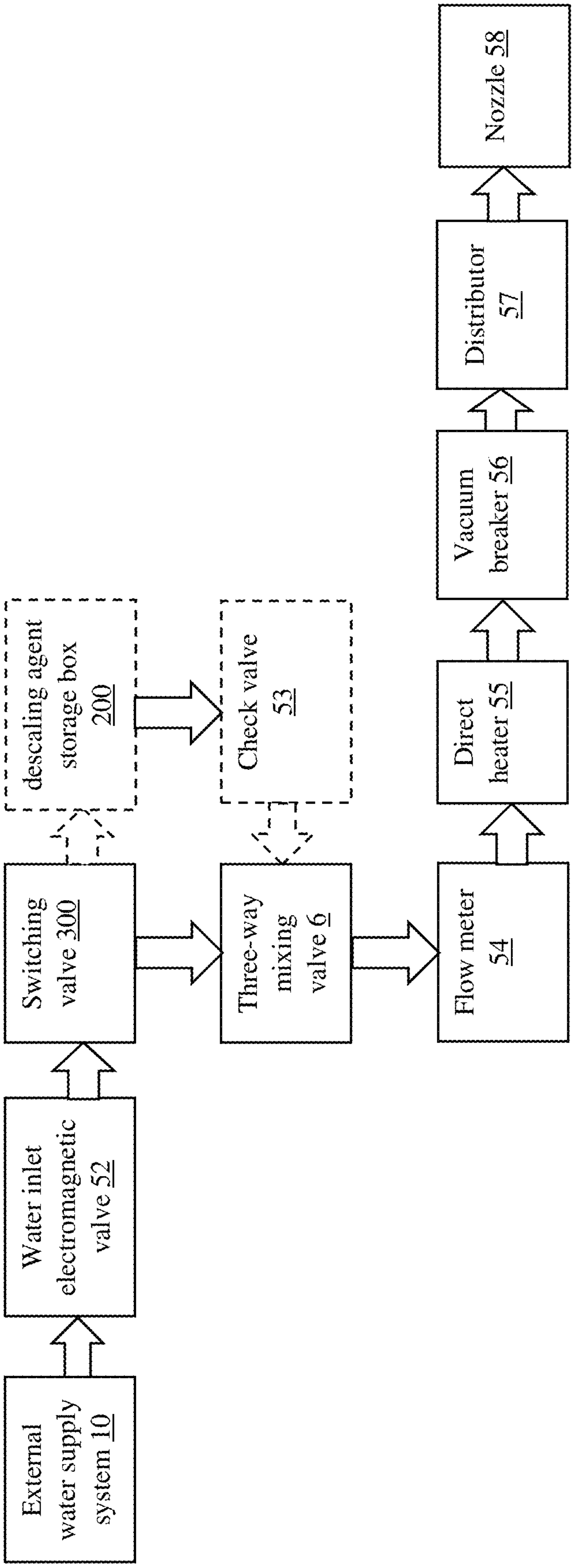
FIG. 23 illustrates a schematic diagram of the descaling system when the descaling function is closed according to one embodiment of the present disclosure.
Figure 24:
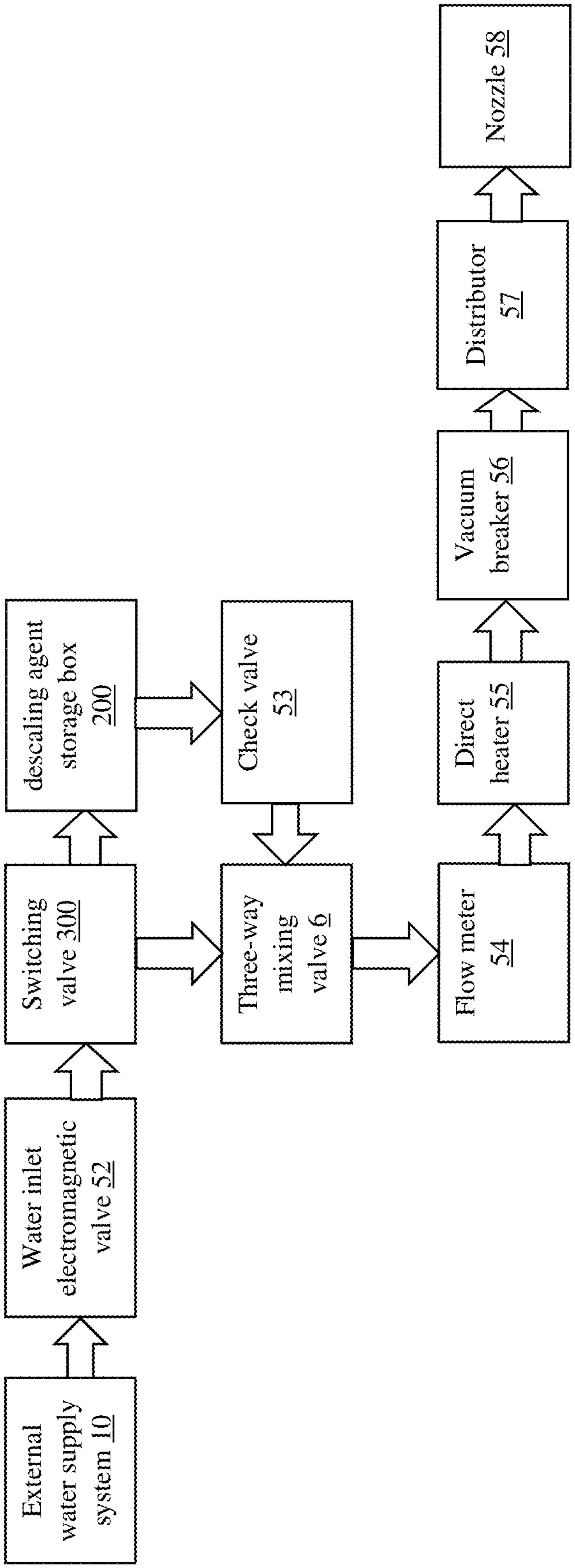
FIG. 24 illustrates a schematic diagram of the descaling system when the descaling function is opened according to one embodiment of the present disclosure.

FIG. 23 illustrates a schematic diagram of the descaling system when the descaling function is closed according to one embodiment of the present disclosure. FIG. 24 illustrates a schematic diagram of the descaling system when the descaling function is opened according to one embodiment of the present disclosure.

In one embodiment, the descaling liquid outlet 21 is connected to and in communication with the first liquid inlet passage 61 via a check valve 53 (as shown in FIG. 23 and FIG. 24). The check valve 53 is configured to prevent the clean water flushed by the electronic toilet bidet 5 from flowing backwards into the descaling agent chamber 16A.

Figure 19:
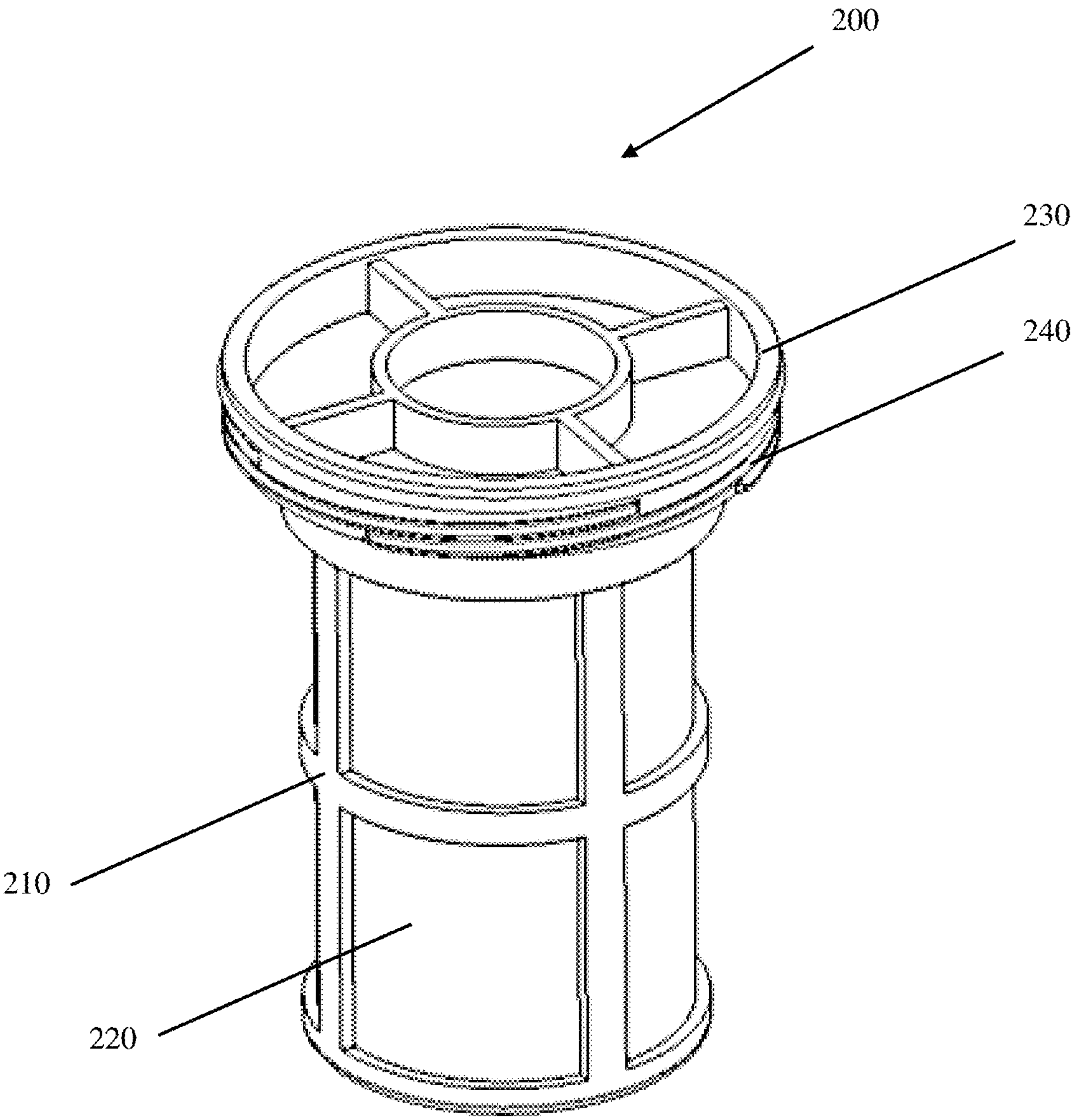
FIG. 19 illustrates a descaling agent storage box, in a closed state, of the descaling apparatus of the electronic toilet bidet according to one embodiment of the present disclosure.
Figure 21:
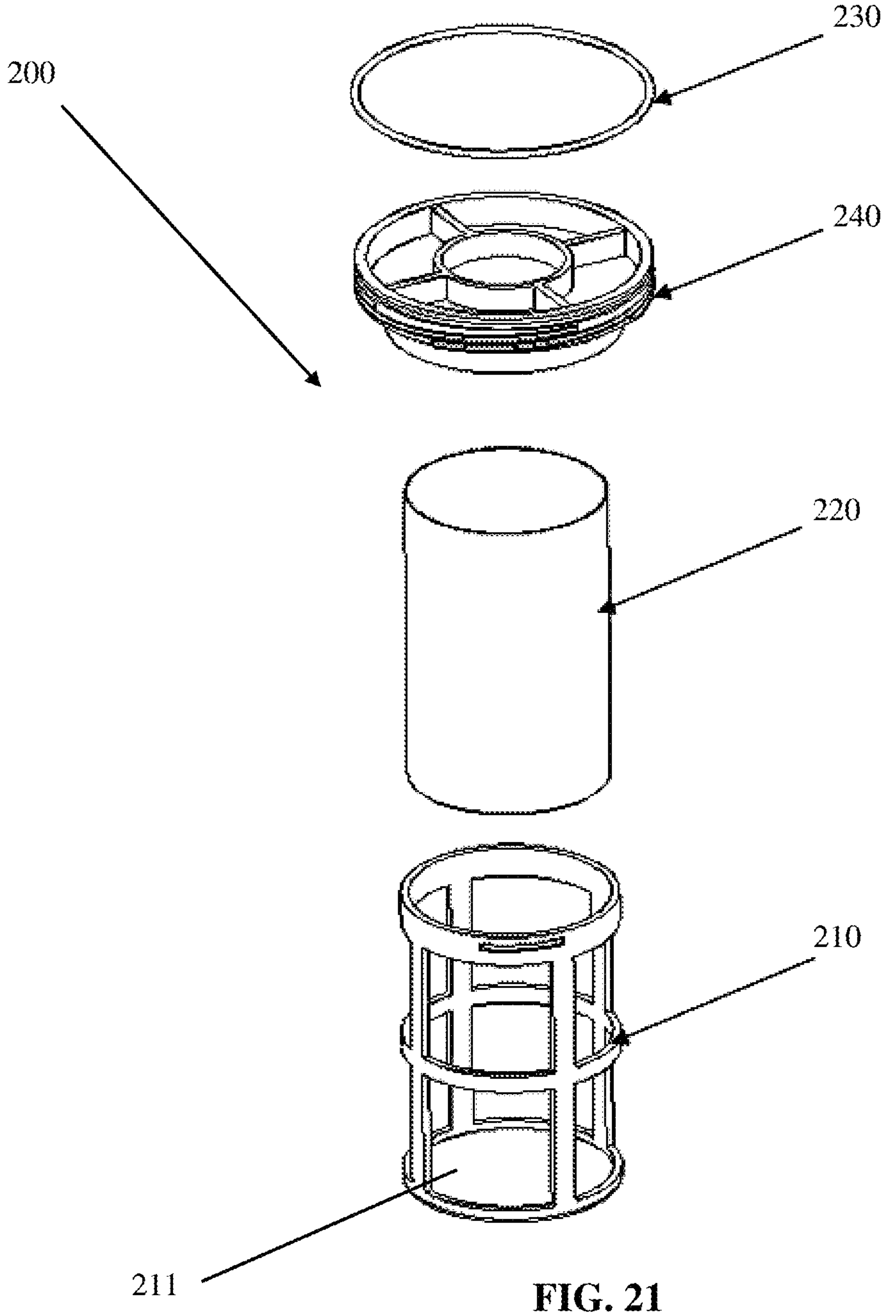
FIG. 21 illustrates, in an explosive view, the descaling agent storage box of the descaling apparatus of the electronic toilet bidet according to one embodiment of the present disclosure.

FIG. 19 illustrates a descaling agent storage box, in a closed state, of the descaling apparatus of the electronic toilet bidet according to one embodiment of the present disclosure. FIG. 21 illustrates, in an explosive view, the descaling agent storage box of the descaling apparatus of the electronic toilet bidet according to one embodiment of the present disclosure.

Figure 20:
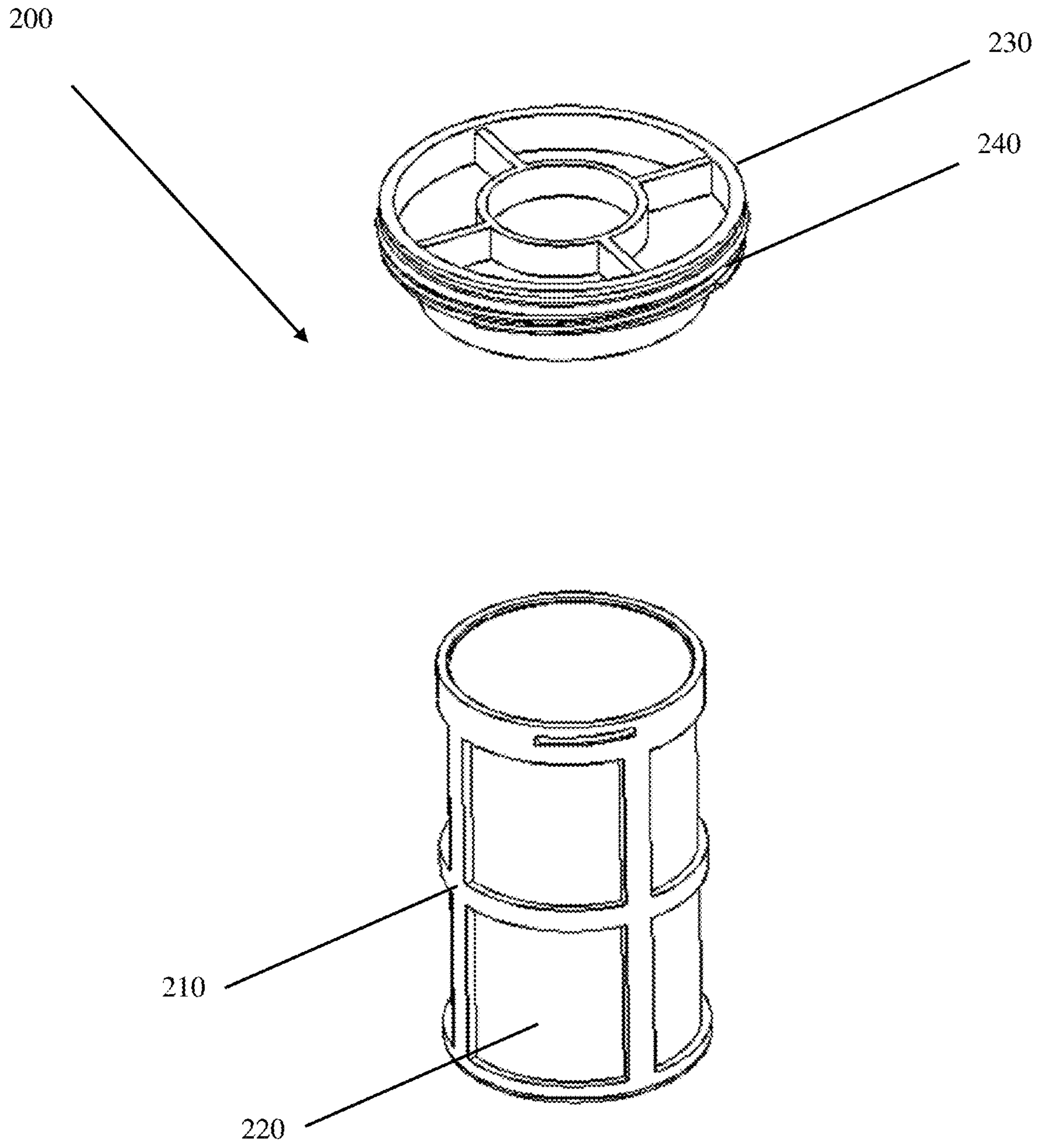
FIG. 20 illustrates the descaling agent storage box, in an opened state, of the descaling apparatus of the electronic toilet bidet according to one embodiment of the present disclosure.

As shown in FIG. 19 to FIG. 21, in one embodiment, the descaling agent storage box 200 comprises a box frame 210, a box screen mesh 220, and a box upper lid 230. The box frame 210 comprises multiple through holes 250. The box screen mesh 220 is disposed in the box frame 210. The box upper lid 230 is disposed on the box frame 210 and configured to open and close the descaling agent storage box 200. According to the embodiment, the box screen mesh 210 forms a wall of the descaling agent storage box 200. The box screen mesh 220 is fine enough to prevent the undissolved solid descaling agent 9A from entering the clean water. The box screen mesh 220 also allows the solid descaling agent 9A to be slowly dissolved by the clean water to form a saturated descaling solution between the descaling agent storage box 200 and a wall of the descaling liquid storage tank 1. When the descaling function is opened, the saturated descaling solution is squeezed out of the descaling agent storage box 200 by the clean water entering the descaling agent storage box 200 from the secondary water input passage 330. The squeezed-out saturated descaling solution is then used to remove the limescales. The box upper lid 230 may cover or uncover the box frame 210 through a rotation of the box upper lid 230 or a buckle. The solid descaling agent 9A may be added to the box frame 210 after the box upper lid 230 is opened. For users' convenience and safety, the descaling agent storage box 200 with the added solid descaling agent 9A may be sold to the users as a standard accessory. In one embodiment, a box sealing ring 240 is disposed between the upper lid 230 and the descaling liquid storage tank 1. According to the embodiment, the box sealing ring 240 is configured to seal the upper lid 230 and the descaling liquid storage tank 1 together (as shown in FIG. 17).

As shown in FIG. 1, in one embodiment, the descaling liquid storage tank 1 further comprises a base 12, a shell 13 disposed on the base 12 and having an upward opening, and an outer lid 14 configured to open or close the opening of the shell 13. A main body connector 131 is disposed on the shell 13. The main body liquid outlet 11 passes through and extends from an inner space of the main body connector 131. The main body connector 131 is configured to be fixed on the electronic toilet bidet 5 and protect the main body liquid outlet 11. In one embodiment, the main body liquid inlet 18 passes through and extends from an inner space of the main body connector 131. According to the embodiment, the main body liquid inlet 18 is connected to the electronic toilet bidet 5. The external water supply system, connected to the electronic toilet bidet 5, supplies the clean water to the main body liquid inlet 18.

As shown in FIG. 1 and FIG. 16, in one embodiment, the descaling liquid storage tank 1 further comprises a self-locking element 15. The self-locking element 15 is disposed on the shell 13 and configured to lock or unlock the outer lid 14. Please refer to FIG. 2 and the above description of Example 1 for the specific structure and operation of the self-locking element 15. Specifically, when the descaling liquid is exhausted, a certain amount of the solid descaling agent 9A may be added to the descaling liquid storage tank 1 by opening the self-locking element 15 and the outer lid 14. According to the embodiment, the self-locking element 15 disposed on the outer lid 14 may prevent children from opening the descaling apparatus. Thus, this may avoid any injuries to the children caused by the leakage of the descaling liquid.

As shown in FIG. 9, a descaling system of an electronic toilet bidet according to the present disclosure comprises an electronic toilet bidet 5 and the foregoing descaling apparatus. The descaling apparatus is fixed on the electronic toilet bidet 5. The electronic toilet bidet 5 comprises a bidet main body, a bidet main body pipe housed in the bidet main body, and a controller disposed on the bidet main body. One end of the bidet main body pipe is connected to and in communication with a bidet liquid inlet of the electronic toilet bidet 5. The other end of the bidet main body pipe is connected to and in communication with a water output element, preferably a nozzle 58 (as shown in FIG. 1 and FIG. 24).

An input of the main body liquid outlet 11 is connected to and in communication with a descaling liquid outlet 21. An output of the main body liquid outlet 11 is connected to and in communication with the bidet liquid inlet of the electronic toilet bidet. An input of the main body liquid inlet 18 is connected to and in communication with an external water supply system. An output of the main body liquid inlet 18 is controlled by a controlling signal output by a controller of the electronic toilet bidet to connect or disconnect a descaling liquid inlet 26.

Specifically, as shown in FIG. 1 and FIG. 9, the descaling apparatus is fixed on the electronic toilet bidet 5. The descaling apparatus is communicably coupled to the controller of the electronic toilet bidet 5 via a cable and a terminal 7 to receive an on-off instruction. The main body liquid outlet 11 is connected to and in communication with the bidet liquid inlet via a descaling liquid rubber tube 8 to supply descaling solution to the electronic toilet bidet 5.

The descaling apparatus according to the present disclosure may, according to an instruction, supply the descaling solution to the internal pipes of the electronic toilet bidet 5 for several times after the solid descaling agent 9A is added at one time and also automatically and continuously dissolved by the clean water. Thus, the descaling apparatus may avoid the lost function of the internal functional modules due to the clogging caused by the accumulation of limescales therein. The descaling apparatus may extend the service life of the modules and improve users' experience with the electronic toilet bidet 5.

As shown in FIG. 18, in one embodiment, the descaling apparatus further comprises a switching valve 300 of the solid descaling agent 9A. The switching valve 300 comprises a switching valve water inlet 310 connected to and in communication with the output of the main body liquid inlet 18. The switching valve 300 further comprises a main water input passage 320 connected to and in communication with the input of the main body liquid outlet 11. The switching valve 300 further comprises a secondary water input passage 330 connected to and in communication with the descaling liquid inlet 26. The switching valve 300 further comprises an electromagnetic on-off valve configured to control a connection or disconnection between the switching valve water inlet 310 and the secondary water input passage 330 according to the controlling signal output by the controller of the electronic toilet bidet. The main water input passage 320 is connected to and in communication with the switching valve water inlet 310.

As shown in FIG. 1, in one embodiment, the descaling liquid storage tank 1 further comprises a base 12, a shell 13 disposed on the base 12 and having an upward opening, and an outer lid 14 configured to open or close the opening of the shell 13. A main body connector 131 is disposed on the shell 13. The electronic toilet bidet 5 comprises a fixing base 51 connected to the main body connector 131. The main body liquid outlet 11 passes through and extends from an inner space of the main body connector 131 and is connected to the bidet liquid inlet via the fixing base 51. Preferably, the descaling apparatus is disposed on the side of the bidet main body. The main body connector 131 is fixedly connected to the fixing base 51 at a bidet upper lid of the electronic toilet bidet 5. The cable, the terminal 7, and the descaling liquid rubber tube 8 of the descaling apparatus are connected to the internal elements of the electronic toilet bidet 5 via the main body connector 131 and the fixing base 51.

In one embodiment, the electronic toilet bidet 5 comprises the bidet liquid inlet configured to connect an external water supply system. The main body liquid inlet 18 passes through and extends from an inner space of the main body connector 131 and is connected to the bidet liquid inlet via the fixing base 51. According to the embodiment, the main body liquid inlet 18 is connected to the electronic toilet bidet 5. The external water supply system, connected to the electronic toilet bidet 5, supplies the clean water to the main body liquid inlet 18.

In one embodiment, the descaling system further comprises a water inlet electromagnetic valve 52 configured to control the connection or disconnection between the bidet liquid inlet of the electronic toilet bidet 5 and the external water supply system. The water inlet electromagnetic valve 52 is communicably coupled to the controller. According to the embodiment, the descaling apparatus is disposed behind the water inlet electromagnetic valve 52. Thus, the descaling solution is prevented from flowing backwards to pollute the external water supply system.

Figure 22:
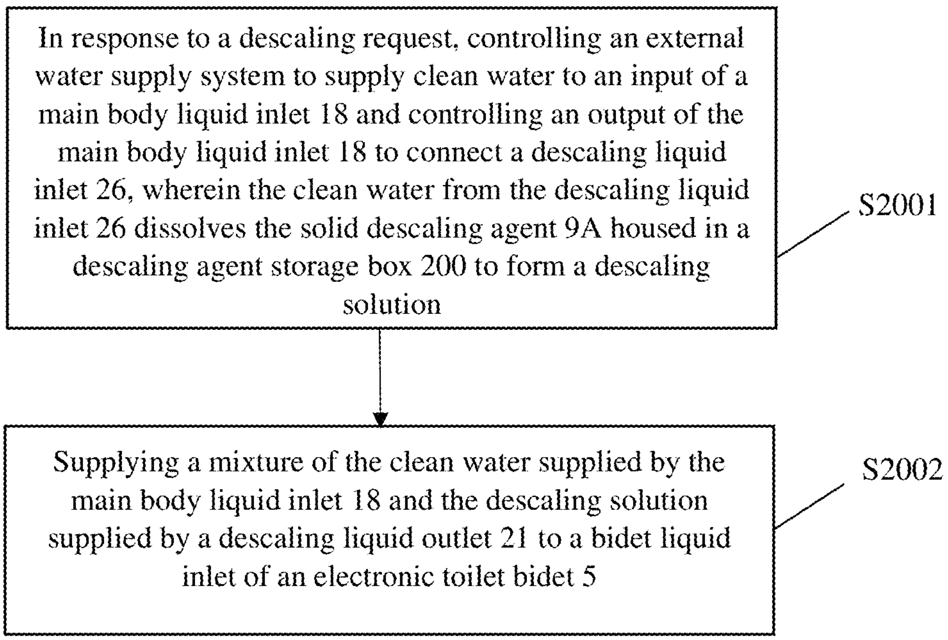
FIG. 22 illustrates a flow chart of a descaling method according to one embodiment of the present disclosure.

FIG. 22 is a flow chart illustrating a descaling method by using the foregoing descaling system of an electronic toilet bidet according to the present disclosure. The descaling method comprises:

In the step S2001, the controller controls, in response to a descaling request, the external water supply system to supply the clean water to the input of the main body liquid inlet 18. The controller further controls, in response to the descaling request, the output of the main body liquid inlet 18 to be connected to and in communication with the descaling liquid inlet 26. The clean water from the descaling liquid inlet 26 dissolves the solid descaling agent 9A in the descaling agent storage box 200 to form a descaling solution.

In the step S2002, a mixture of the clean water supplied by the main body liquid inlet 18 and the descaling solution supplied by the descaling liquid outlet 21 is supplied to the bidet liquid inlet of the electronic toilet bidet 5.

Specifically, when the descaling function is opened, in step S2001, the controller controls the external water supply system to supply the clean water to the input of the main body liquid inlet 18. The controller further controls the output of the main body liquid inlet 18 to be connected to and in communication with the descaling liquid inlet 26. The clean water from the external water supply system enters the main body liquid inlet 18, the descaling liquid inlet 26, and the descaling agent chamber 16A to slowly dissolve the solid descaling agent to form a saturated descaling solution. In step S2002, the clean water supplied by the main body liquid inlet 18 and the saturated descaling solution are mixed at the descaling liquid outlet 21. The mixture is supplied to the bidet liquid inlet of the electronic toilet bidet 5.

In one embodiment, the descaling method further comprises: the controller controls, in response to a flushing request, the external water supply system to supply the clean water to the input of the main body liquid inlet 18. The controller further controls, in response to the flushing request, the output of the main body liquid inlet 18 to be disconnected to the descaling liquid inlet 26. The clean water supplied by the main body liquid inlet 18 supplied to the bidet liquid inlet of the electronic toilet bidet 5.

In one embodiment, as shown in FIG. 24, a descaling system comprises an electronic toilet bidet 5 and a descaling apparatus fixed on the electronic toilet bidet 5. The electronic toilet bidet 5 comprises a bidet main body, a bidet main body pipe housed in the bidet main body, and a controller disposed on the bidet main body. One end of the bidet main body pipe is connected to and in communication with a bidet liquid inlet of the electronic toilet bidet 5. The other end of the bidet main body pipe is connected to and in communication with a nozzle 58, via a flowmeter 54, a direct heater 55, a vacuum breaker 56, and a distributor 57.

The descaling apparatus comprises a descaling liquid storage tank 1, a descaling agent storage box 200 configured to house solid descaling agent 9A, a switching valve 300 of the solid descaling agent 9A, a three-way mixing valve 6, a main body liquid outlet 11, and a main body liquid inlet 18. The descaling liquid storage tank 1 comprises a descaling agent chamber 16A. The descaling agent storage box 200 is disposed in the descaling agent chamber 16A. An internal space of the descaling agent storage box 200 is in communication with the descaling agent chamber 16A. The descaling agent chamber 16A comprises a descaling liquid inlet 26 and a descaling liquid outlet 21. An input of the main body liquid outlet 11 is connected to and in communication with the descaling liquid outlet 21 and an output of the main body liquid inlet 18 via the three-way mixing valve 6. An output of the main body liquid outlet 11 is connected to and in communication with a bidet liquid inlet of the electronic toilet bidet 5 via a descaling liquid rubber tube 8. An input of the main body liquid inlet 18 is connected to and in communication with an external water supply system. The switching valve 300 is communicably coupled to a controller to control a connection or disconnection between the output of the main body liquid inlet 18 and the descaling liquid inlet 26.

The descaling liquid storage tank 1 further comprises a divider 2. The descaling liquid outlet 21 and the descaling liquid inlet 26 are disposed on the divider 2. The divider 2 divides the descaling liquid storage tank 1 into the descaling agent chamber 16A and a liquid discharging chamber 17. The main body liquid inlet 18 is disposed in the liquid discharging chamber 17. A stream guiding groove 27 surrounding the descaling agent storage box 200 is disposed on the divider 2. The descaling liquid outlet 21 is disposed outside the stream guiding groove 27 and the descaling liquid inlet 26 is disposed outside the stream guiding groove 27. A first gap 28 is disposed between the stream guiding groove 27 and a wall of the descaling agent storage box 200 and in communication with the internal space of the descaling agent storage box 200. A portion of a bottom of the descaling agent storage box 200 contacts the stream guiding groove 27 and a second gap 29. The second gap 29 is disposed between another portion of the bottom of the descaling agent storage box 200 and the divider 2 and in communication with the internal space of the descaling agent storage box 200. The descaling liquid outlet 21 is in communication with the first gap 28 and the descaling liquid inlet 26 is in communication with the second gap 29.

The switching valve 300 comprises a switching valve water inlet 310 connected to and in communication with the output of the main body liquid inlet 18. The switching valve 300 further comprises a main water input passage 320 connected to and in communication with the input of the main body liquid outlet 11. The switching valve 300 further comprises a secondary water input passage 330 connected to and in communication with the descaling liquid inlet 26 via an internal input pipe 22 (as shown in FIG. 16). The switching valve 300 further comprises an electromagnetic on-off valve configured to control a connection or disconnection between the switching valve water inlet 310 and the secondary water input passage 330 according to the controlling signal output by the controller of the electronic toilet bidet 5. The main water input passage 320 is connected to and in communication with the switching valve water inlet 310. A diameter of the main water input passage 320 is larger than a diameter of the secondary water input passage 330. The switching valve 300 is communicably coupled to the controller of the electronic toilet bidet 5 via a PCB assembly 340 (Printed Circuit Board Assembly, "PCBA"), a cable, and the terminal 7.

The three-way mixing valve 6 comprising a first liquid inlet passage 61, a second liquid inlet passage 62, and a liquid output passage 63. The descaling liquid outlet 21 is connected to and in communication with the first liquid inlet passage 61 of the three-way mixing valve 6 via an internal output pipe 23, a check valve 53, and a connecting pipe 350. The second liquid inlet passage 62 is connected to and in communication with the main water input passage 320. The liquid output passage 63 is connected to and in communication with the input of the main body liquid outlet 11. A diameter of the second liquid inlet passage 62 is larger than a diameter of the first liquid inlet passage 61.

FIG. 19 illustrates a descaling agent storage box, in a closed state, of the descaling apparatus of the electronic toilet bidet according to one embodiment of the present disclosure. FIG. 20 illustrates the descaling agent storage box, in an opened state, of the descaling apparatus of the electronic toilet bidet according to one embodiment of the present disclosure. FIG. 21 illustrates, in an explosive view, the descaling agent storage box of the descaling apparatus of the electronic toilet bidet according to one embodiment of the present disclosure.

As shown in FIG. 19 to FIG. 21, the descaling agent storage box 200 comprises a box frame 210, a box screen mesh 220, and a box upper lid 230. The box frame 210 comprises multiple through holes 250. The box screen mesh 220 is disposed in the box frame 210. The box upper lid 230 is disposed on the box frame 210 and configured to open and close the descaling agent storage box 200. A box sealing ring 240 is disposed between the upper lid 230 and the descaling liquid storage tank 1 (as shown in FIG. 17).

The descaling liquid storage tank 1 further comprises a base 12, a shell 13 disposed on the base 12 and having an upward opening, an outer lid 14 configured to open or close the opening of the shell 13, and a self-locking element 15 disposed on the shell 13 and configured to lock or unlock the outer lid 14. A main body connector 131 is disposed on the shell 13.

The electronic toilet bidet 5 comprises a fixing base 51 connected to the main body connector 131. The main body liquid outlet 11 passes through and extends from an inner space of the main body connector 131 and is connected to the bidet liquid inlet via the fixing base 51 to connect the bidet liquid inlet of the electronic toilet bidet 5. The descaling system further comprises a water inlet electromagnetic valve 52 disposed on the electronic toilet bidet 5. The water inlet electromagnetic valve 52 is configured to control the connection or disconnection between the bidet liquid inlet of the electronic toilet bidet 5 and the external water supply system. The main body liquid inlet 18 passes through and extends from an inner space of the main body connector 131 to connect the external water supply system.

Specifically, the descaling agent storage box 200 is disposed and installed in the descaling liquid storage tank 1. The descaling agent storage box 200 is configured to house the solid descaling agent 9A, e.g. citrate solids or other solid descaling agents. The solid descaling agent 9A is slowly dissolved by the clean water to form a saturated descaling solution.

The descaling agent storage box 200 may be screwed into or screwed out of the descaling liquid storage tank 1. The descaling agent storage box 200 may be sealed. The solid descaling agent 9A may be added to the descaling agent storage box 200 after the box upper lid 230 is opened. Then, the box upper lid 230 is securely closed. For users' convenience and safety, the descaling agent storage box 200 with the added solid descaling agent 9A may be sold to the users as a standard accessory.

The switching valve 300 is disposed at the bottom of the descaling liquid storage tank 1. The switching valve 300 is an electromagnetic valve and disposed behind the water inlet electromagnetic valve 52. The switching valve 300 comprises a switching valve water inlet 310, a main water input passage 320, a secondary water input passage 330, and an electromagnetic on-off valve. When the electronic toilet bidet 5 performs a normal flushing function, the switching valve 300 is closed and thus the clean water enters the bidet liquid inlet of the electronic toilet bidet through the switching valve water inlet 310, the main water input passage 320, and the main body liquid outlet 11 in turn. The clean water also reaches a nozzle 58 through a flow meter 54, a direct heater 55, a vacuum breaker 56, and a distributor 57 to complete the flushing function.

When the electronic toilet bidet 5 performs a descaling function, the switching valve 300 is opened. A portion of the clean water enters the bottom of the descaling agent chamber 16A through the secondary water input passage 330 and the descaling liquid inlet 26 in turn while another portion of the clean water enters the main water input passage 320. Because a diameter of the main water input passage 320 is larger than a diameter of the secondary water input passage 330, the entered clean water creates a pressure and the clean water flowing in the main water input passage 320 creates a vacuum effect. Under these two impacts, the clean water enters the descaling agent chamber 16A of the descaling liquid storage tank 1 through the secondary water input passage 330 and the descaling liquid inlet 26 at the bottom of the descaling liquid chamber 16 in turn. Along the stream guiding groove 27 surrounding the descaling agent storage box 200, the clean water flows upwards to the top of the descaling agent storage box 200. Then, the clean water flows downwards to the descaling liquid outlet 21 (along the direction A as shown in FIG. 17). Thus, the saturated descaling solution is squeezed out. The clean water from the main water input passage 320 is mixed, by the three-way mixing valve 6, with the squeezed-out saturated descaling solution from the descaling liquid outlet 21 at a certain ratio. The mixture then enters the bidet liquid inlet of the electronic toilet bidet through the main body liquid outlet 11 to remove the limescales in the internal pipes of the electronic toilet bidet 5.

The mixing ratio of the clean water to the saturated descaling solution may be adjusted by changing the diameter ratio of the main water input passage 320 to secondary water input passage 330 of the switching valve 300, or by changing the diameter of the saturated descaling solution input (e.g. the first liquid inlet passage 61) of the three-way mixing valve 6. The descaling agent storage box 200 is configured to house the solid descaling agent 9A, e.g. citrate solids or other solid descaling agents.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

Example 5

Figure 25:
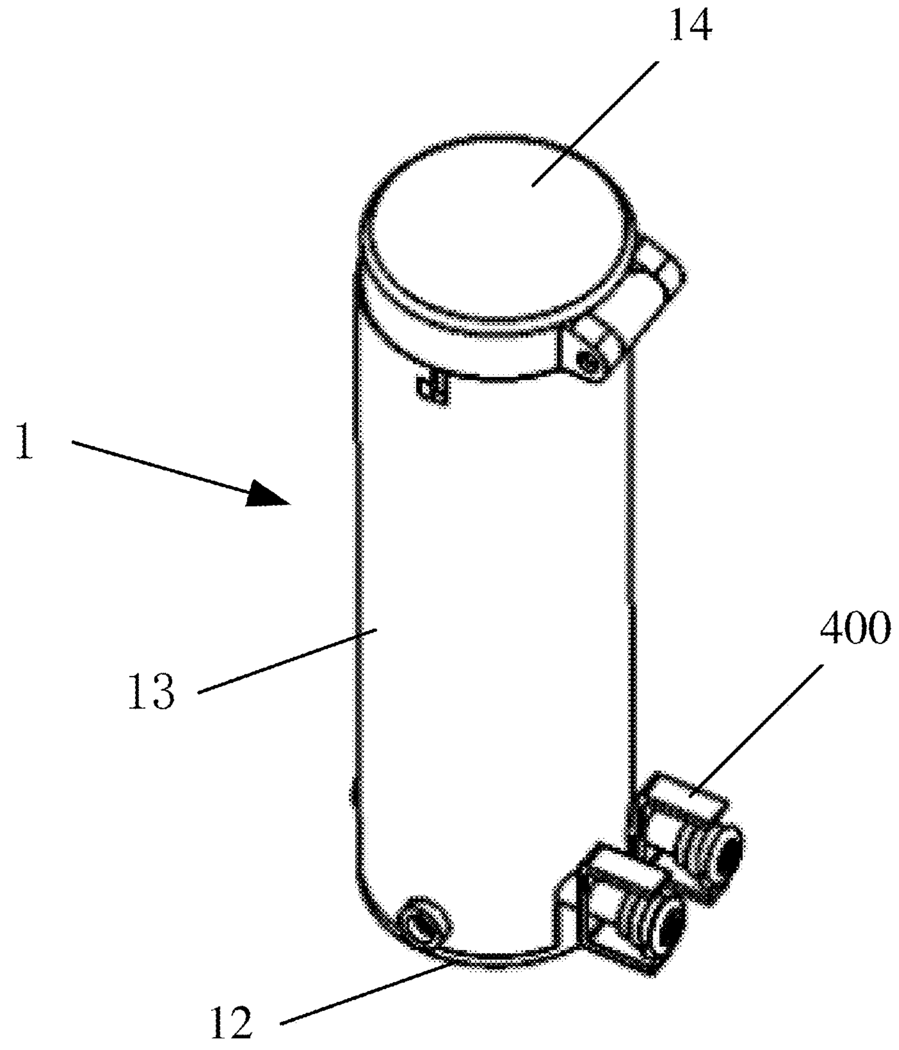
FIG. 25 illustrates a structure of a descaling apparatus of an electronic toilet bidet according to one embodiment of the present disclosure.
Figure 26:
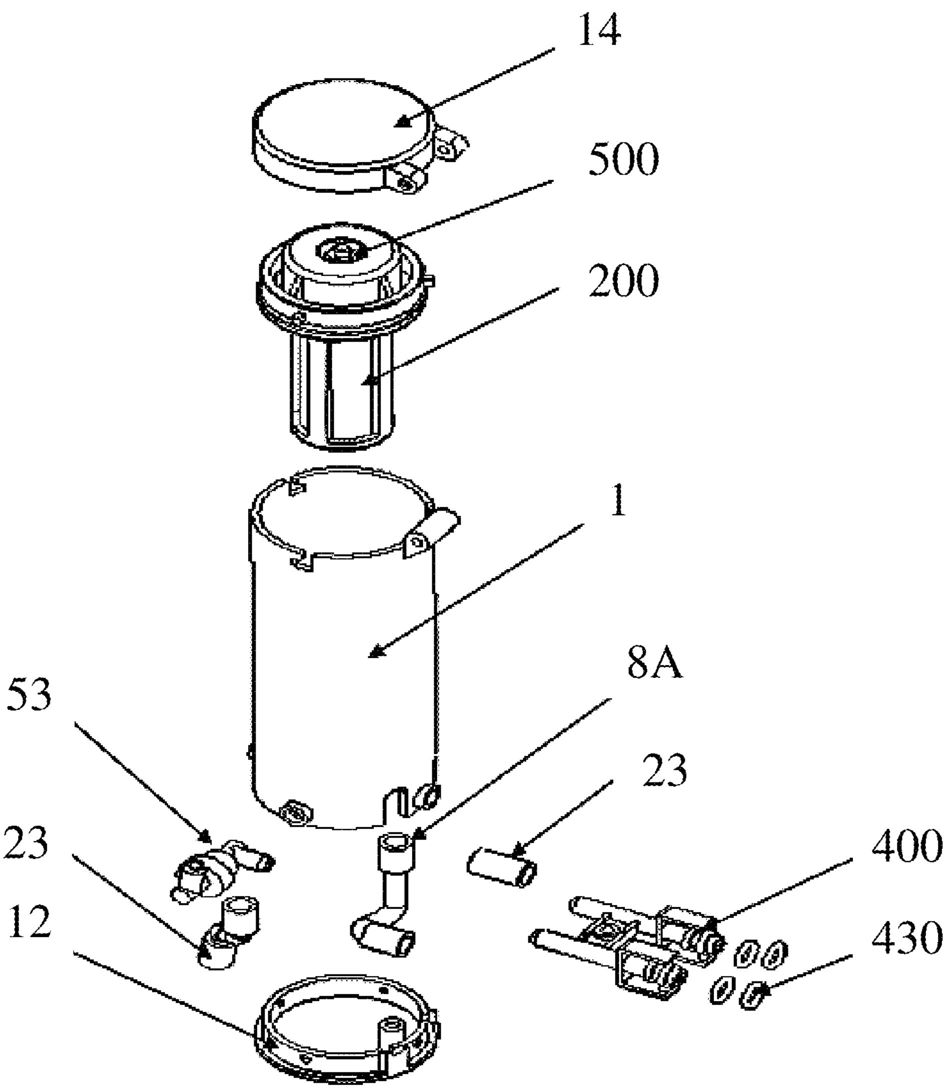
FIG. 26 illustrates, in an exploded view, a structure of the descaling apparatus of the electronic toilet bidet according to one embodiment of the present disclosure.
Figure 27:
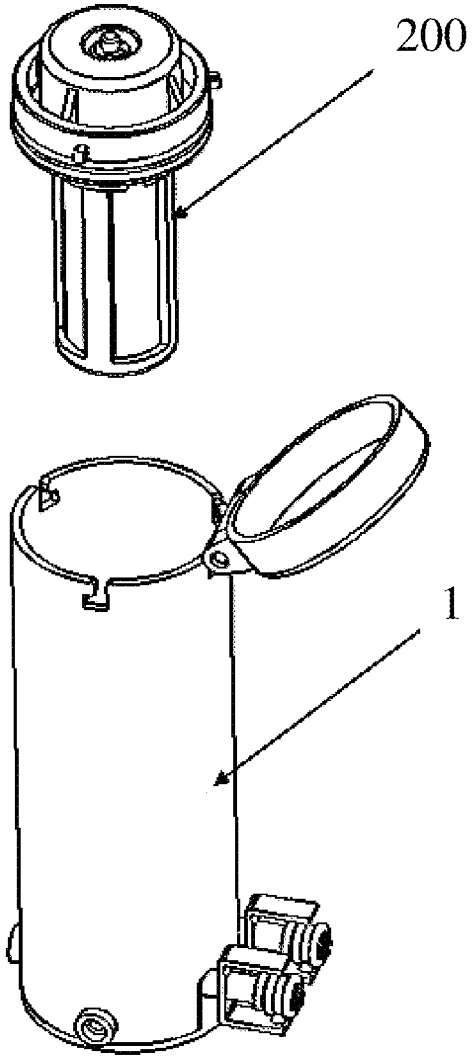
FIG. 27 illustrates a state when a descaling agent storage box of the descaling apparatus of the electronic toilet bidet is taken out according to one embodiment of the present disclosure.
Figure 28:
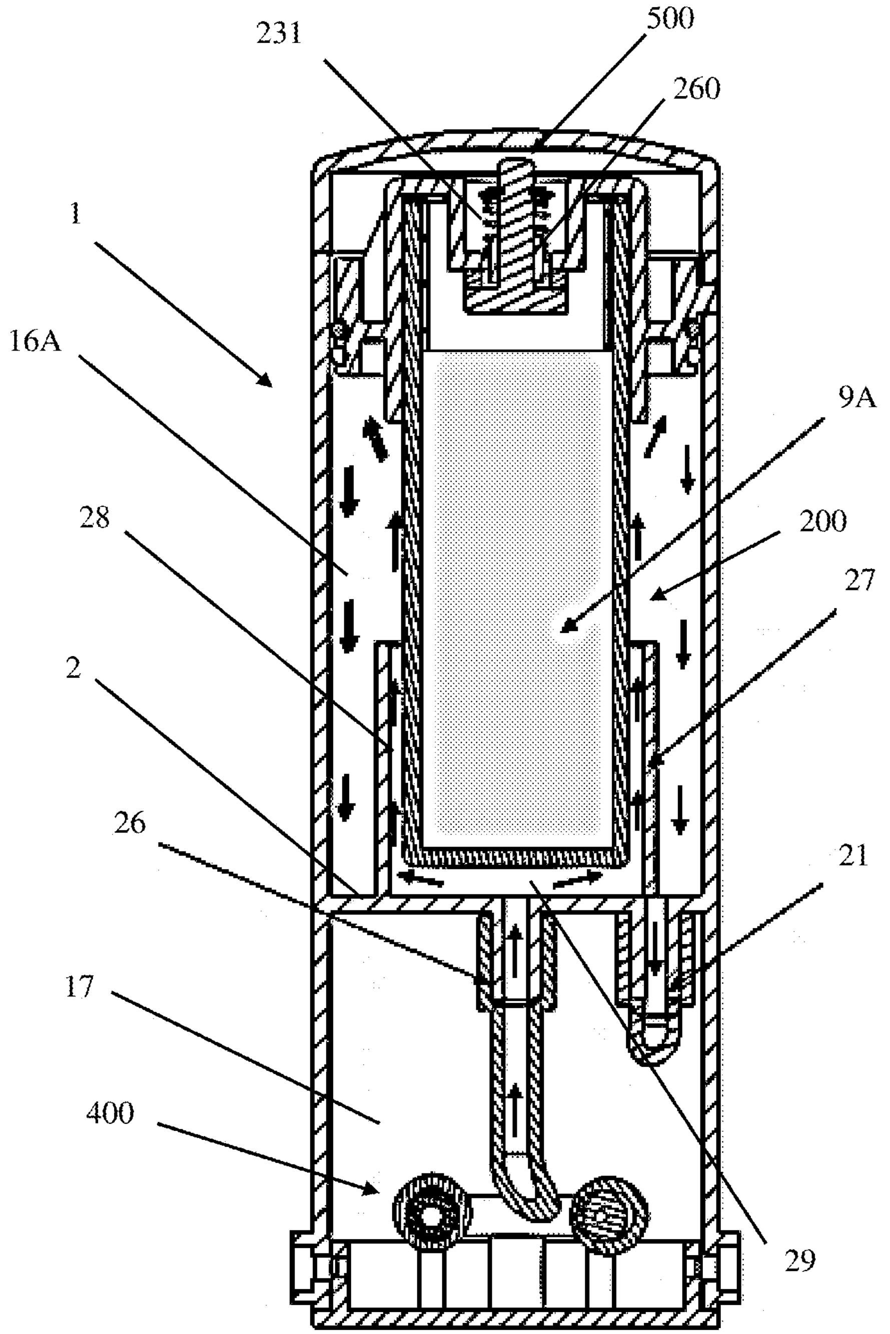
FIG. 28 illustrates, in a sectioned view, a structure of the descaling apparatus of the electronic toilet bidet according to one embodiment of the present disclosure.
Figure 29:
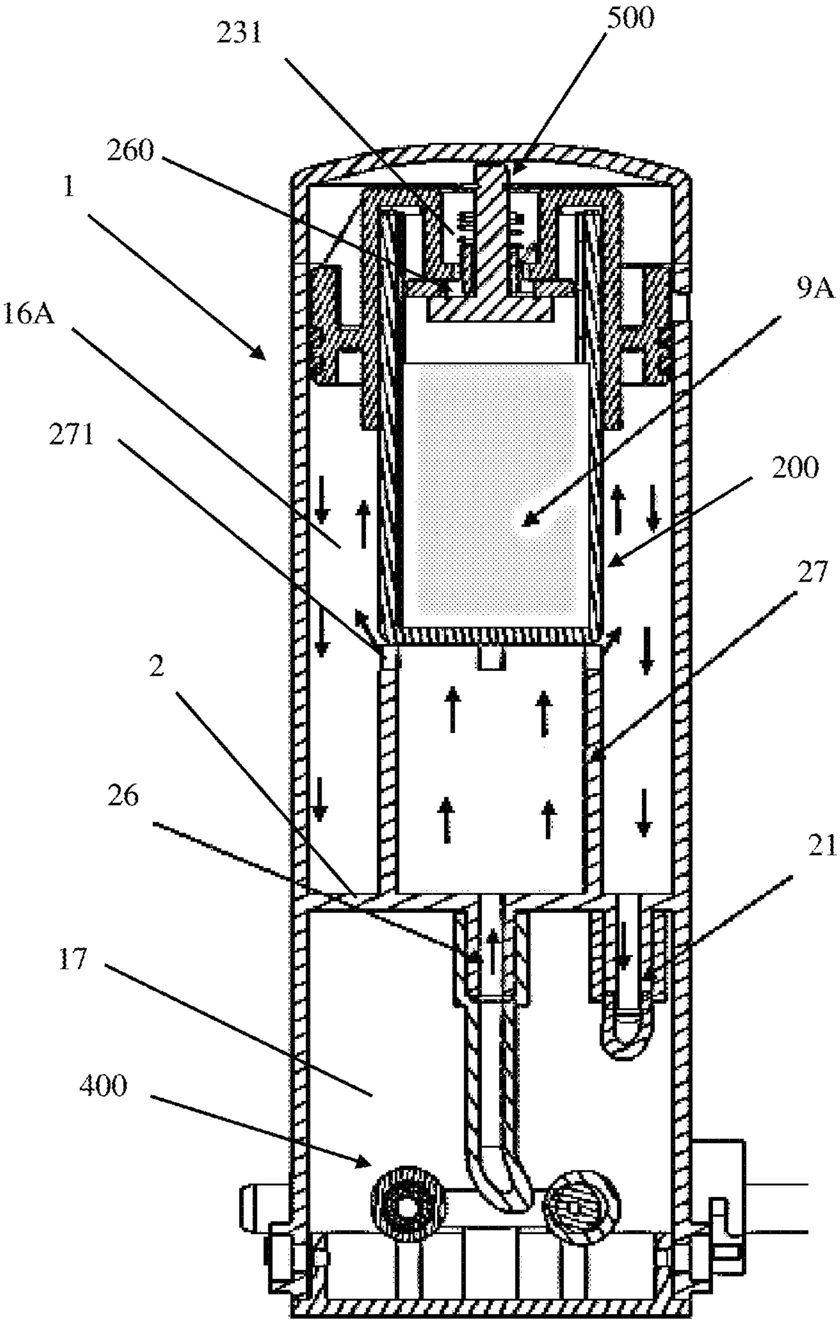
FIG. 29 illustrates, in a sectioned view, a structure of the descaling apparatus of the electronic toilet bidet according to another embodiment of the present disclosure.

FIG. 25 illustrates a structure of a descaling apparatus of an electronic toilet bidet according to one embodiment of the present disclosure. FIG. 26 illustrates, in an exploded view, a structure of the descaling apparatus of the electronic toilet bidet according to one embodiment of the present disclosure. FIG. 27 illustrates a state when a descaling agent storage box of the descaling apparatus of the electronic toilet bidet is taken out according to one embodiment of the present disclosure. FIG. 28 illustrates, in a sectioned view, a structure of the descaling apparatus of the electronic toilet bidet according to one embodiment of the present disclosure. FIG. 29 illustrates, in a sectioned view, a structure of the descaling apparatus of the electronic toilet bidet according to another embodiment of the present disclosure.

As shown in FIGS. 25-29, a descaling apparatus of an electronic toilet bidet according to the present disclosure comprises a descaling liquid storage tank 1, a descaling agent storage box 200 configured to house solid descaling agent 9A, and a descaling apparatus connector 400 fixed on the descaling liquid storage tank 1. The descaling liquid storage tank 1 comprises a descaling agent chamber 16A. The descaling agent storage box 200 is disposed in the descaling agent chamber 16A. An internal space of the descaling agent storage box 200 is in communication with the descaling agent chamber 16A. The descaling agent chamber 16A comprises a descaling liquid inlet 26 and a descaling liquid outlet 21. One end of the descaling apparatus connector 400 is connected to and in communication with the descaling liquid outlet 21 and the descaling liquid inlet 26. The other end of the descaling apparatus connector 400 is configured to be plugged into or unplugged from an electronic toilet bidet 5 (as shown in FIG. 5). An air exhaust assembly 500 is disposed on the descaling agent storage box 200 and configured to release air in the descaling liquid storage tank 1.

Preferably, the descaling apparatus connector 400 comprises a descaling apparatus connector output 410 connected to and in communication with the descaling liquid outlet 21 and a descaling apparatus connector input 420 connected to and in communication with the descaling liquid inlet 26.

Specifically, the descaling apparatus comprises the descaling liquid storage tank 1, the descaling agent storage box 200 disposed in an upper chamber of the descaling liquid storage tank 1, the descaling apparatus connector 400 disposed in a lower chamber of the descaling liquid storage tank 1, and a water rubber tube 8A. As shown in FIG. 27, the descaling agent storage box 200 is configured to be separated from or installed in the descaling liquid storage tank 1 so that the users can refill the descaling liquid storage tank 1 with the solid descaling agent 9A. Preferably, the descaling agent storage box 200 may be screwed into or screwed out of the descaling liquid storage tank 1. The solid descaling agent 9A, e.g. solid crystalline salt, is housed in the descaling agent storage box 200. When the descaling apparatus connector 400 is connected to the electronic toilet bidet 5, clean water enters the descaling agent chamber 16A from the descaling apparatus connector input 420, the water rubber tube 8A, and the descaling liquid inlet 26 in turn. Then, the solid descaling agent 9A in the descaling agent storage box 200 is dissolved by the clean water to form a descaling solution. The descaling solution leaves the descaling agent chamber 16A from an internal output pipe 23 and then leaves from the descaling apparatus connector output 410.

When the descaling apparatus is used for the first time, a pre-processing procedure may be carried out. This is because when a user screws the descaling agent storage box 200 into the upper chamber of the descaling liquid storage tank 1, the air is sealed in the descaling liquid storage tank 1 or the descaling agent storage box 200. When the pre-processing procedure is carried out and the clean water enters into the descaling apparatus, the user may use the air exhaust assembly 500 to release the air sealed in the descaling liquid storage tank 1. Because the internal space of the descaling agent storage box 200 is in communication with the descaling liquid storage tank 1, the air sealed in the descaling agent storage box 200 is also released to raise the clean water to an appropriate predetermined level. Thus, the descaling liquid storage tank 1 may have a maximum storage for housing the clean water so that the level of the clean water can be high enough to cover the solid descaling agent 9A in the descaling agent storage box 200 but lower than the air exhaust assembly 500. When the level of the clean water reaches the predetermined level, the air exhaust assembly 500 seals the descaling liquid storage tank 1 again and stops the pre-processing procedure.

The descaling apparatus according to the present disclosure may, according to an instruction, supply the descaling solution to the internal pipes of the electronic toilet bidet 5 for several times after the solid descaling agent 9A is added at one time and also automatically and continuously dissolved by the clean water. Thus, the descaling apparatus may avoid the lost function of the internal functional modules due to the clogging caused by the accumulation of limescales therein. The descaling apparatus may extend the service life of the modules and improve users' experience with the electronic toilet bidet 5. In addition, an air exhaust assembly 500 is added to release the air in the descaling liquid storage tank 1 so as to improve the dissolution rate of the solid descaling agent.

Figure 30:
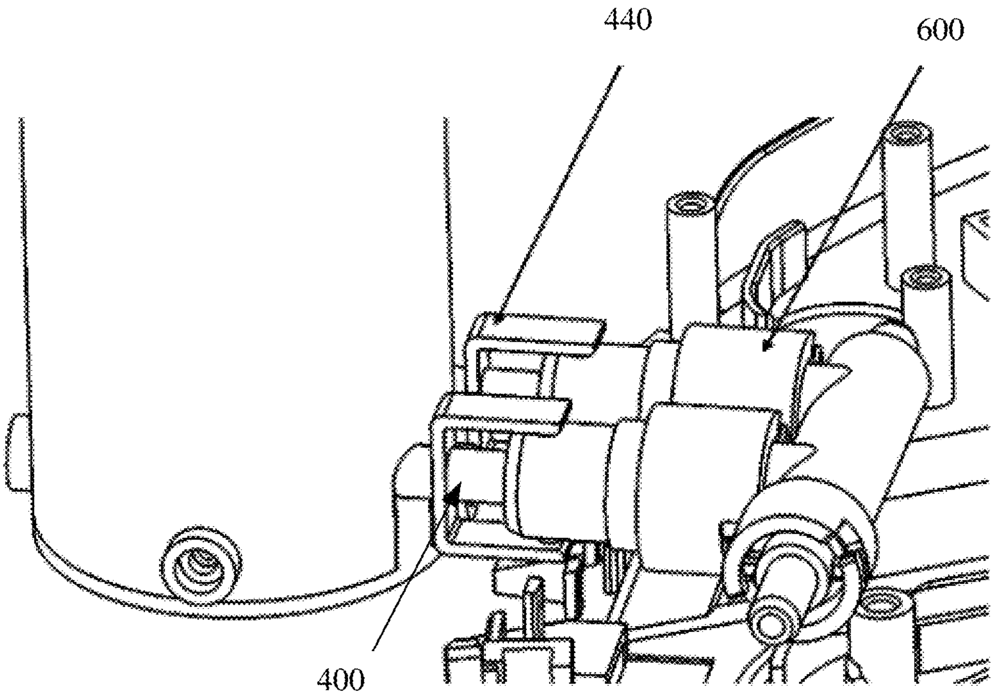
FIG. 30 illustrates a state when a descaling apparatus connector and a bidet connector are connected according to one embodiment of the present disclosure.
Figure 31:
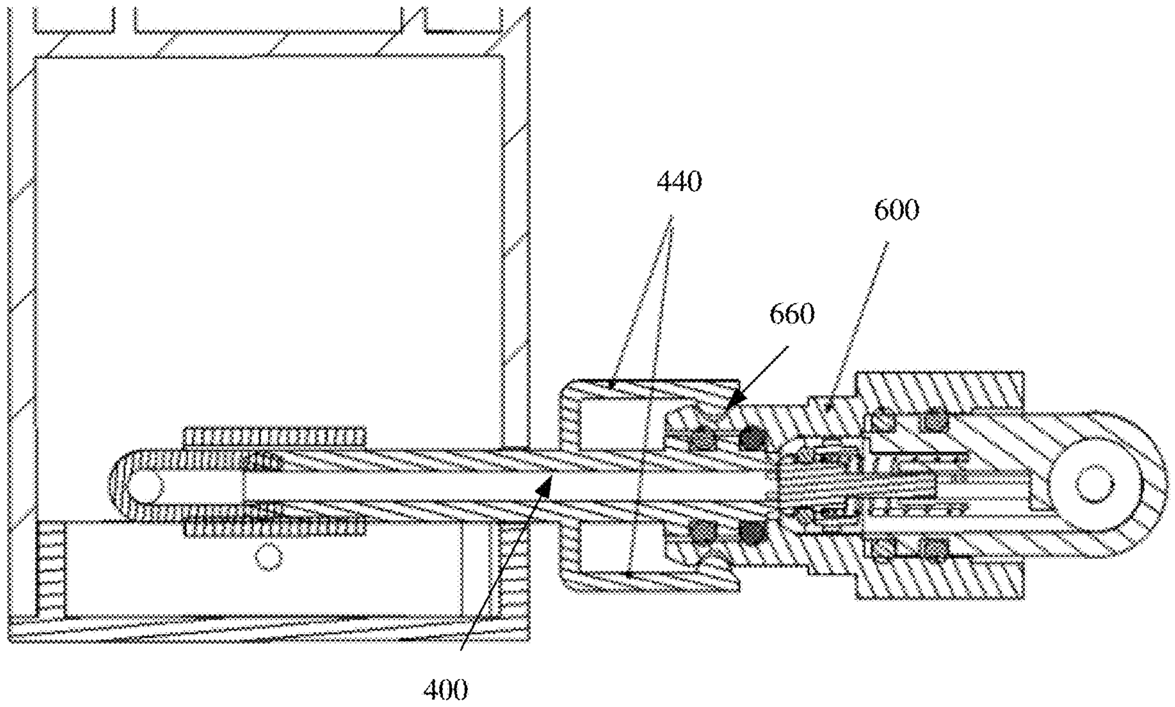
FIG. 31 illustrates, in a sectioned view, a state when a descaling apparatus connector and a bidet connector are connected according to one embodiment of the present disclosure.

In one embodiment, at least one connector sealing ring 430 is disposed on one end of the descaling apparatus connector output 410 and one end of the descaling apparatus connector input 420. The ends of the descaling apparatus connector output 410 and the descaling apparatus connector input 420 are configured to be plugged into or unplugged from an electronic toilet bide 5. The connector sealing ring 430 is configured to seal the connection between the descaling apparatus and the electronic toilet bide 5. FIG. 30 illustrates a state when a descaling apparatus connector and a bidet connector are connected according to one embodiment of the present disclosure. FIG. 31 illustrates, in a sectioned view, a state when a descaling apparatus connector and a bidet connector are connected according to one embodiment of the present disclosure. As shown in FIG. 30 and FIG. 31, a descaling apparatus connector locker 440 is also disposed on each of these ends. Preferably, the descaling apparatus connector lockers 440 are flexible buckles configured to ensure a reliable connection or disconnection between the descaling apparatus and the electronic toilet bide 5.

Figure 32:
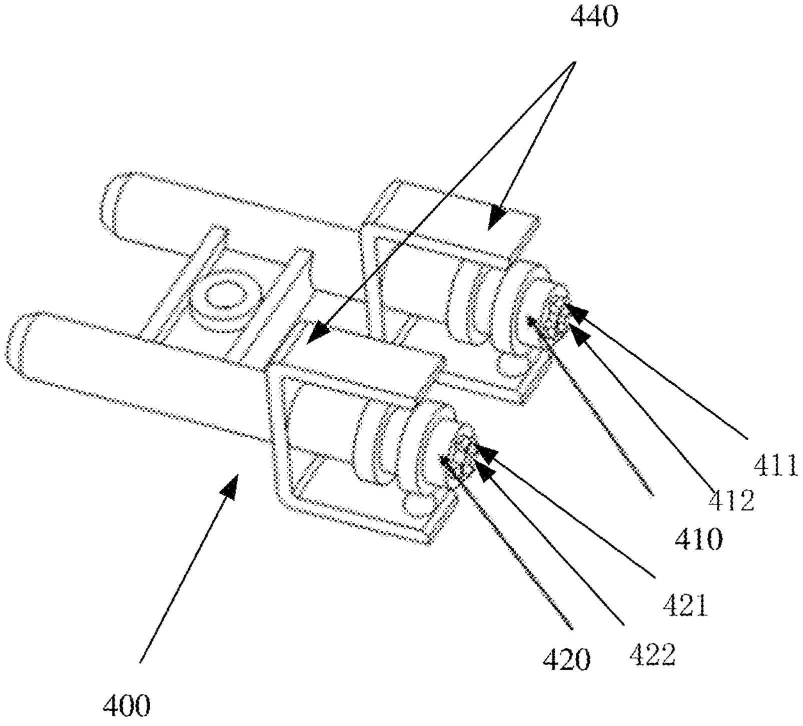
FIG. 32 illustrates a structure of the descaling apparatus connector according to one embodiment of the present disclosure.
Figure 33:
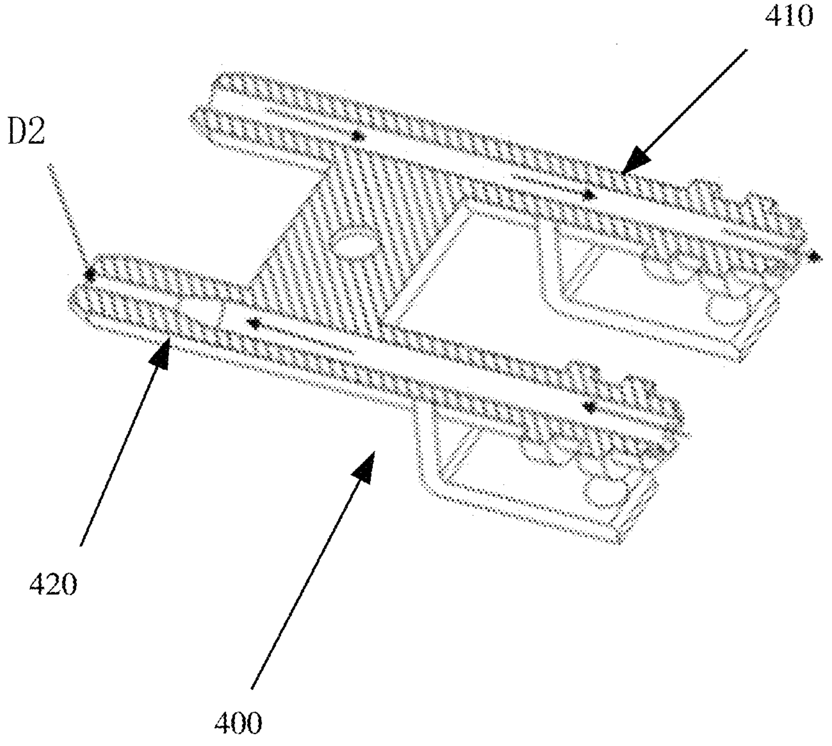
FIG. 33 illustrates, in a sectioned view, a structure of the descaling apparatus connector according to one embodiment of the present disclosure.

FIG. 32 illustrates a structure of the descaling apparatus connector according to one embodiment of the present disclosure. FIG. 33 illustrates, in a sectioned view, a structure of the descaling apparatus connector according to one embodiment of the present disclosure.

As shown in FIG. 32 and FIG. 33, in one embodiment, at least one connector output protruding portion 411 is disposed on the end, configured to be plugged into or unplugged from an electronic toilet bide 5, of the descaling apparatus connector output 410. The connector output protruding portion 411 comprises a connector output groove 412 connected to and in communication with the descaling apparatus connector output 410. At least one connector input protruding portion 421 is disposed on the end, configured to be plugged into or unplugged from an electronic toilet bidet 5, of the descaling apparatus connector input 420. The connector input protruding portion 421 comprises a connector input groove 422 connected to and in communication with the descaling apparatus connector input 420. According to the embodiment, the connector output protruding portion 411 and the connector input protruding portion 421 are configured to open a passage to the electronic toilet bidet 5. The connector output groove 412 and the connector input groove 422 are respectively configured to output or input the liquid.

In one embodiment, a level sensor assembly is disposed on the descaling apparatus connector 400 and is communicably coupled to a controller of the electronic toilet bidet 5. The level sensor assembly is configured to detect information when the descaling apparatus connector 400 is plugged into the electronic toilet bidet 5.

As shown in FIG. 28 and FIG. 29, in one embodiment, the descaling liquid storage tank 1 further comprises a divider 2. The descaling liquid outlet 21 and the descaling liquid inlet 26 are disposed on the divider 2. The divider 2 divides the descaling liquid storage tank 1 into the descaling agent chamber 16A and a liquid discharging chamber 17.

As shown in FIG. 28, in one embodiment, a stream guiding groove 27 is disposed on the divider 2. The descaling agent storage box 200 is disposed in the stream guiding groove 27. The descaling liquid outlet 21 is disposed outside the stream guiding groove 27 and the descaling liquid inlet 26 is disposed outside the stream guiding groove 27.

According to the embodiment, the stream guiding groove 27 isolates the descaling liquid inlet 26 and the descaling liquid outlet 21. Thus, a flowing duration of the clean water entering the descaling agent chamber 16A may be increased so that the solid descaling agent 9A may sufficiently contact the clean water.

As shown in FIG. 28, in one embodiment, the descaling agent storage box 200 is disposed in the stream guiding groove 27. A first gap 28 is disposed between the stream guiding groove 27 and a wall of the descaling agent storage box 200 and in communication with the internal space of the descaling agent storage box 200. A second gap 29 is disposed between a bottom of the descaling agent storage box 200 and the divider 2 and in communication with the internal space of the descaling agent storage box 200.

The descaling liquid outlet 21 is in communication with the first gap 28 and the descaling liquid inlet 26 is in communication with the second gap 29. Alternatively, the descaling liquid outlet 21 is in communication with the second gap 29 and the descaling liquid inlet 26 is in communication with the first gap 28.

Specifically, the clean water enters the descaling liquid inlet 26. The descaling agent storage box 200 isolates the first gap 28 and the second gap 29. If the descaling liquid outlet 21 is in communication with the first gap 28 and the descaling liquid inlet 26 is in communication with the second gap 29, the clean water passing through the second gap 29 must also pass through the descaling agent storage box 200. The descaling solution obtained from the dissolved solid descaling agent 9A leaves from the first gap 28 and the descaling liquid outlet 21. If the descaling liquid outlet 21 is in communication with the second gap 29 and the descaling liquid inlet 26 is in communication with the first gap 28, the clean water enters descaling agent storage box 200 through the first gap 28. The descaling solution obtained from the dissolved solid descaling agent 9A leaves from the second gap 29 and the descaling liquid outlet 21.

As shown in FIG. 29, in one embodiment, the bottom of the descaling agent storage box 200 contacts a top of the stream guiding groove 27. According to the embodiment, the descaling agent storage box 200 is disposed on the stream guiding groove 27. The clean water entering the stream guiding groove 27 rises to enter the descaling agent storage box 200. In one embodiment, at least one stream guiding hole 271 is disposed on the top of the stream guiding groove 27. When the clean water entering the stream guiding groove 27 rises to the stream guiding hole 271, the clean water is spouted from the stream guiding hole 271 to form an upward water stream. The descaling solution leaves from the descaling agent storage box 200. The upward water stream and the descaling solution interact against each other to improve the flowing effect of the descaling solution.

Figure 35:
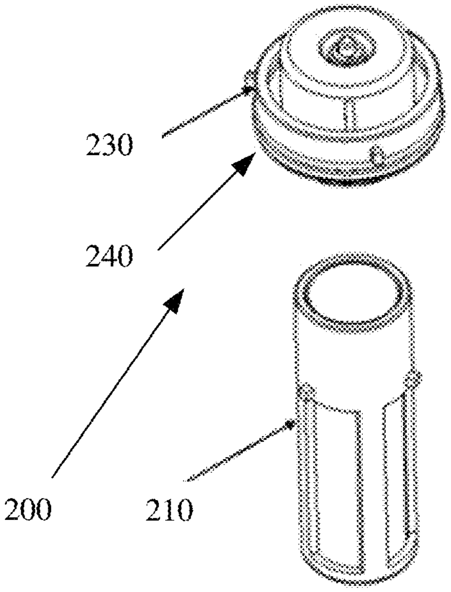
FIG. 35 illustrates a state when a box upper lid of the descaling agent storage box is taken out according to one embodiment of the present disclosure.
Figure 36:
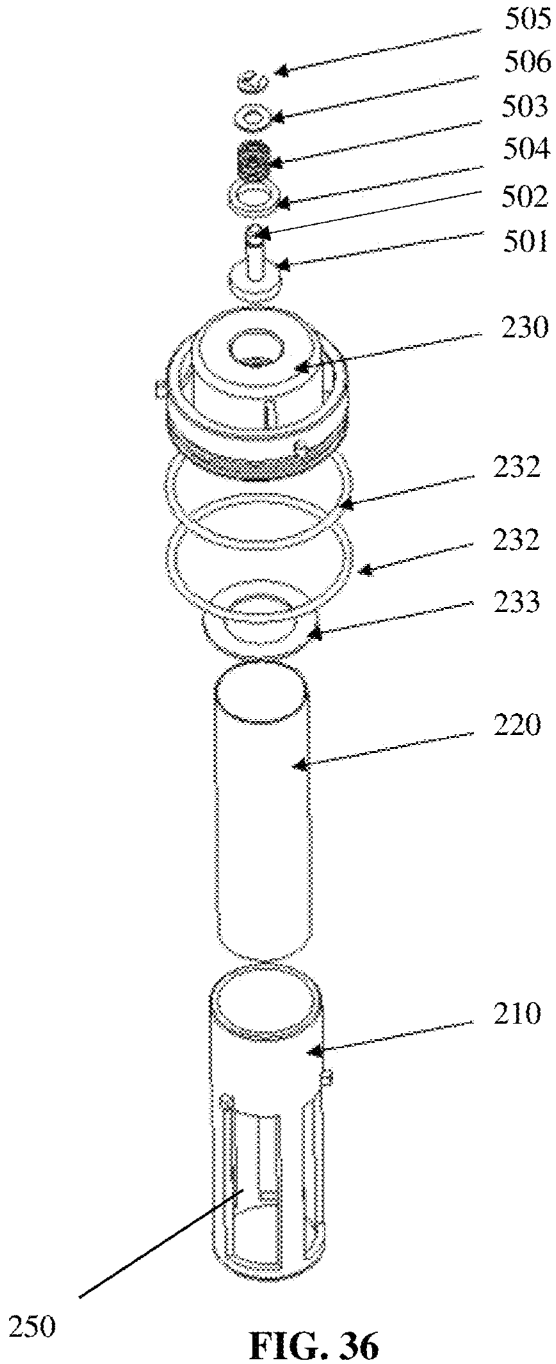
FIG. 36 illustrates a state when a box screen mesh of the descaling agent storage box is taken out according to one embodiment of the present disclosure.
Figure 37:
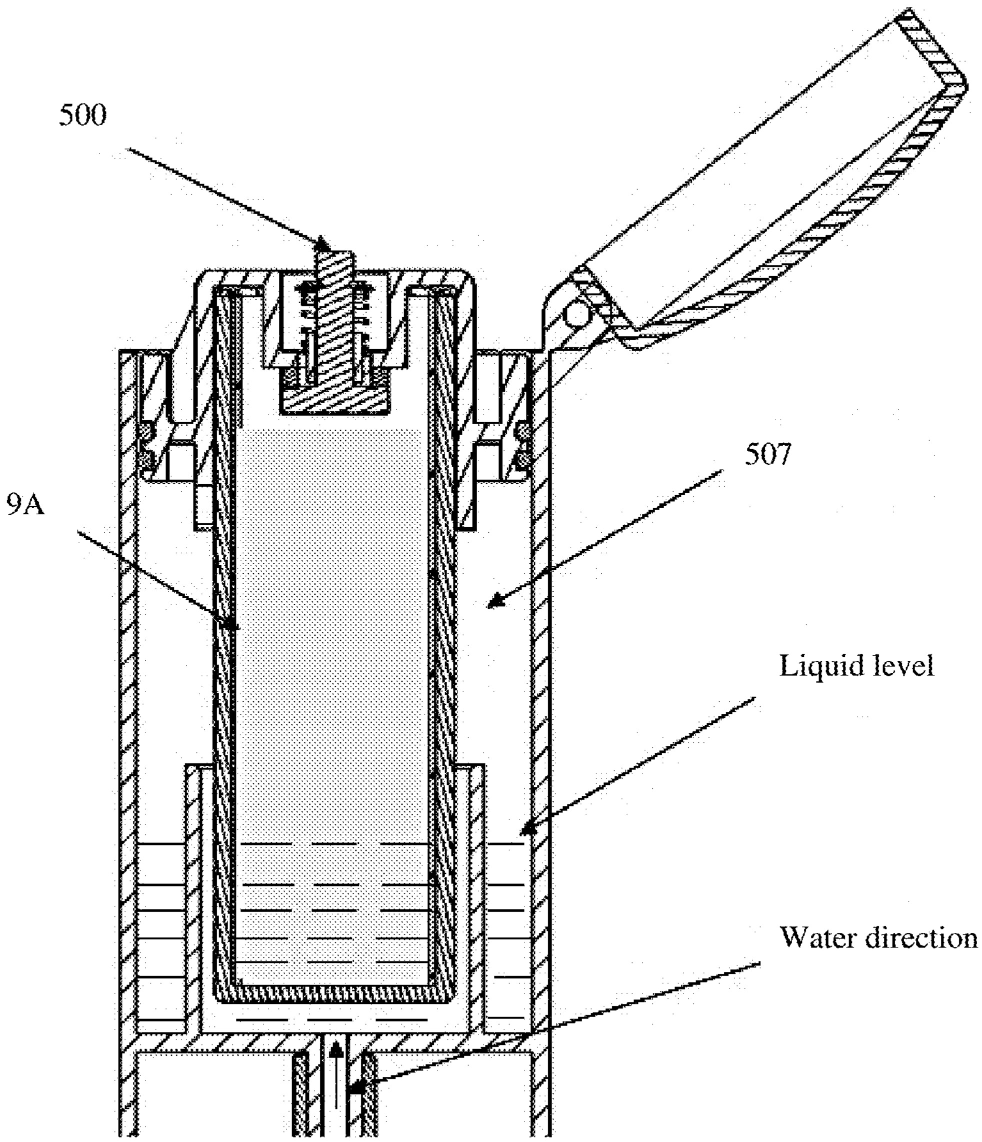
FIG. 37 illustrates an air exhaust assembly, in a state when the air is not being released, of the descaling apparatus of the electronic toilet bidet according to one embodiment of the present disclosure.
Figure 38:
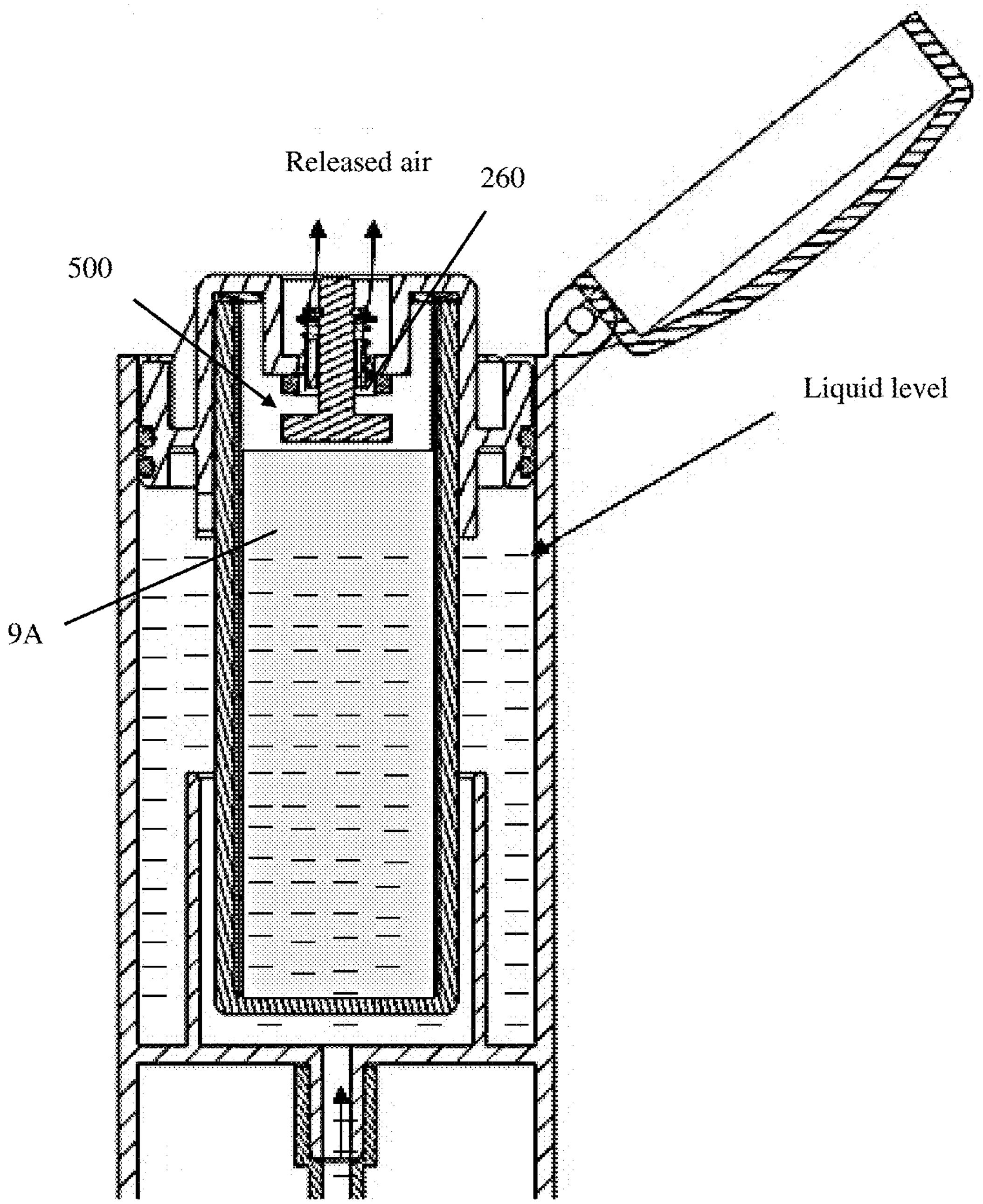
FIG. 38 illustrates the air exhaust assembly, in a state when the air is being released, of the descaling apparatus of the electronic toilet bidet according to one embodiment of the present disclosure.
Figure 39:
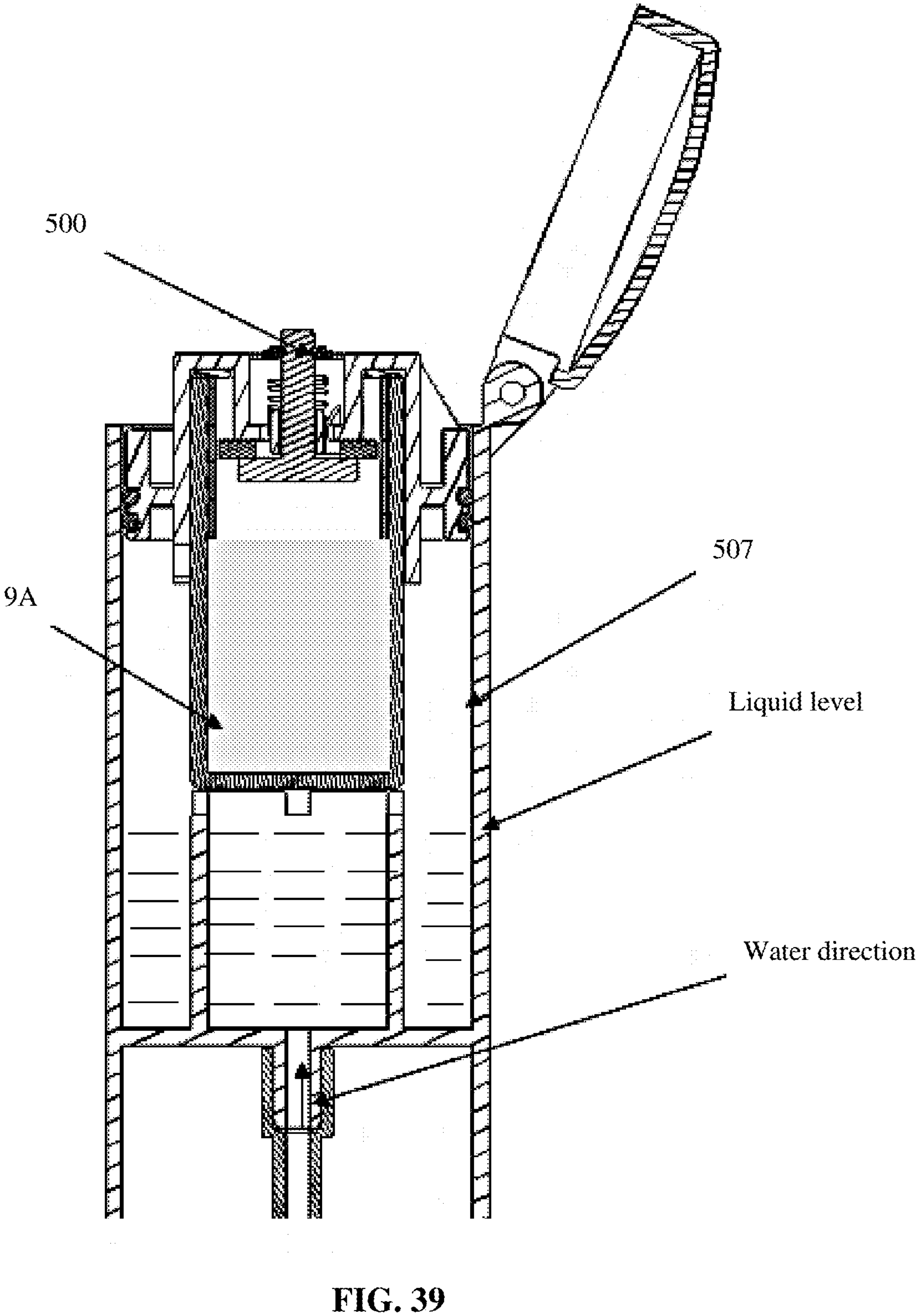
FIG. 39 illustrates an air exhaust assembly, in a state when the air is not being released, of the descaling apparatus of the electronic toilet bidet according to another embodiment of the present disclosure.
Figure 40:
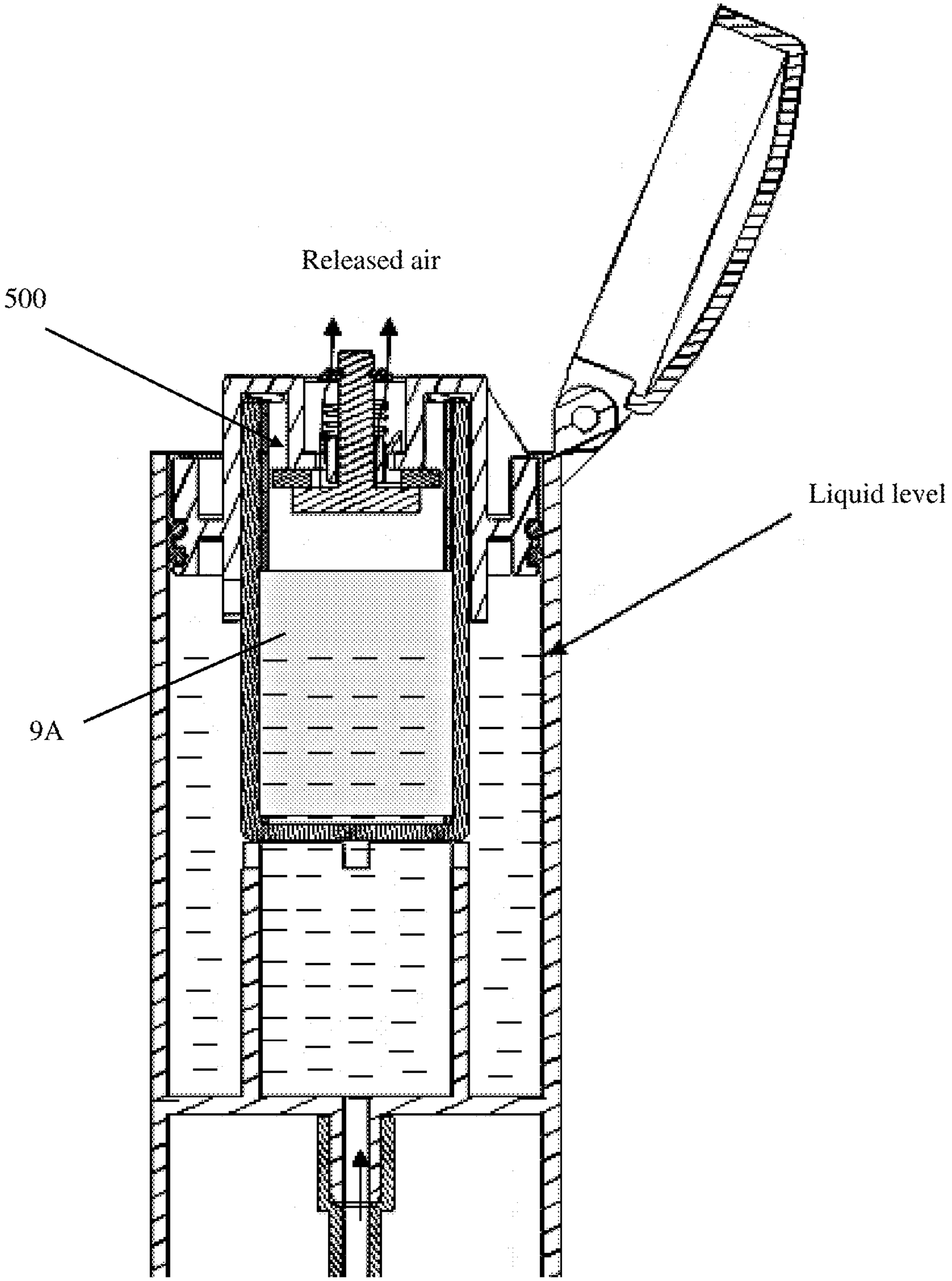
FIG. 40 illustrates the air exhaust assembly, in a state when the air is being released, of the descaling apparatus of the electronic toilet bidet according to another embodiment of the present disclosure.

FIG. 35 illustrates a state when a box upper lid of the descaling agent storage box is taken out according to one embodiment of the present disclosure. FIG. 36 illustrates a state when a box screen mesh of the descaling agent storage box is taken out according to one embodiment of the present disclosure. FIG. 37 illustrates an air exhaust assembly, in a state when the air is not being released, of the descaling apparatus of the electronic toilet bidet according to one embodiment of the present disclosure. FIG. 38 illustrates the air exhaust assembly, in a state when the air is being released, of the descaling apparatus of the electronic toilet bidet according to one embodiment of the present disclosure. FIG. 39 illustrates an air exhaust assembly, in a state when the air is not being released, of the descaling apparatus of the electronic toilet bidet according to another embodiment of the present disclosure. FIG. 40 illustrates the air exhaust assembly, in a state when the air is being released, of the descaling apparatus of the electronic toilet bidet according to another embodiment of the present disclosure.

As shown in FIG. 35 to FIG. 40, in one embodiment, the descaling agent storage box 200 comprises an air exhaust hole 260. The air exhaust assembly 500 comprises an air exhaust plate 501, an air exhaust rod 502, and an air exhaust spring 503. The air exhaust plate 501 is disposed in the descaling agent storage box 200. One end of the air exhaust rod 502 is connected to the air exhaust plate 501 and the other end of the air exhaust rod 502 extends from the descaling agent storage box 200 through the air exhaust hole 260. One end of the air exhaust spring 503 is connected to the end, extending from the descaling agent storage box 200, of the air exhaust rod 502. The other end of the air exhaust spring 503 securely engages the descaling agent storage box 200. A diameter of the air exhaust hole 260 is larger than a diameter of the air exhaust rod 502. The air exhaust plate 501 is large enough to cover the air exhaust hole 260.

Specifically, as shown in FIG. 38 and FIG. 40, when a user presses the air exhaust rod 502, the air exhaust plate 501 is driven by the air exhaust rod 502 to leave from the air exhaust hole 260. Thus, the air 507 in the descaling agent storage box 200 and the descaling liquid storage tank 1, as shown in FIG. 37 and FIG. 39, may be released. As shown in FIG. 37 and FIG. 39, when the user releases the air exhaust rod 502, the air exhaust spring 503 restores its shape and drives the air exhaust plate 501 to cover the air exhaust hole 260 again. Preferably, the air exhaust spring 503 is connected to the air exhaust rod 502 via an E-shaped shim 505 and a shim 506.

In one embodiment, the air exhaust assembly 500 further comprises an air exhaust sealing ring 504 disposed between an inner surface of the descaling agent storage box 200 and the air exhaust plate 501. The exhaust sealing ring 504 is configured to improve the tightness between the inner surface of the descaling agent storage box 200 and the air exhaust plate 501.

Figure 34:
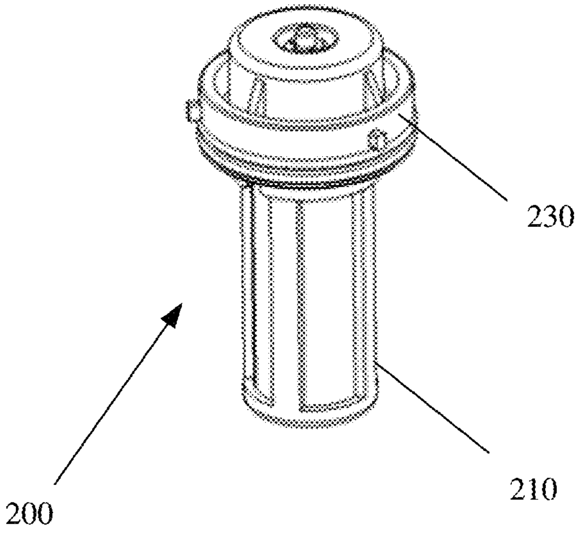
FIG. 34 illustrates a structure of a descaling agent storage box of the descaling apparatus according to one embodiment of the present disclosure.

FIG. 34 illustrates a structure of a descaling agent storage box of the descaling apparatus according to one embodiment of the present disclosure. FIG. 35 illustrates a state when a box upper lid of the descaling agent storage box is taken out according to one embodiment of the present disclosure. FIG. 36 illustrates a state when a box screen mesh of the descaling agent storage box is taken out according to one embodiment of the present disclosure.

As shown in FIG. 34 to FIG. 36, in one embodiment, the descaling agent storage box 200 comprises a box frame 210, a box screen mesh 220, and a box upper lid 230. The box frame 210 comprises multiple through holes 250. The box screen mesh 220 is disposed in the box frame 210. The box upper lid 230 is disposed on the box frame 210 and configured to open and close the descaling agent storage box 200. The air exhaust assembly 500 is disposed on the box upper lid 230.

According to the embodiment, the box screen mesh 220 forms a wall of the descaling agent storage box 200. The box screen mesh 220 is fine enough to prevent the undissolved solid descaling agent 9A from entering the clean water. The box screen mesh 220 also allows the solid descaling agent 9A to be slowly dissolved by the clean water to form a saturated descaling solution between the descaling agent storage box 200 and a wall of the descaling liquid storage tank 1. The box upper lid 230 may cover or uncover the box frame 210 through a rotation of the box upper lid 230 or a buckle. The solid descaling agent 9A may be added to the box frame 210 after the box upper lid 230 is opened. For users' convenience and safety, the descaling agent storage box 200 with the added solid descaling agent 9A may be sold to the users as a standard accessory.

In one embodiment, the box upper lid 230 comprises an air exhaust chamber 231 configured to house the air exhaust assembly 500. The air exhaust hole 260 is disposed at a bottom of the air exhaust chamber 231. According to the embodiment, the air exhaust chamber 331 configured to house the air exhaust assembly 500 may improve the appearance of the descaling apparatus because the air exhaust assembly 500 is hided in the box upper lid 230.

As shown in FIG. 26, the descaling liquid storage tank 1 further comprises a base 12, a shell 13 disposed on the base 12 and having an upward opening, and an outer lid 14 configured to open or close the opening of the shell 13. The descaling apparatus connector 400 is disposed on the shell 13. In one embodiment, the shell 13 may be transparent or translucent so that the user may read the liquid level. In one embodiment, the descaling apparatus further comprises a check valve 53. The descaling liquid outlet 21 is connected to and in communication with the descaling apparatus connector output 410 via the check valve 53. According to one embodiment, the check valve 53 is disposed behind the descaling liquid outlet 21 to allow the descaling solution to enter a main pipe. In one embodiment, a level sensor assembly is disposed in the descaling agent storage box 200. The level sensor assembly is configured to detect the changes in the liquid level.

Figure 41:
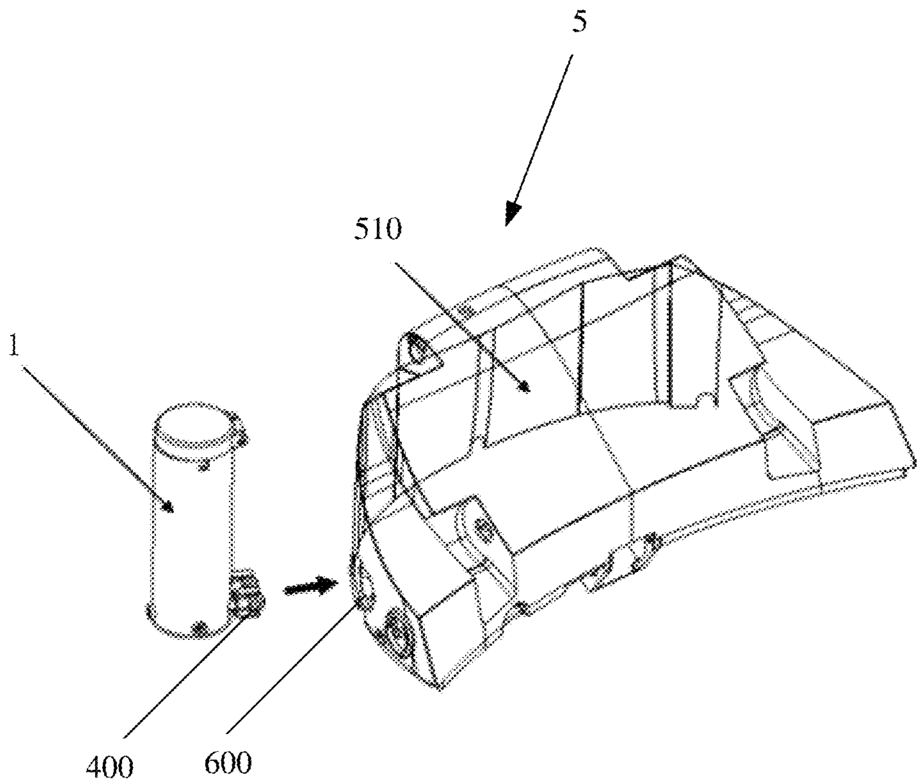
FIG. 41 illustrates a structure of a descaling system, in a state when the descaling apparatus is being installed on the electronic toilet bidet, according to one embodiment of the present disclosure.
Figure 42:
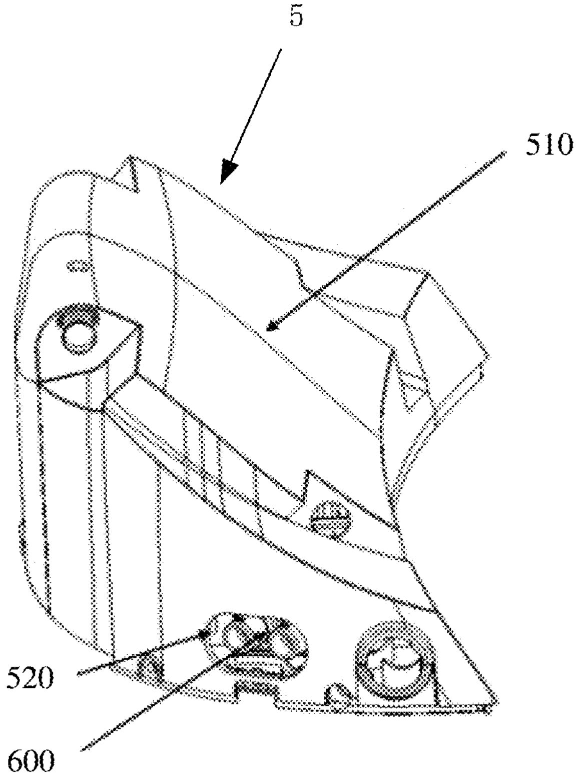
FIG. 42 illustrates, in a sided view, a structure of the electronic toilet bidet according to one embodiment of the present disclosure.

FIG. 41 illustrates a structure of a descaling system, in a state when the descaling apparatus is being installed on the electronic toilet bidet, according to one embodiment of the present disclosure. FIG. 42 illustrates, in a sided view, a structure of the electronic toilet bidet according to one embodiment of the present disclosure.

As shown in FIG. 41 and FIG. 42, a descaling system of an electronic toilet bidet according to the present disclosure comprises an electronic toilet bidet 5 and the foregoing descaling apparatus. The electronic toilet bidet 5 comprises a bidet main body 510 and a bidet main body pipe housed in the bidet main body 510. The bidet main body 510 comprises a bidet connector 600 configured to be connected or disconnected to the descaling apparatus connector 400. One end of the bidet connector 600 is connected to and in communication with an external water supply system 10. The other end of the bidet connector 600 is connected to and in communication with one end of the bidet main body pipe. The other end of the bidet main body pipe is connected to and in communication with a water output element.

Preferably, the bidet connector 600 comprises a connector main passage 610, a bidet connector output passage 620, and a bidet connector input passage 630. One end of the bidet connector main passage 610 is connected to and in communication with the external water supply system 10. The other end of the bidet connector main passage 610 is connected to and in communication with one end of the bidet main body pipe. The other end of the bidet main body pipe is connected to and in communication with a water output element.

When the descaling apparatus connector input 420 is plugged into the bidet connector output passage 620 and the descaling apparatus connector output 410 is plugged into the bidet connector input passage 630, the bidet connector main passage 610 is connected to and in communication with the bidet connector output passage 620 and the bidet connector input passage 630.

When the descaling apparatus connector input 420 is unplugged from the bidet connector output passage 620 and the descaling apparatus connector output 410 is unplugged from the bidet connector input passage 630, the bidet connector main passage 610 is disconnected to the bidet connector output passage 620 or the bidet connector input passage 630.

Figure 44:
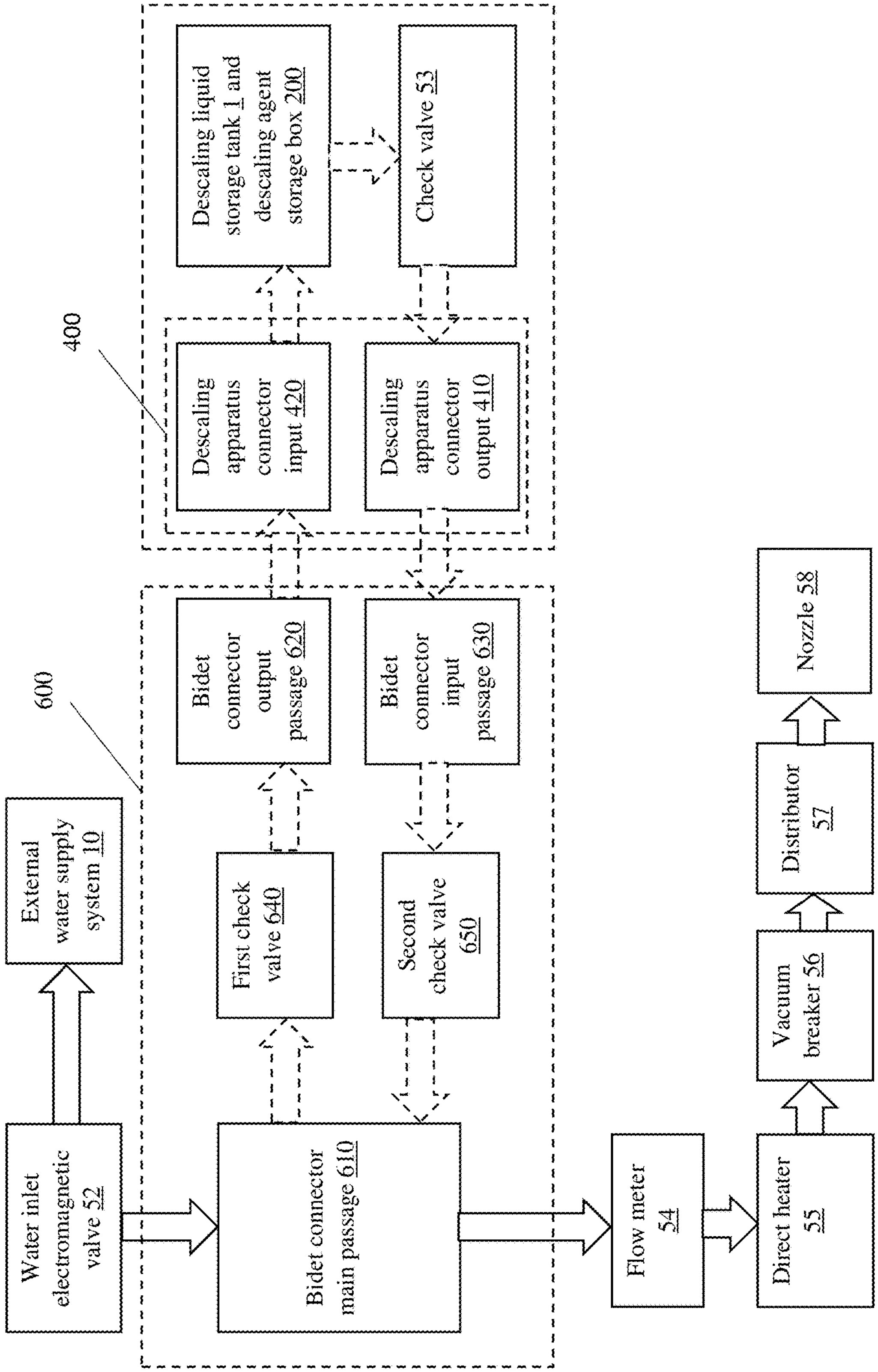
FIG. 44 illustrates a schematic diagram of the descaling system when the descaling function is closed according to one embodiment of the present disclosure.
Figure 45:
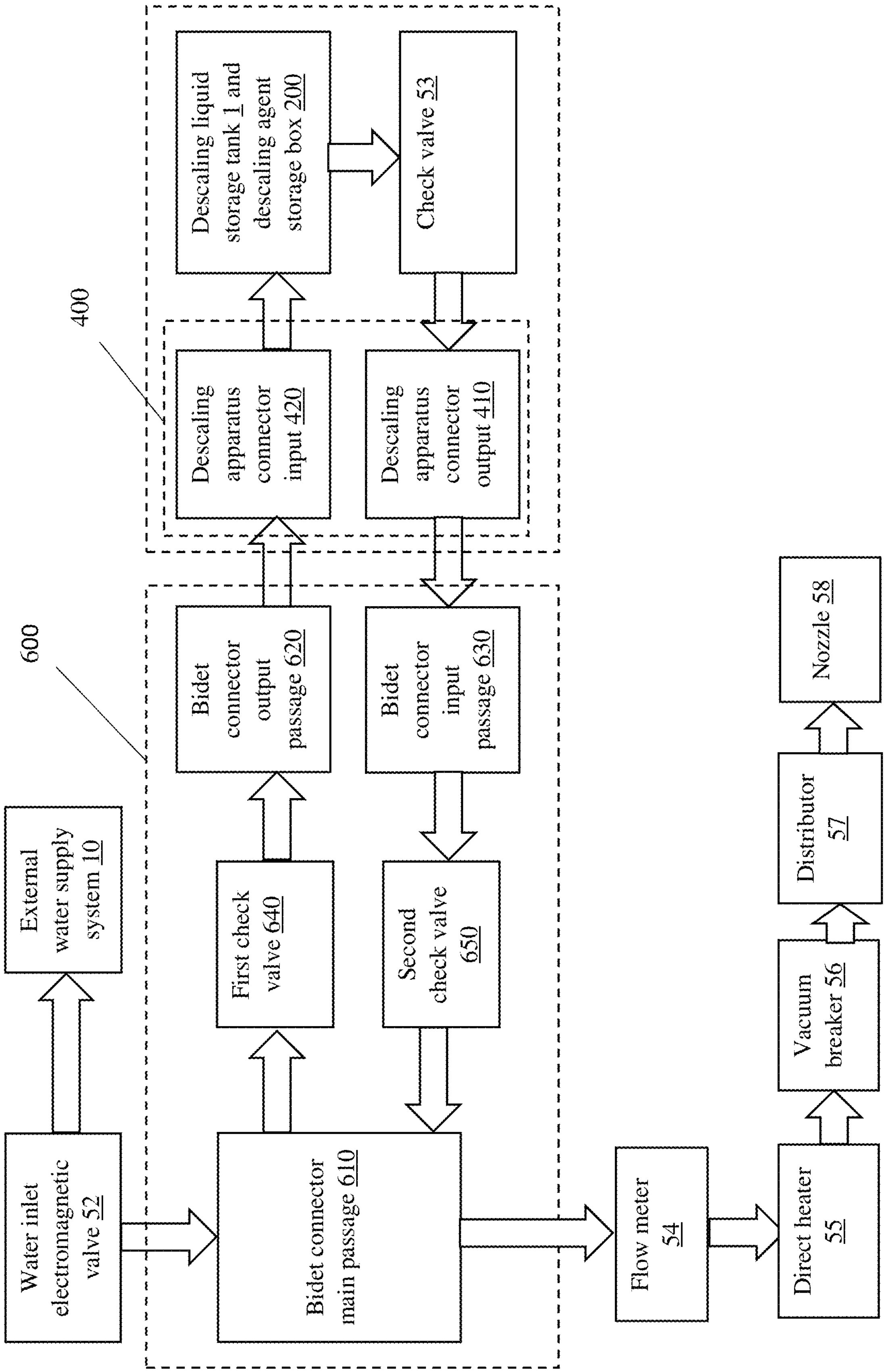
FIG. 45 illustrates a schematic diagram of the descaling system when the descaling function is opened according to one embodiment of the present disclosure.

Specifically, the descaling apparatus may be plugged into or unplugged from the electronic toilet bidet 5. FIG. 44 illustrates a schematic diagram of the descaling system when the descaling function is closed. Dotted arrows indicate that the liquid does not flow through those elements connected by the dotted arrows. The clean water supplied by the external water supply system 10 enters one end of the bidet main body pipe through the bidet connector main passage 610. The clean water leaves from the other end of the bidet main body pipe and reaches a nozzle 58 through a flow meter 54, a direct heater 55, a vacuum breaker 56, and a distributor 57 to complete the flushing function. FIG. 45 illustrates a schematic diagram of the descaling system when the descaling function is opened according to the present disclosure. The clean water supplied by the external water supply system 10 enters one end of the bidet main body pipe through the bidet connector main passage 610. Because the descaling apparatus connector 400 is plugged into the bidet connector 600, a portion of the clean water enters the descaling liquid storage tank 1 through the bidet connector main passage 610, the bidet connector output passage 620, and the descaling apparatus connector input 420. The portion of the clean water dissolves the solid descaling agent 9A in the descaling agent storage box 200 to form the descaling solution. The descaling solution enters the bidet connector main passage 610 again through the descaling apparatus connector output 410 and the bidet connector input passage 630. The descaling solution is mixed with the other portion of the clean water and then the mixture enters one end of the bidet main body pipe and leaves from the other end of the bidet main body pipe. Then, the mixture reaches the nozzle 58 through the flow meter 54, the direct heater 55, the vacuum breaker 56, and the distributor 57 to complete the descaling function.

The descaling system according to the present disclosure may, according to an instruction, supply the descaling solution to the internal pipes of the electronic toilet bidet 5 for several times after the solid descaling agent 9A is added at one time and also automatically and continuously dissolved by the clean water. Thus, the descaling apparatus may avoid the lost function of the internal functional modules due to the clogging caused by the accumulation of limescales therein. The descaling apparatus may extend the service life of the modules and improve users' experience with the electronic toilet bidet 5.

In one embodiment, the electronic toilet bidet 5 further comprises a controller. The descaling agent storage box 200 comprises a level sensor assembly communicably coupled to the controller. According to the embodiment, a pre-processing procedure may be concluded according to liquid level information obtained by the controller from the level sensor assembly.

Figure 43:
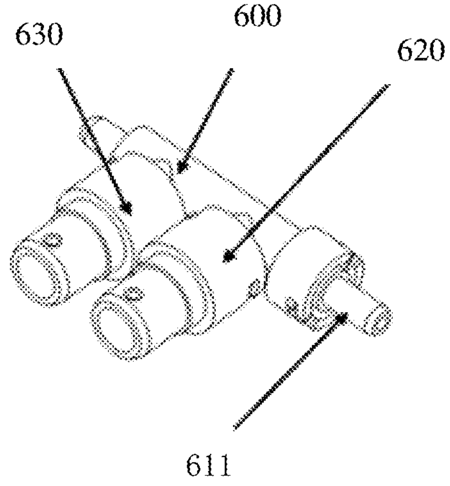
FIG. 43 illustrates a structure of the bidet connector according to one embodiment of the present disclosure.
Figure 46:
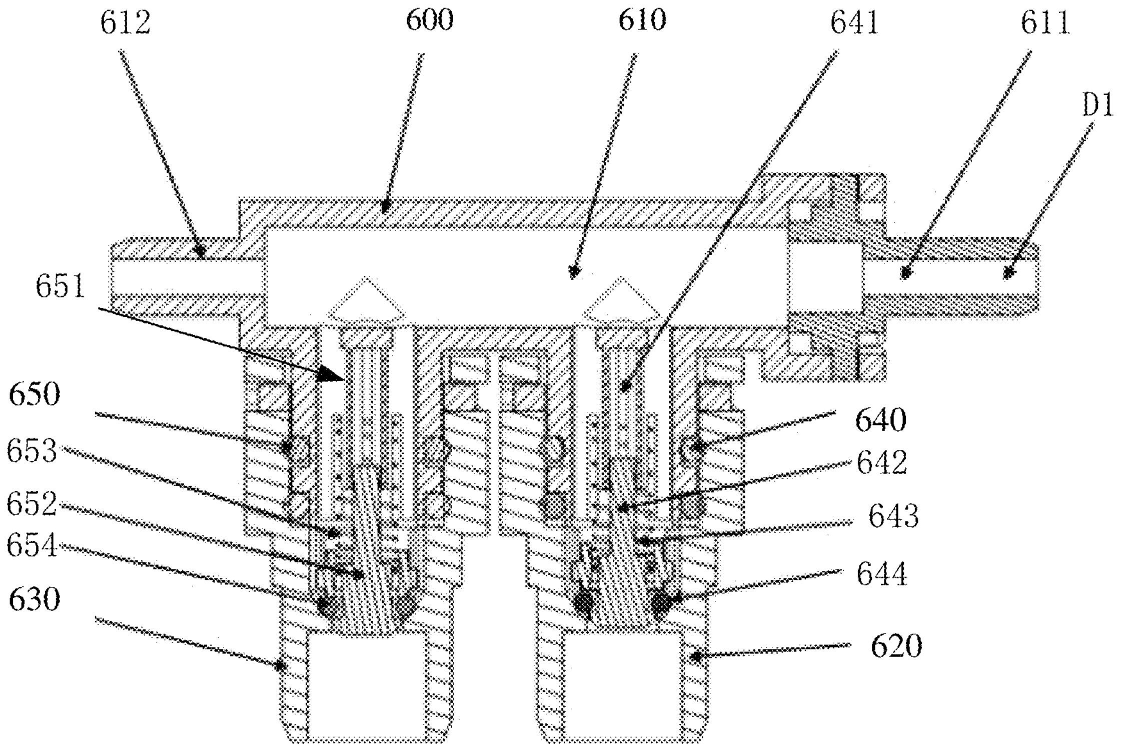
FIG. 46 illustrates, in a sectioned view, a state when the descaling apparatus connector and the bidet connector are not connected according to one embodiment of the present disclosure.
Figure 47:
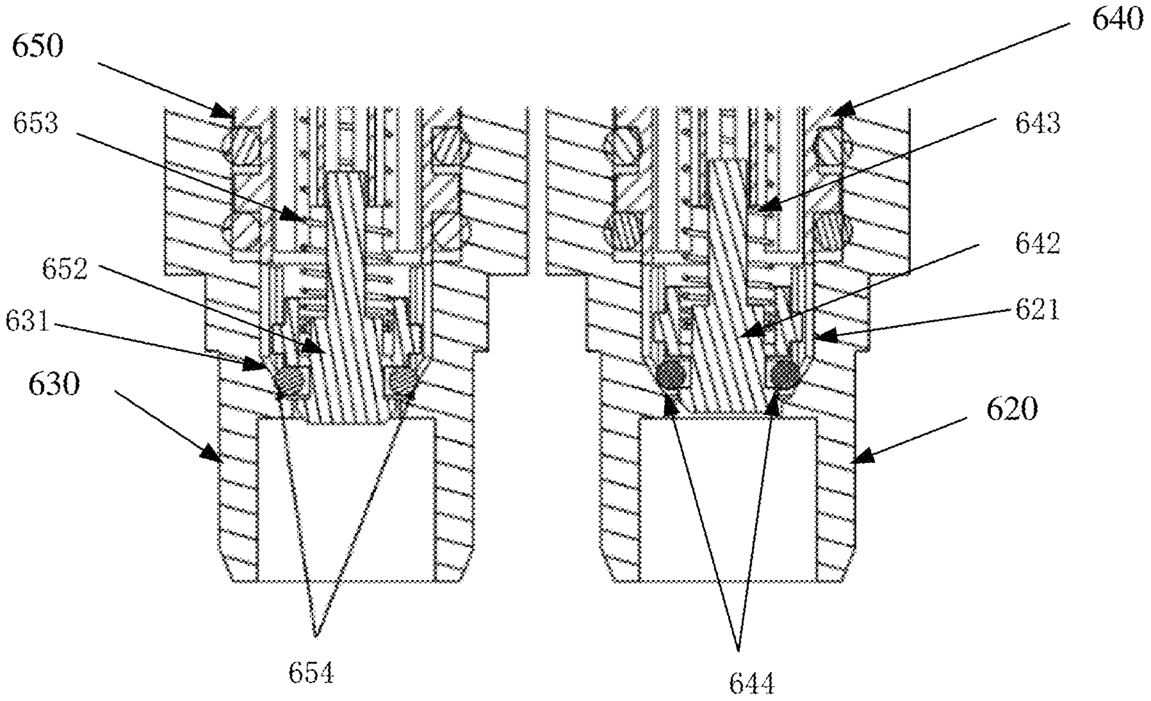
FIG. 47 illustrates, in an enlarged view, a state when the descaling apparatus connector and the bidet connector are not connected according to one embodiment of the present disclosure.
Figure 48:
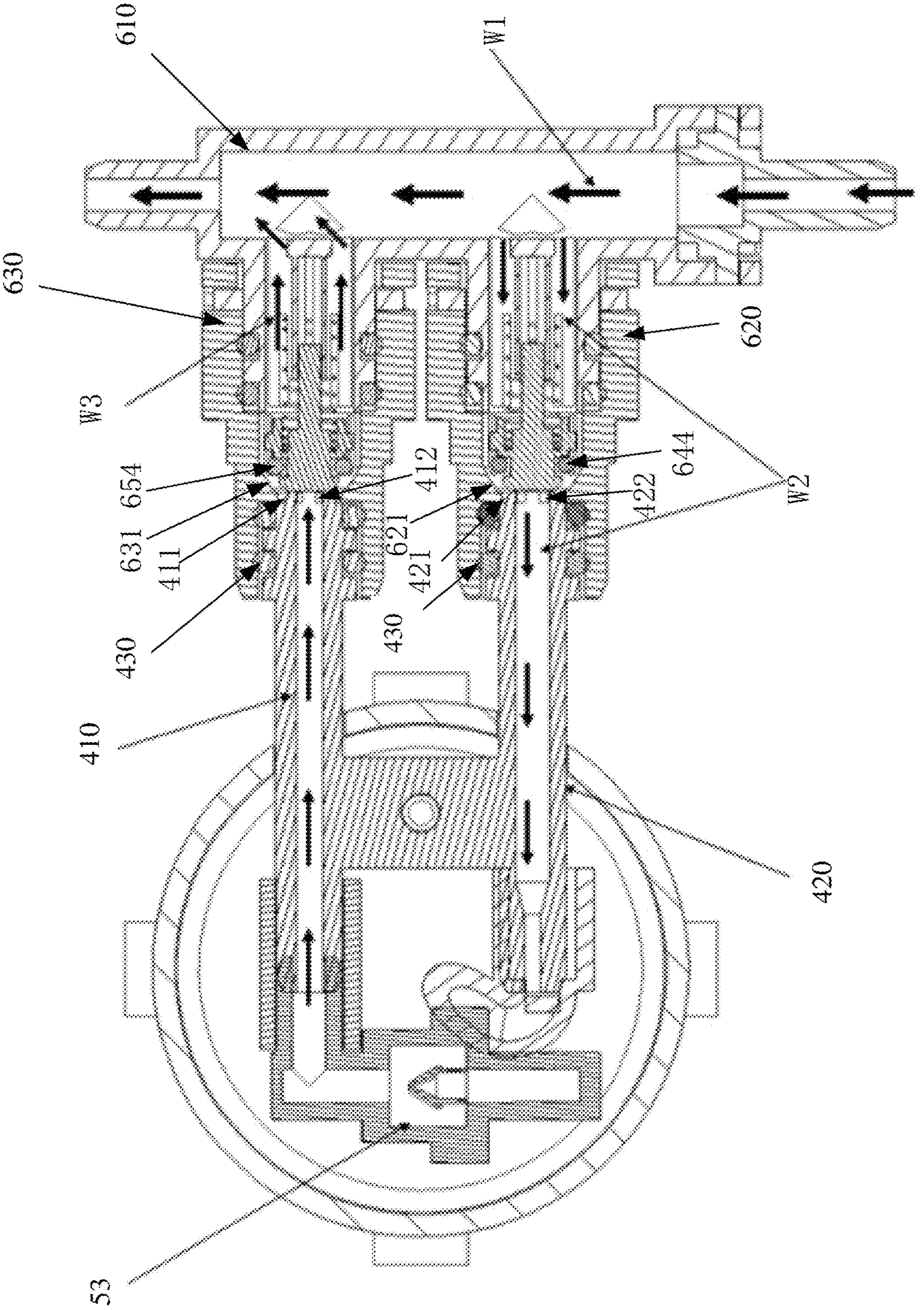
FIG. 48 illustrates, in a sectioned view, a state when the descaling apparatus connector and the bidet connector are connected according to one embodiment of the present disclosure.
Figure 49:
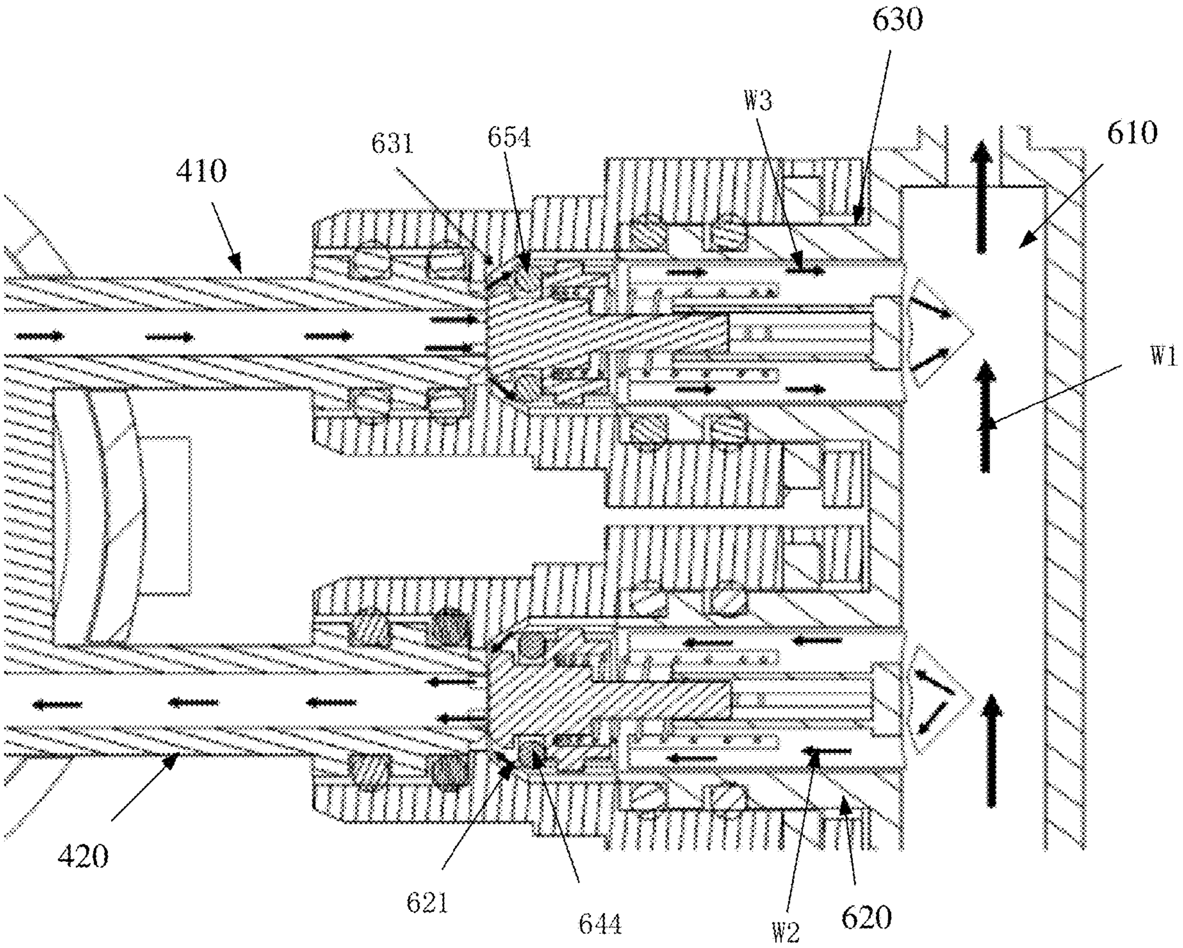
FIG. 49 illustrates, in an enlarged view, a state when the descaling apparatus connector and the bidet connector are connected according to one embodiment of the present disclosure.

FIG. 43 illustrates a structure of the bidet connector according to one embodiment of the present disclosure. FIG. 46 illustrates, in a sectioned view, a state when the descaling apparatus connector and the bidet connector are not connected according to one embodiment of the present disclosure. FIG. 47 illustrates, in an enlarged view, a state when the descaling apparatus connector and the bidet connector are not connected according to one embodiment of the present disclosure. FIG. 48 illustrates, in a sectioned view, a state when the descaling apparatus connector and the bidet connector are connected according to one embodiment of the present disclosure. FIG. 49 illustrates, in an enlarged view, a state when the descaling apparatus connector and the bidet connector are connected according to one embodiment of the present disclosure.

As shown in FIG. 43 and FIG. 46 to FIG. 49, in one embodiment, the bidet connector output passage 620 comprises a first check valve 640 configured to open or close the bidet connector main passage 610. The bidet connector input passage 630 comprises a second check valve 650 configured to open or close the bidet connector main passage 610.

When the descaling apparatus connector input 420 is plugged into the bidet connector output passage 620, the first check valve 640 is opened. When the descaling apparatus connector output 410 is plugged into the bidet connector input passage 630, the When the descaling apparatus connector input 420 is unplugged from the bidet connector output passage 620, the first check valve 640 is closed. When the descaling apparatus connector output 410 is unplugged from the bidet connector input passage 630, the second check valve 650 is closed.

According to the embodiment, the first check valve 640 and the second check valve 650 are configured to control a connection or disconnection between the bidet connector main passage 610 and the bidet connector output and input passages 620, 630.

In one embodiment, the first check valve 640 comprises a first check valve guiding pipe 641, a first check valve core 642, a first check valve spring 643, and a first check valve sealing ring 644. The first check valve core 642 is configured to move inwards and outwards in the first check valve guiding pipe 641. One end of the first check valve spring 643 is fixedly connected to the first check valve guiding pipe 641. The other end of the first check valve spring 643 securely engages the first check valve core 642. The first check valve sealing ring 644 is disposed on one end of the first check valve core 642. An output gap 621 is disposed between the end of the first check valve core 642 and an inner wall of the bidet connector output passage 620 and in communication with an internal space of the bidet connector main passage 610. A preload of the first check valve spring 643 is configured to push the first check valve sealing ring 644 to engage an end of the inner wall of the bidet connector output passage 620 so as to block the output gap 621.

In one embodiment, the second check valve 650 comprises a second check valve guiding pipe 651, a second check valve core 652, a second check valve spring 653, and a second check valve sealing ring 654. The second check valve core 652 is configured to move inwards and outwards in the second check valve guiding pipe 651. One end of the second check valve spring 653 is fixedly connected to the second check valve guiding pipe 651. The other end of the second check valve spring 653 securely engages the second check valve core 652. The second check valve sealing ring 654 is disposed on one end of the second check valve core 652. An input gap 631 is disposed between the end of the second check valve core 652 and an inner wall of the bidet connector inlet passage 630 and in communication with the internal space of the bidet connector main passage 610. A preload of the second check valve spring 653 is configured to push the second check valve sealing ring 654 to engage an end of the inner wall of the bidet connector input passage 630 so as to block the input gap 631.

Specifically, when the descaling apparatus connector input 420 is plugged into the bidet connector output passage 620, the first check valve core 642 is pushed inwards and drives the first check valve sealing ring 644 to move. Then, the output gap 621 is opened and the first check valve 640 is also opened. A main passage water stream $W_1$ is divided into a descaling agent water stream $W_2$. When the descaling apparatus connector input 420 is unplugged from the bidet connector output passage 620, the first check valve core 642 is pushed outwards by the first check valve spring 643 and drives the first check valve sealing ring 644 to move. Then, the first check valve sealing ring 644 securely engages the end of the inner wall of the bidet connector output passage 620 so as to block the output gap 621 and close the first check valve 640.

Specifically, when the descaling apparatus connector output 410 is plugged into the bidet connector input passage 630, the second check valve core 652 is pushed inwards and drives the second check valve sealing ring 654 to move. Then, the input gap 631 is opened and the second check valve 650 is also opened. The descaling agent water stream $W_2$ flows into the main passage water stream $W_1$ When the descaling apparatus connector output 410 is unplugged from the bidet connector input passage 630, the second check valve core 652 is pushed outwards by the second check valve spring 653 and drives the second check valve sealing ring 654 to move. Then, the second check valve sealing ring 654 securely engages the end of the inner wall of the bidet connector input passage 630 so as to block the input gap 631 and close the second check valve 650.

In one embodiment, the end of the inner wall of the bidet connector output passage 620 is conical. The end of the inner wall of the bidet connector input passage 630 is conical. The conical shape helps first check valve sealing ring 644 to securely engage the end of the inner wall of the bidet connector output passage 620. The conical shape also helps the second check valve sealing ring 654 to securely engage the end of the inner wall of the bidet connector input passage 630.

In one embodiment, a diameter $D_1$ of a main passage inlet 611 of the bidet connector main passage 610 is larger than a diameter $D_2$ of the descaling apparatus connector input 420. Thus, the total amount of the clean water is larger than the amount of the clean water entering the descaling apparatus. The mixing ratio of the descaling solution to the clean water may be adjusted by changing the diameter ratio of the descaling apparatus connector input 420 to the main passage inlet 611 of the bidet connector main passage 610.

As shown FIG. 30 and FIG. 31, in one embodiment, a descaling apparatus connector locker 440 is disposed on each of the ends, configured to be plugged into or unplugged from an electronic toilet bide 5, of the descaling apparatus connector 400. Each of the descaling apparatus connector locker 440 is matched with a bidet connector locker 660 disposed in the bidet connector 600. Preferably, the descaling apparatus connector lockers 440 are flexible buckles and the bidet connector lockers 660 are grooves. When the descaling apparatus connector 400 is plugged into the bidet connector 600, protruding points on the descaling apparatus connector lockers 440 securely engage the grooves of the bidet connector lockers 660. Thus, the descaling apparatus connector 400 is securely locked on the bidet connector 600. The disconnection, caused by an internal pressure, between the descaling apparatus and the electronic toilet bidet 5 may be avoided when the descaling function is being performed.

In one embodiment, the descaling system further comprises a water inlet electromagnetic valve 52 configured to control a connection or disconnection between the bidet connector main passage 610 and the external water supply system 10. According to the embodiment, the water inlet electromagnetic valve 52 is configured to control the total amount of the clean water. The bidet connector 600 may be, as an individual element, disposed behind the water inlet electromagnetic valve 52. Alternatively, the bidet connector 600 may be an integral part of the water inlet electromagnetic valve 52 according to the product's internal layouts. The bidet connector 600 may be installed on or removed from the water inlet electromagnetic valve 52 according to the product's functions.

Figure 50:
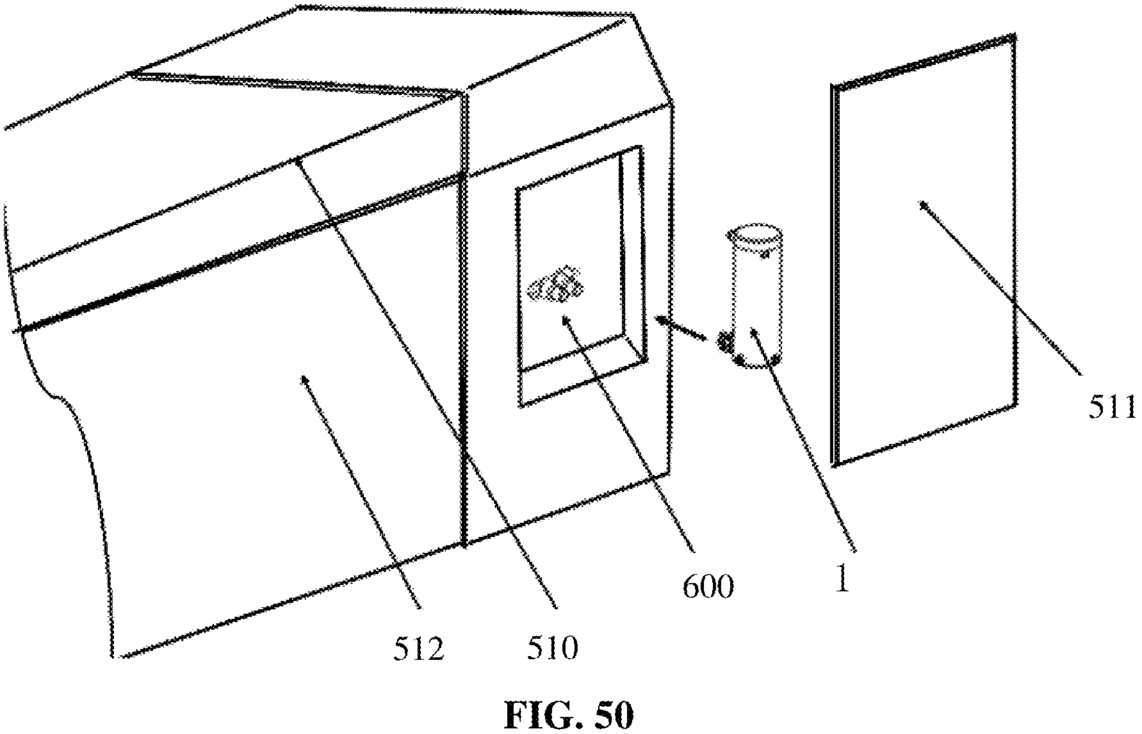
FIG. 50 illustrates a state when the descaling apparatus is being placed into the electronic toilet bidet according to one embodiment of the present disclosure.
Figure 51:
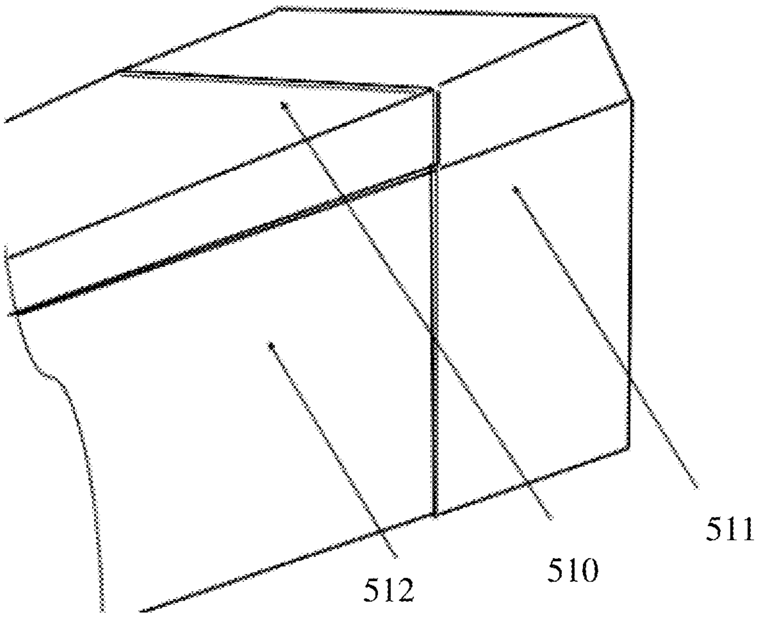
FIG. 51 illustrates a state when a bidet connector cover covers a bidet chamber according to one embodiment of the present disclosure.

FIG. 42 illustrates, in a sided view, a structure of the electronic toilet bidet according to one embodiment of the present disclosure. FIG. 50 illustrates a state when the descaling apparatus is being placed into the electronic toilet bidet according to one embodiment of the present disclosure. FIG. 51 illustrates a state when a bidet connector cover covers a bidet chamber according to one embodiment of the present disclosure.

As shown in FIG. 42, FIG. FIG. 50, and FIG. 51, in one embodiment, the bidet main body 510 comprises a bidet chamber 520 configured to house the bidet connector 600. A bidet connector cover 511 is disposed outside the bidet chamber 520 and configured to open or close the bidet chamber 520.

In one embodiment, a plugging window is disposed on one side of the bidet main body 510 and used as the bidet chamber 520. The plugging window is configured to allow the descaling apparatus connector 400 to be plugged into the bidet connector 600. When the descaling function is closed, the plugging window is covered by the bidet connector cover 511. For a ceramic integral electronic toilet bidet, the bidet connector 600, configured to be connected to the descaling apparatus connector 400, may be disposed in an internal space of a ceramic base 512. The internal space is covered by the bidet connector cover 511.

In one embodiment, the electronic toilet bidet 5 further comprises a controller. The descaling apparatus connector 400 comprises a level sensor assembly communicably coupled to the controller. According to the embodiment, the level sensor assembly is configured to detect information when the descaling apparatus connector 400 is plugged into the bidet connector 600.

Figure 52:
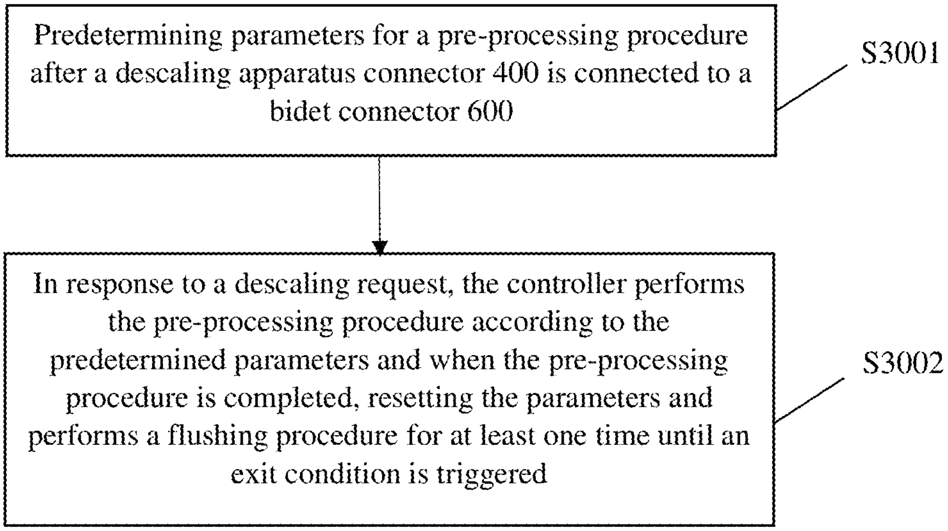
FIG. 52 illustrates a flow chart of a descaling method according to one embodiment of the present disclosure.

FIG. 52 is a flow chart illustrating a descaling method by using the foregoing descaling system of an electronic toilet bidet according to the present disclosure. The descaling method comprises:

In the step S3001, the controller predetermines parameters for a pre-processing procedure after the descaling apparatus connector 400 is connected to the bidet connector 600.

In the step S3002, in response to a descaling request, the controller performs the pre-processing procedure according to the predetermined parameters and when the pre-processing procedure is completed, the controller resets the parameters and performs a flushing procedure for at least one time until an exit condition is triggered.

In the pre-processing procedure, the controller controls the external water supply system 10 to supply the clean water to the bidet connector main passage 610 of the bidet connector 600 for a predetermined pre-processing time. After the predetermined pre-processing time lapses, the controller controls the external water supply system 10 to stop supplying the clean water to the bidet connector main passage 610 of the bidet connector 600 for a predetermined suspension time. After the air exhaust assembly 500 releases the air in the descaling liquid storage tank 1 to the outside of the descaling liquid storage tank 1, the controller resets the parameters for the pre-processing procedure and performs a flushing procedure.

In the flushing procedure, the controller controls the external water supply system to supply the clean water to the bidet connector main passage 610 of the bidet connector 600. Specifically, the controller performs the pre-processing procedure after the descaling apparatus connector 400 is connected to the bidet connector 600. When the descaling apparatus is used for the first time, a pre-processing procedure may be carried out. This is because when a user screws the descaling agent storage box 200 into the upper chamber of the descaling liquid storage tank 1, the air is sealed in the descaling liquid storage tank 1 or the descaling agent storage box 200. When the pre-processing procedure is carried out and the clean water enters into the descaling apparatus, the user may use the air exhaust assembly 500 to release the air sealed in the descaling liquid storage tank 1. Because the internal space of the descaling agent storage box 200 is in communication with the descaling liquid storage tank 1, the air sealed in the descaling agent storage box 200 is also released to raise the clean water to an appropriate predetermined level. Thus, the descaling liquid storage tank 1 may have a maximum storage for housing the clean water so that the level of the clean water can be high enough to cover the solid descaling agent 9A in the descaling agent storage box 200 but lower than the air exhaust assembly 500. When the level of the clean water reaches the predetermined level, the air exhaust assembly 500 seals the descaling liquid storage tank 1 again and stops the pre-processing procedure. Thus, the solid descaling agent 9A may be sufficiently dissolved by the clean water. Then, the controller performs the flushing procedure for multiple times until an exit condition is triggered. The exit condition may be the number of times, the time, the amount of descaling agent residuals, or the concentration of the descaling solution.

In one embodiment, the electronic toilet bidet 5 further comprises a controller. The descaling agent storage box 200 comprises a level sensor assembly communicably coupled to the controller. After the air exhaust assembly 500 releases the air to the outside of the descaling liquid storage tank 1, the controller resets the parameters for the pre-processing procedure and performs a flushing procedure. Specifically, when the controller receives, from the level sensor assembly, the liquid level information indicating that the level reaches a predetermined level, the controller resets the parameters and performs the flushing procedure. According to the embodiment, a pre-processing procedure may be concluded according to the liquid level information obtained by the controller.

In one embodiment, the descaling apparatus connector 400 comprises a level sensor assembly communicably coupled to the controller. After the descaling apparatus connector 400 is connected to the bidet connector 600, the controller predetermines the parameters for the pre-processing procedure. Specifically, when the controller receives the liquid level information from the level sensor assembly, the controller predetermines the parameters. According to the embodiment, the controller performs the pre-processing procedure according to the liquid level information.

In one embodiment, a descaling apparatus of an electronic toilet bidet according to the present disclosure comprises a descaling liquid storage tank 1, a descaling agent storage box 200 configured to house solid descaling agent 9A, and a descaling apparatus connector 400 fixed on the descaling liquid storage tank 1. The descaling liquid storage tank 1 comprises a descaling agent chamber 16A. The descaling agent storage box 200 is disposed in the descaling agent chamber 16A. An internal space of the descaling agent storage box 200 is in communication with the descaling agent chamber 16A. The descaling agent chamber 16A comprises a descaling liquid inlet 26 and a descaling liquid outlet 21. The descaling apparatus connector 400 is configured to be plugged into or unplugged from an electronic toilet bidet 5 (as shown in FIG. 5). The descaling apparatus connector 400 comprises a descaling apparatus connector output 410 connected to and in communication with the descaling liquid outlet 21 and a descaling apparatus connector input 420 connected to and in communication with the descaling liquid inlet 26. An air exhaust assembly 500 is disposed on the descaling agent storage box 200 and configured to release air in the descaling liquid storage tank 1.

The descaling liquid storage tank 1 further comprises a base 12, a shell 13 disposed on the base 12 and having an upward opening, and an outer lid 14 configured to open or close the opening of the shell 13. The descaling apparatus connector 400 is disposed on the shell 13. The shell 13 may be transparent or translucent so that the user may read the liquid level.

The descaling agent storage box 200 disposed in the descaling agent chamber 16A houses the solid descaling agent 9A, e.g. solid crystalline salt. The descaling agent chamber 16A is an upper portion of the descaling liquid storage tank 1. The descaling apparatus connector 400 is disposed in the liquid discharging chamber 17. The liquid discharging chamber 17 is a lower portion of the descaling liquid storage tank 1. The descaling apparatus connector 400 is connected to a check valve 53 and a water rubber tube 8A. The descaling agent storage box 200 is configured to be separated from or installed in the descaling liquid storage tank 1 so that the users can refill the descaling liquid storage tank 1 with the solid descaling agent 9A.

Figure 53:
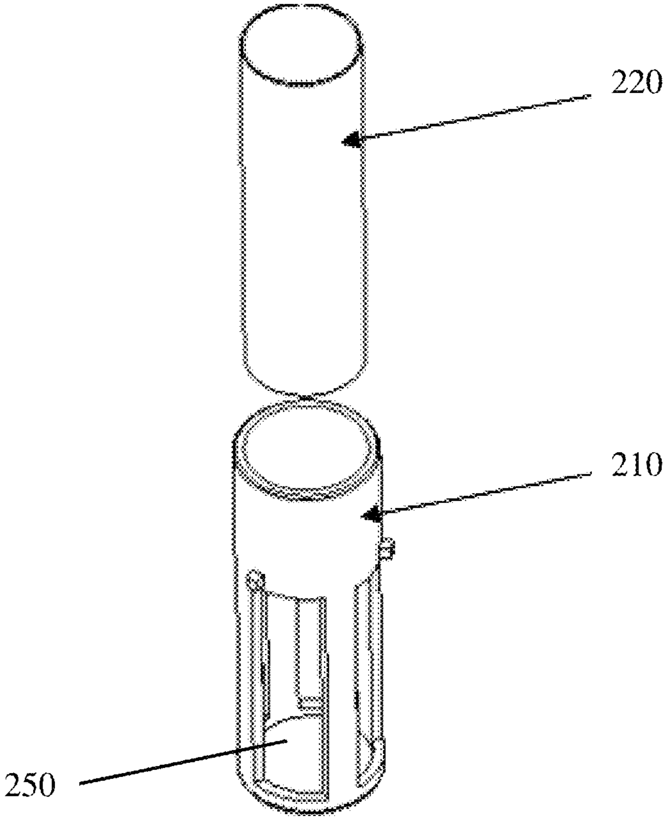
FIG. 53 illustrates a state when a box screen mesh of the descaling agent storage box is taken out according to one embodiment of the present disclosure.

FIG. 36 illustrates a state when a box screen mesh of the descaling agent storage box is taken out according to one embodiment of the present disclosure. FIG. 53 illustrates a state when a box screen mesh of the descaling agent storage box is taken out according to one embodiment of the present disclosure.

As shown in FIG. 36 and FIG. 53, the descaling agent storage box 200 comprises a box frame 210 configured to house the solid descaling agent 9A, a box screen mesh 220 configured to prevent the undissolved solid descaling agent 9A from entering the clean water, and a box upper lid 230. The box frame 210 comprises multiple through holes 250. The box screen mesh 220 is disposed in the box frame 210. The box upper lid 230 is disposed on the box frame 210 and configured to open and close the descaling agent storage box 200. A box upper lid sealing ring 232 and a box upper lid sealing plate 233 are disposed on the box upper lid 230.

The box upper lid 230 comprises an air exhaust chamber 231 configured to house the air exhaust assembly 500. The air exhaust hole 260 is disposed at a bottom of the air exhaust chamber 231. The air exhaust assembly 500 comprises an air exhaust plate 501, an air exhaust rod 502, and an air exhaust spring 503. The air exhaust plate 501 is disposed in the descaling agent storage box 200. One end of the air exhaust rod 502 is connected to the air exhaust plate 501 and the other end of the air exhaust rod 502 extends from the descaling agent storage box 200 through the air exhaust hole 260. One end of the air exhaust spring 503 is connected to the end, extending from the descaling agent storage box 200, of the air exhaust rod 502 via an E-shaped shim 505 and a shim 506. The other end of the air exhaust spring 503 securely engages the descaling agent storage box 200. A diameter of the air exhaust hole 260 is larger than a diameter of the air exhaust rod 502. The air exhaust plate 501 is large enough to cover the air exhaust hole 260. The air exhaust assembly 500 further comprises an air exhaust sealing ring 504 disposed between an inner surface of the descaling agent storage box 200 and the air exhaust plate 501.

Because the air 507 is sealed in the descaling liquid storage tank 1, the storage for housing the clean water is reduced. When a user presses the air exhaust rod 502 disposed on the box upper lid 230, the air exhaust hole 260 is opened to release the air 507. Thus, the level of the clean water can be adjusted so that more clean water may enter to contact the solid descaling agent 9A and thus form the saturated descaling solution.

The bidet main body 510 comprises a bidet connector 600 corresponding to the descaling apparatus connector 400. The bidet connector 600 is fixed on one side of the bidet main body 510 and disposed behind a water inlet electromagnetic valve 52. The bidet connector 600 has a structure similar to a three-way mixing valve. The bidet connector 600 comprises a connector main passage 610 configured to supply a mixture of the clean water and the descaling solution. The bidet connector 600 further comprises a bidet connector output passage 620 and a bidet connector input passage 630 respectively matched with the descaling apparatus connector input 420 and the descaling apparatus connector output 410. The bidet connector output passage 620 and the bidet connector input passage 630 respectively comprise a first check valve 640 and a second check valve 650. When the descaling apparatus is not plugged into the electronic toilet bidet 5, the bidet connector output passage 620 and the bidet connector input passage 630 are respectively by the first check valve 640 and the second check valve 650. Thus, the clean water is only supplied to the electronic toilet bidet via the connector main passage 610.

The bidet connector 600 may be, as an individual element, disposed behind the water inlet electromagnetic valve 52. Alternatively, the bidet connector 600 may be an integral part of the water inlet electromagnetic valve 52 according to the product's internal layouts. The bidet connector 600 may be installed on or removed from the water inlet electromagnetic valve 52 according to the product's functions.

A bidet connector cover 511 is disposed on one side of the bidet main body 510. A plugging window is disposed on the corresponding side of the bidet main body 510 and used as the bidet chamber 520. The plugging window is configured to allow the descaling apparatus connector 400 to be plugged into the bidet connector 600. When the descaling function is closed, the plugging window is covered by the bidet connector cover 511. For a ceramic integral electronic toilet bidet, the bidet connector 600, configured to be connected to the descaling apparatus connector 400, may be disposed in an internal space of a ceramic base 512. The internal space is covered by the bidet connector cover 511.

To remove the limescales, a user may need a descaling apparatus and screw the descaling agent storage box 200 counter-clockwise out of the descaling liquid storage tank 1. Then, the user may screw the box upper lid 230 counter-clockwise out of the descaling agent storage box 200. The user may add citrate solids, as the solid descaling agent, to the descaling agent storage box 200. The user may screw the box upper lid 230 clockwise into the descaling agent storage box 200 and screw the descaling agent storage box 200 clockwise into the descaling liquid storage tank 1.

Before carrying out the pre-processing procedure, the user needs to plug the descaling apparatus connector 400 into the plugging window on the side of the bidet main body 510. Descaling apparatus connector lockers 440 securely engage bidet connector lockers 660 to ensure a reliable connection or disconnection between the descaling apparatus and the electronic toilet bide 5. The bidet connector output passage 620 and the bidet connector input passage 630 may be opened by respectively opening the first check valve 640 and the second check valve 650. Thus, the saturated descaling solution enters the bidet connector main passage 610.

Because the solid descaling agent is stored in the descaling agent storage box 200, a pre-processing procedure may be carried out to form the saturated descaling solution. This is because when a user screws the descaling agent storage box 200 into the upper chamber of the descaling liquid storage tank 1, the air is sealed in the descaling liquid storage tank 1 or the descaling agent storage box 200. When the pre-processing procedure is carried out and the clean water enters into the descaling apparatus, the user may press the air exhaust rod 502 to release the air sealed in the descaling liquid storage tank 1 so that the clean water can be raised to an appropriate predetermined level. Thus, the descaling liquid storage tank 1 may have a maximum storage for housing the clean water so that the level of the clean water can be high enough to cover the solid descaling agent 9A in the descaling agent storage box 200 but lower than the air exhaust assembly 500. Because the shell 13 is transparent or translucent, the user may read the liquid level in the descaling liquid storage tank 1. When the level of the clean water reaches the predetermined level, the user may release the air exhaust rod 502 to seal the descaling liquid storage tank 1 again and stop the pre-processing procedure.

Because it takes time to form the saturated descaling solution by using the solid descaling agent 9A in the descaling agent storage box 200, a waiting time may be predetermined after the pre-processing procedure is completed. An indicator light be used to alert the user that the saturated descaling solution has not been formed. After waiting for the predetermined time, the user may carry out the descaling function and the indicator light returns to a normal state.

When the descaling function is opened, a large portion of the clean water enters the subsequent elements through the bidet connector main passage 610. Because the bidet connector output passage 620 and the bidet connector input passage 630 are opened, a small portion of the clean water enters the descaling liquid storage tank 1 through the bidet connector output passage 620, the descaling apparatus connector input 420, the water rubber tube 8A, and the descaling liquid inlet 26. The entered clean water first flows upwards and then downwards to squeeze out the saturated descaling solution. The squeezed-out saturated descaling solution enters the bidet connector main passage 610 again through the descaling liquid outlet 21, the internal output pipe 23, the check valve 53, the descaling apparatus connector output 410, and the bidet connector input passage 630. The squeezed-out saturated descaling solution is mixed with the large portion of the clean water and then the mixture enters the subsequent elements to complete the descaling function.

The mixing ratio of the descaling solution to the clean water may be adjusted by changing the diameter ratio of the descaling apparatus connector input 420 to the main passage inlet 611 of the bidet connector main passage 610, e.g. 1:10 or 1:5. Thus, the concentration of the decaling liquid may be adjusted so as to effectively remove the limescales.

When the descaling function is opened, the mixture may flow through the internal pipes of the electronic toilet bidet 5 and be spouted from the nozzle 58. When the mixture is filled with the internal pipes, the water inlet electromagnetic valve 52 may be closed to avoid wasting the saturated descaling solution. The mixture may remain in the internal pipes for a certain amount of time so that the mixture may have a sufficient chemical reaction with the limescales accumulated in the internal pipes. Because only small amount of the mixture is needed to remove the limescales, the foregoing procedures may be repeated for several times until the saturated descaling solution is diluted by the clean water to have a low concentration.

The internal space of the descaling liquid storage tank 1 and the size of the descaling agent storage box 200 may be increased if the installation chamber or the user's operation allows so. Thus, the storage for the saturated descaling solution in the descaling apparatus may be increased. When the descaling function is opened, a time for performing the descaling function may be calculated according to a predetermined mixing ratio of the saturated descaling solution to the clean water and a time for exhausting the saturated descaling solution. Thus, the mixture may be continuously spouted from the nozzle 58 through the internal pipes so as to remove the limescales accumulated in the internal pipes and release the removed limescales by the nozzle 58.

When the descaling procedure is completed, the water inlet electromagnetic valve 52 is opened again to supply new clean water. The new clean water may convey the removed limescales to be released by the nozzle 58. Also, the new clean water helps to dissolve the solid descaling agent residuals completely and clean the descaling liquid storage tank 1.

When the descaling procedure is completed, due to a vacuum effect, some clean water still may remain in the upper portion of the descaling liquid storage tank 1, i.e. the descaling agent chamber 16A. A user may press the air exhaust rod 502 disposed on the box upper lid 230 to open the air exhaust hole 260 so that the descaling agent chamber 16A may be in communication with the external atmosphere. In addition, because the descaling apparatus is usually fixed on the electronic toilet bidet 5 at a position higher than the internal pipes of the electronic toilet bidet 5, the clean water residuals will be released through the internal pipes under the effect of gravity. Thus, when the user uninstalls the descaling apparatus from the electronic toilet bidet 5, no great amount of the clean water residuals will be released from the descaling apparatus connector 400.

For a ceramic integral electronic toilet bidet, the descaling apparatus is usually fixed on the electronic toilet bidet 5 at a lower than the electronic toilet bidet 5. Thus, when the user presses the air exhaust rod 502 after the descaling procedure is completed, the clean water residuals will not be released from the nozzle 58. The user may use a container disposed below the descaling apparatus to avoid the leakage when uninstalling the descaling apparatus.

Finally, the user may unplug the descaling apparatus from the electronic toilet bidet by pulling out the descaling apparatus and then cover the plugging window. Because the descaling apparatus is pulled out, the first check valve 640 and the second check valve 650 are closed by the first check valve spring 643 and the second check valve spring 653. Thus, the bidet connector output passage 620 and the bidet connector input passage 630 are respectively blocked by the first check valve 640 and the second check valve 650. Then, the user may begin the normal flushing procedure.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

Example 6

As shown in FIGS. 25-29, a descaling apparatus of an electronic toilet bidet according to the present disclosure comprises a descaling liquid storage tank 1, a descaling agent storage box 200 configured to house solid descaling agent 9A, and a descaling apparatus connector 400 fixed on the descaling liquid storage tank 1. The descaling liquid storage tank 1 comprises a descaling agent chamber 16A. The descaling agent storage box 200 is disposed in the descaling agent chamber 16A. An internal space of the descaling agent storage box 200 is in communication with the descaling agent chamber 16A. The descaling agent chamber 16A comprises a descaling liquid inlet 26 and a descaling liquid outlet 21. The descaling apparatus connector 400 is configured to be plugged into or unplugged from an electronic toilet bidet 5.

Preferably, the descaling apparatus connector 400 comprises a descaling apparatus connector output 410 connected to and in communication with the descaling liquid outlet 21 and a descaling apparatus connector input 420 connected to and in communication with the descaling liquid inlet 26.

Specifically, the descaling apparatus comprises the descaling liquid storage tank 1, the descaling agent storage box 200 disposed in an upper chamber of the descaling liquid storage tank 1, the descaling apparatus connector 400 disposed in a lower chamber of the descaling liquid storage tank 1, and a water rubber tube 8A. As shown in FIG. 27, the descaling agent storage box 200 is configured to be separated from or installed in the descaling liquid storage tank 1 so that the users can refill the descaling liquid storage tank 1 with the solid descaling agent 9A. Preferably, the descaling agent storage box 200 may be screwed into or screwed out of the descaling liquid storage tank 1. The solid descaling agent 9A, e.g. solid crystalline salt, is housed in the descaling agent storage box 200. When the descaling apparatus connector 400 is connected to the electronic toilet bidet 5, clean water enters the descaling agent chamber 16A from the descaling apparatus connector input 420, the water rubber tube 8A, and the descaling liquid inlet 26 in turn. Then, the solid descaling agent 9A in the descaling agent storage box 200 is dissolved by the clean water to form a descaling solution. The descaling solution leaves the descaling agent chamber 16A from an internal output pipe 23 and then leaves from the descaling apparatus connector output 410.

The descaling apparatus according to the present disclosure may, according to an instruction, supply the descaling solution to the internal pipes of the electronic toilet bidet 5 for several times after the solid descaling agent 9A is added at one time and also automatically and continuously dissolved by the clean water. Thus, the descaling apparatus may avoid the lost function of the internal functional modules due to the clogging caused by the accumulation of limescales therein. The descaling apparatus may extend the service life of the modules and improve users' experience with the electronic toilet bidet 5.

In one embodiment, at least one connector sealing ring 430 is disposed on one end of the descaling apparatus connector output 410 and one end of the descaling apparatus connector input 420. The ends of the descaling apparatus connector output 410 and the descaling apparatus connector input 420 are configured to be plugged into or unplugged from an electronic toilet bide 5. The connector sealing ring 430 is configured to seal the connection between the descaling apparatus and the electronic toilet bide 5. As shown in FIG. 30 and FIG. 31, a descaling apparatus connector locker 440 is also disposed on each of these ends. Preferably, the descaling apparatus connector lockers 440 are flexible buckles configured to ensure a reliable connection or disconnection between the descaling apparatus and the electronic toilet bide 5.

As shown in FIG. 32 and FIG. 33, in one embodiment, at least one connector output protruding portion 411 is disposed on the end, configured to be plugged into or unplugged from an electronic toilet bide 5, of the descaling apparatus connector output 410. The connector output protruding portion 411 comprises a connector output groove 412 connected to and in communication with the descaling apparatus connector output 410. At least one connector input protruding portion 421 is disposed on the end, configured to be plugged into or unplugged from an electronic toilet bidet 5, of the descaling apparatus connector input 420. The connector input protruding portion 421 comprises a connector input groove 422 connected to and in communication with the descaling apparatus connector input 420. According to the embodiment, the connector output protruding portion 411 and the connector input protruding portion 421 are configured to open a passage to the electronic toilet bidet 5. The connector output groove 412 and the connector input groove 422 are respectively configured to output or input the liquid.

In one embodiment, a level sensor assembly is disposed on the descaling apparatus connector 400 and is communicably coupled to a controller of the electronic toilet bidet 5. The level sensor assembly is configured to detect information when the descaling apparatus connector 400 is plugged into the electronic toilet bidet 5.

As shown in FIG. 28 and FIG. 29, in one embodiment, the descaling liquid storage tank 1 further comprises a divider 2. The descaling liquid outlet 21 and the descaling liquid inlet 26 are disposed on the divider 2. The divider 2 divides the descaling liquid storage tank 1 into the descaling agent chamber 16A and a liquid discharging chamber 17.

As shown in FIG. 28, in one embodiment, a stream guiding groove 27 is disposed on the divider 2. The descaling agent storage box 200 is disposed in the stream guiding groove 27. The descaling liquid outlet 21 is disposed outside the stream guiding groove 27 and the descaling liquid inlet 26 is disposed outside the stream guiding groove 27.

According to the embodiment, the stream guiding groove 27 isolates the descaling liquid inlet 26 and the descaling liquid outlet 21. Thus, a flowing duration of the clean water entering the descaling agent chamber 16A may be increased so that the solid descaling agent 9A may sufficiently contact the clean water.

As shown in FIG. 28, in one embodiment, the descaling agent storage box 200 is disposed in the stream guiding groove 27. A first gap 28 is disposed between the stream guiding groove 27 and a wall of the descaling agent storage box 200 and in communication with the internal space of the descaling agent storage box 200. A second gap 29 is disposed between a bottom of the descaling agent storage box 200 and the divider 2 and in communication with the internal space of the descaling agent storage box 200.

The descaling liquid outlet 21 is in communication with the first gap 28 and the descaling liquid inlet 26 is in communication with the second gap 29. Alternatively, the descaling liquid outlet 21 is in communication with the second gap 29 and the descaling liquid inlet 26 is in communication with the first gap 28.

Specifically, the clean water enters the descaling liquid inlet 26. The descaling agent storage box 200 isolates the first gap 28 and the second gap 29. If the descaling liquid outlet 21 is in communication with the first gap 28 and the descaling liquid inlet 26 is in communication with the second gap 29, the clean water passing through the second gap 29 must also pass through the descaling agent storage box 200. The descaling solution obtained from the dissolved solid descaling agent 9A leaves from the first gap 28 and the descaling liquid outlet 21. If the descaling liquid outlet 21 is in communication with the second gap 29 and the descaling liquid inlet 26 is in communication with the first gap 28, the clean water enters descaling agent storage box 200 through the first gap 28. The descaling solution obtained from the dissolved solid descaling agent 9A leaves from the second gap 29 and the descaling liquid outlet 21.

As shown in FIG. 29, in one embodiment, the bottom of the descaling agent storage box 200 contacts a top of the stream guiding groove 27. According to the embodiment, the descaling agent storage box 200 is disposed on the stream guiding groove 27. The clean water entering the stream guiding groove 27 rises to enter the descaling agent storage box 200. In one embodiment, at least one stream guiding hole 271 is disposed on the top of the stream guiding groove 27. When the clean water entering the stream guiding groove 27 rises to the stream guiding hole 271, the clean water is spouted from the stream guiding hole 271 to form an upward water stream. The descaling solution leaves from the descaling agent storage box 200. The upward water stream and the descaling solution interact against each other to improve the flowing effect of the descaling solution.

FIG. 34 illustrates a structure of a descaling agent storage box of the descaling apparatus according to one embodiment of the present disclosure. FIG. 35 illustrates a state when a box upper lid of the descaling agent storage box is taken out according to one embodiment of the present disclosure. FIG. 53 illustrates a state when a box screen mesh of the descaling agent storage box is taken out according to one embodiment of the present disclosure.

As shown in FIG. 34, FIG. 35, and FIG. 53, in one embodiment, the descaling agent storage box 200 comprises a box frame 210, a box screen mesh 220, and a box upper lid 230. The box frame 210 comprises multiple through holes 250. The box screen mesh 220 is disposed in the box frame 210. The box upper lid 230 is disposed on the box frame 210 and configured to open and close the descaling agent storage box 200.

According to the embodiment, the box screen mesh 220 forms a wall of the descaling agent storage box 200. The box screen mesh 220 is fine enough to prevent the undissolved solid descaling agent 9A from entering the clean water. The box screen mesh 220 also allows the solid descaling agent 9A to be slowly dissolved by the clean water to form a saturated descaling solution between the descaling agent storage box 200 and a wall of the descaling liquid storage tank 1. The box upper lid 230 may cover or uncover the box frame 210 through a rotation of the box upper lid 230 or a buckle. The solid descaling agent 9A may be added to the box frame 210 after the box upper lid 230 is opened. For users' convenience and safety, the descaling agent storage box 200 with the added solid descaling agent 9A may be sold to the users as a standard accessory.

As shown in FIG. 26, the descaling liquid storage tank 1 further comprises a base 12, a shell 13 disposed on the base 12 and having an upward opening, and an outer lid 14 configured to open or close the opening of the shell 13. The descaling apparatus connector 400 is disposed on the shell 13. In one embodiment, the shell 13 may be transparent or translucent so that the user may read the liquid level. In one embodiment, the descaling apparatus further comprises a check valve 53. The descaling liquid outlet 21 is connected to and in communication with the descaling apparatus connector output 410 via the check valve 53. According to one embodiment, the check valve 53 is disposed behind the descaling liquid outlet 21 to prevent the descaling solution entering the electronic toilet bidet 5 from polluting the descaling agent chamber 16A.

As shown in FIG. 41 and FIG. 42, a descaling system of an electronic toilet bidet according to the present disclosure comprises an electronic toilet bidet 5 and the foregoing descaling apparatus. The electronic toilet bidet 5 comprises a bidet main body 510 and a bidet main body pipe housed in the bidet main body 510. The bidet main body 510 comprises a bidet connector 600 configured to be connected or disconnected to the descaling apparatus connector 400.

The bidet connector 600 comprises a connector main passage 610, a bidet connector output passage 620, and a bidet connector input passage 630. One end of the bidet connector main passage 610 is connected to and in communication with the external water supply system 10. The other end of the bidet connector main passage 610 is connected to and in communication with one end of the bidet main body pipe. The other end of the bidet main body pipe is connected to and in communication with a water output element.

When the descaling apparatus connector input 420 is plugged into the bidet connector output passage 620 and the descaling apparatus connector output 410 is plugged into the bidet connector input passage 630, the bidet connector main passage 610 is connected to and in communication with the bidet connector output passage 620 and the bidet connector input passage 630.

When the descaling apparatus connector input 420 is unplugged from the bidet connector output passage 620 and the descaling apparatus connector output 410 is unplugged from the bidet connector input passage 630, the bidet connector main passage 610 is disconnected to the bidet connector output passage 620 or the bidet connector input passage 630.

Specifically, the descaling apparatus may be plugged into or unplugged from the electronic toilet bidet 5. FIG. 44 illustrates a schematic diagram of the descaling system when the descaling function is closed. Dotted arrows indicate that the liquid does not flow through those elements connected by the dotted arrows. The clean water supplied by the external water supply system 10 enters one end of the bidet main body pipe through the bidet connector main passage 610. The clean water leaves from the other end of the bidet main body pipe and reaches a nozzle 58 through a flow meter 54, a direct heater 55, a vacuum breaker 56, and a distributor 57 to complete the flushing function. FIG. 45 illustrates a schematic diagram of the descaling system when the descaling function is opened according to the present disclosure. The clean water supplied by the external water supply system 10 enters one end of the bidet main body pipe through the bidet connector main passage 610. Because the descaling apparatus connector 400 is plugged into the bidet connector 6, a portion of the clean water enters the descaling liquid storage tank 1 through the bidet connector main passage 610, the bidet connector output passage 620, and the descaling apparatus connector input 420. The portion of the clean water dissolves the solid descaling agent 9A in the descaling agent storage box 200 to form the descaling solution. The descaling solution enters the bidet connector main passage 610 again through the descaling apparatus connector output 410 and the bidet connector input passage 630. The descaling solution is mixed with the other portion of the clean water and then the mixture enters one end of the bidet main body pipe and leaves from the other end of the bidet main body pipe. Then, the mixture reaches the nozzle 58 through the flow meter 54, the direct heater 55, the vacuum breaker 56, and the distributor 57 to complete the descaling function.

The descaling system according to the present disclosure may, according to an instruction, supply the descaling solution to the internal pipes of the electronic toilet bidet 5 for several times after the solid descaling agent 9A is added at one time and also automatically and continuously dissolved by the clean water. Thus, the descaling apparatus may avoid the lost function of the internal functional modules due to the clogging caused by the accumulation of limescales therein. The descaling apparatus may extend the service life of the modules and improve users' experience with the electronic toilet bidet 5.

FIG. 43 illustrates a structure of the bidet connector according to one embodiment of the present disclosure. FIG. 46 illustrates, in a sectioned view, a state when the descaling apparatus connector and the bidet connector are not connected according to one embodiment of the present disclosure. FIG. 47 illustrates, in an enlarged view, a state when the descaling apparatus connector and the bidet connector are not connected according to one embodiment of the present disclosure. FIG. 48 illustrates, in a sectioned view, a state when the descaling apparatus connector and the bidet connector are connected according to one embodiment of the present disclosure. FIG. 49 illustrates, in an enlarged view, a state when the descaling apparatus connector and the bidet connector are connected according to one embodiment of the present disclosure.

As shown in FIG. 43 and FIG. 46 to FIG. 49, in one embodiment, the bidet connector output passage 620 comprises a first check valve 640 configured to open or close the bidet connector main passage 610. The bidet connector input passage 630 comprises a second check valve 650 configured to open or close the bidet connector main passage 610.

When the descaling apparatus connector input 420 is plugged into the bidet connector output passage 620, the first check valve 640 is opened. When the descaling apparatus connector output 410 is plugged into the bidet connector input passage 630, the When the descaling apparatus connector input 420 is unplugged from the bidet connector output passage 620, the first check valve 640 is closed. When the descaling apparatus connector output 410 is unplugged from the bidet connector input passage 630, the second check valve 650 is closed.

According to the embodiment, the first check valve 640 and the second check valve 650 are configured to control a connection or disconnection between the bidet connector main passage 610 and the bidet connector output and input passages 620, 630.

In one embodiment, the first check valve 640 comprises a first check valve guiding pipe 641, a first check valve core 642, a first check valve spring 643, and a first check valve sealing ring 644. The first check valve core 642 is configured to move inwards and outwards in the first check valve guiding pipe 641. One end of the first check valve spring 643 is fixedly connected to the first check valve guiding pipe 641. The other end of the first check valve spring 643 securely engages the first check valve core 642. The first check valve sealing ring 644 is disposed on one end of the first check valve core 642. An output gap 621 is disposed between the end of the first check valve core 642 and an inner wall of the bidet connector output passage 620 and in communication with an internal space of the bidet connector main passage 610. A preload of the first check valve spring 643 is configured to push the first check valve sealing ring 644 to engage an end of the inner wall of the bidet connector output passage 620 so as to block the output gap 621.

In one embodiment, the second check valve 650 comprises a second check valve guiding pipe 651, a second check valve core 652, a second check valve spring 653, and a second check valve sealing ring 654. The second check valve core 652 is configured to move inwards and outwards in the second check valve guiding pipe 651. One end of the second check valve spring 653 is fixedly connected to the second check valve guiding pipe 651. The other end of the second check valve spring 653 securely engages the second check valve core 652. The second check valve sealing ring 654 is disposed on one end of the second check valve core 652. An input gap 631 is disposed between the end of the second check valve core 652 and an inner wall of the bidet connector inlet passage 630 and in communication with the internal space of the bidet connector main passage 610. A preload of the second check valve spring 653 is configured to push the second check valve sealing ring 654 to engage an end of the inner wall of the bidet connector input passage 630 so as to block the input gap 631.

Specifically, when the descaling apparatus connector input 420 is plugged into the bidet connector output passage 620, the first check valve core 642 is pushed inwards and drives the first check valve sealing ring 644 to move. Then, the output gap 621 is opened and the first check valve 640 is also opened. A main passage water stream $W_1$ is divided into a descaling agent water stream $W_2$. When the descaling apparatus connector input 420 is unplugged from the bidet connector output passage 620, the first check valve core 642 is pushed outwards by the first check valve spring 643 and drives the first check valve sealing ring 644 to move. Then, the first check valve sealing ring 644 securely engages the end of the inner wall of the bidet connector output passage 620 so as to block the output gap 621 and close the first check valve 640.

Specifically, when the descaling apparatus connector output 410 is plugged into the bidet connector input passage 630, the second check valve core 652 is pushed inwards and drives the second check valve sealing ring 654 to move. Then, the input gap 631 is opened and the second check valve 650 is also opened. The descaling agent water stream $W_2$ flows into the main passage water stream $W_1$ When the descaling apparatus connector output 410 is unplugged from the bidet connector input passage 630, the second check valve core 652 is pushed outwards by the second check valve spring 653 and drives the second check valve sealing ring 654 to move. Then, the second check valve sealing ring 654 securely engages the end of the inner wall of the bidet connector input passage 630 so as to block the input gap 631 and close the second check valve 650.

In one embodiment, the end of the inner wall of the bidet connector output passage 620 is conical. The end of the inner wall of the bidet connector input passage 630 is conical. The conical shape helps first check valve sealing ring 644 to securely engage the end of the inner wall of the bidet connector output passage 620. The conical shape also helps the second check valve sealing ring 654 to securely engage the end of the inner wall of the bidet connector input passage 630.

In one embodiment, a diameter $D_1$ of a main passage inlet 611 of the bidet connector main passage 610 is larger than a diameter $D_2$ of the descaling apparatus connector input 420. Thus, the total amount of the clean water is larger than the amount of the clean water entering the descaling apparatus. The mixing ratio of the descaling solution to the clean water may be adjusted by changing the diameter ratio of the descaling apparatus connector input 420 to the main passage inlet 611 of the bidet connector main passage 610.

As shown FIG. 30 and FIG. 31, in one embodiment, a descaling apparatus connector locker 440 is disposed on each of the ends, configured to be plugged into or unplugged from an electronic toilet bide 5, of the descaling apparatus connector 400. Each of the descaling apparatus connector locker 440 is matched with a bidet connector locker 660 disposed in the bidet connector 600. Preferably, the descaling apparatus connector lockers 440 are flexible buckles and the bidet connector lockers 660 are grooves. When the descaling apparatus connector 400 is plugged into the bidet connector 600, protruding points on the descaling apparatus connector lockers 440 securely engage the grooves of the bidet connector lockers 660. Thus, the descaling apparatus connector 400 is securely locked on the bidet connector 600. The disconnection, caused by an internal pressure, between the descaling apparatus and the electronic toilet bidet 5 may be avoided when the descaling function is being performed.

In one embodiment, the descaling system further comprises a water inlet electromagnetic valve 52 configured to control a connection or disconnection between the bidet connector main passage 610 and the external water supply system 10. According to the embodiment, the water inlet electromagnetic valve 52 is configured to control the total amount of the clean water. The bidet connector 600 may be, as an individual element, disposed behind the water inlet electromagnetic valve 52. Alternatively, the bidet connector 600 may be an integral part of the water inlet electromagnetic valve 52 according to the product's internal layouts. The bidet connector 600 may be installed on or removed from the water inlet electromagnetic valve 52 according to the product's functions.

As shown in FIG. 42, in one embodiment, the bidet main body 510 comprises a bidet chamber 520 configured to house the bidet connector 600. A bidet connector cover 511 is disposed outside the bidet chamber 520 and configured to open or close the bidet chamber 520.

In one embodiment, a plugging window is disposed on one side of the bidet main body 510 and used as the bidet chamber 520. The plugging window is configured to allow the descaling apparatus connector 400 to be plugged into the bidet connector 600. When the descaling function is closed, the plugging window is covered by the bidet connector cover 511. For a ceramic integral electronic toilet bidet, the bidet connector 600, configured to be connected to the descaling apparatus connector 400, may be disposed in an internal space of a ceramic base 512. The internal space is covered by the bidet connector cover 511.

In one embodiment, the electronic toilet bidet 5 further comprises a controller. The descaling apparatus connector 400 comprises a level sensor assembly communicably coupled to the controller. According to the embodiment, the level sensor assembly is configured to detect information when the descaling apparatus connector 400 is plugged into the bidet connector 600.

FIG. 52 is a flow chart illustrating a descaling method by using the foregoing descaling system of an electronic toilet bidet according to the present disclosure. The descaling method comprises:

In the step S3001, the controller predetermines parameters for a pre-processing procedure after the descaling apparatus connector 400 is connected to the bidet connector 600.

In the step S3002, in response to a descaling request, the controller performs the pre-processing procedure according to the predetermined parameters and when the pre-processing procedure is completed, the controller resets the parameters and performs a flushing procedure for at least one time until an exit condition is triggered.

In the pre-processing procedure, the controller controls the external water supply system 10 to supply the clean water to the bidet connector main passage 610 of the bidet connector 600 for a predetermined pre-processing time. After the predetermined pre-processing time lapses, the controller controls the external water supply system 10 to stop supplying the clean water to the bidet connector main passage 610 of the bidet connector 600 for a predetermined suspension time. After the predetermined suspension time lapses, the controller resets the parameters for the pre-processing procedure and performs a flushing procedure.

In the flushing procedure, the controller controls the external water supply system 10 to supply the clean water to the bidet connector main passage 610 of the bidet connector 600. Specifically, after the descaling apparatus connector 400 is plugged into the bidet connector 600, the pre-processing procedure is carried out. In the pre-processing procedure, the clean water is supplied to the descaling apparatus for a short period. Thus, the solid descaling agent 9A may be sufficiently dissolved by the clean water. Then, the controller performs the flushing procedure for multiple times until an exit condition is triggered. The exit condition may be the number of times, the time, the amount of descaling agent residuals, or the concentration of the descaling solution.

In one embodiment, the descaling apparatus connector 400 comprises a level sensor assembly communicably coupled to the controller. After the descaling apparatus connector 400 is connected to the bidet connector 6, the controller predetermines the parameters for the pre-processing procedure. Specifically, when the controller receives the liquid level information from the level sensor assembly, the controller predetermines the parameters. According to the embodiment, the controller performs the pre-processing procedure according to the liquid level information.

In one embodiment, a descaling apparatus of an electronic toilet bidet according to the present disclosure comprises a descaling liquid storage tank 1, a descaling agent storage box 200 configured to house solid descaling agent 9A, and a descaling apparatus connector 400 fixed on the descaling liquid storage tank 1. The descaling liquid storage tank 1 comprises a descaling agent chamber 16A. The descaling agent storage box 200 is disposed in the descaling agent chamber 16A. An internal space of the descaling agent storage box 200 is in communication with the descaling agent chamber 16A. The descaling agent chamber 16A comprises a descaling liquid inlet 26 and a descaling liquid outlet 21. The descaling apparatus connector 400 is configured to be plugged into or unplugged from an electronic toilet bidet 5. The descaling apparatus connector 400 comprises a descaling apparatus connector output 410 connected to and in communication with the descaling liquid outlet 21 and a descaling apparatus connector input 420 connected to and in communication with the descaling liquid inlet 26.

The descaling liquid storage tank 1 further comprises a base 12, a shell 13 disposed on the base 12 and having an upward opening, and an outer lid 14 configured to open or close the opening of the shell 13. The descaling apparatus connector 400 is disposed on the shell 13. The shell 13 may be transparent or translucent so that the user may read the liquid level.

The descaling agent storage box 200 disposed in the descaling agent chamber 16A houses the solid descaling agent 9A, e.g. solid crystalline salt. The descaling agent chamber 16A is an upper portion of the descaling liquid storage tank 1. The descaling apparatus connector 400 is disposed in the liquid discharging chamber 17. The liquid discharging chamber 17 is a lower portion of the descaling liquid storage tank 1. The descaling apparatus connector 400 is connected to a check valve 53 and a water rubber tube 8A.

The descaling agent storage box 200 is configured to be separated from or installed in the descaling liquid storage tank 1 so that the users can refill the descaling liquid storage tank 1 with the solid descaling agent 9A.

The descaling agent storage box 200 comprises a box frame 210 configured to house the solid descaling agent 9A, a box screen mesh 220 configured to prevent the undissolved solid descaling agent 9A from entering the clean water, and a box upper lid 230. The box frame 210 comprises multiple through holes 250. The box screen mesh 220 is disposed in the box frame 210. The box upper lid 230 is disposed on the box frame 210 and configured to open and close the descaling agent storage box 200.

The bidet main body 510 comprises a bidet connector 600 corresponding to the descaling apparatus connector 400. The bidet connector 600 is fixed on one side of the bidet main body 510 and disposed behind a water inlet electromagnetic valve 52. The bidet connector 600 has a structure similar to a three-way mixing valve. The bidet connector 600 comprises a connector main passage 610 configured to supply a mixture of the clean water and the descaling solution. The bidet connector 600 further comprises a bidet connector output passage 620 and a bidet connector input passage 630 respectively matched with the descaling apparatus connector input 420 and the descaling apparatus connector output 410. The bidet connector output passage 620 and the bidet connector input passage 630 respectively comprise a first check valve 640 and a second check valve 650. When the descaling apparatus is not plugged into the electronic toilet bidet 5, the bidet connector output passage 620 and the bidet connector input passage 630 are respectively by the first check valve 640 and the second check valve 650. Thus, the clean water is only supplied to the electronic toilet bidet via the connector main passage 610.

The bidet connector 600 may be, as an individual element, disposed behind the water inlet electromagnetic valve 52. Alternatively, the bidet connector 600 may be an integral part of the water inlet electromagnetic valve 52 according to the product's internal layouts. The bidet connector 600 may be installed on or removed from the water inlet electromagnetic valve 52 according to the product's functions.

A bidet connector cover 511 is disposed on one side of the bidet main body 510. A plugging window is disposed on the corresponding side of the bidet main body 510 and used as the bidet chamber 520. The plugging window is configured to allow the descaling apparatus connector 400 to be plugged into the bidet connector 600. When the descaling function is closed, the plugging window is covered by the bidet connector cover 511. For a ceramic integral electronic toilet bidet, the bidet connector 600, configured to be connected to the descaling apparatus connector 400, may be disposed in an internal space of a ceramic base 512. The internal space is covered by the bidet connector cover 511.

To remove the limescales, a user may need a descaling apparatus and screw the descaling agent storage box 200 counter-clockwise out of the descaling liquid storage tank 1. Then, the user may screw the box upper lid 230 counter-clockwise out of the descaling agent storage box 200. The user may add citrate solids, as the solid descaling agent 9A, to the descaling agent storage box 200. The user may screw the box upper lid 230 clockwise into the descaling agent storage box 200 and screw the descaling agent storage box 200 clockwise into the descaling liquid storage tank 1.

Before carrying out the pre-processing procedure, the user needs to plug the descaling apparatus connector 400 into the plugging window on the side of the bidet main body 510. Descaling apparatus connector lockers 440 securely engage bidet connector lockers 660 to ensure a reliable connection or disconnection between the descaling apparatus and the electronic toilet bide 5. The bidet connector output passage 620 and the bidet connector input passage 630 may be opened by respectively opening the first check valve 640 and the second check valve 650. Thus, the saturated descaling solution enters the bidet connector main passage 610.

Because the solid descaling agent 9A is stored in the descaling agent storage box 200, a pre-processing procedure may be carried out to form the saturated descaling solution. This is because when a user screws the descaling agent storage box 200 into the upper chamber of the descaling liquid storage tank 1, the air is sealed in the descaling liquid storage tank 1 or the descaling agent storage box 200. When the pre-processing procedure is carried out and the clean water enters into the descaling apparatus, the user may press the air exhaust rod 502 to release the air sealed in the descaling liquid storage tank 1 so that the clean water can be raised to an appropriate predetermined level. Thus, the descaling liquid storage tank 1 may have a maximum storage for housing the clean water so that the level of the clean water can be high enough to cover the solid descaling agent 9A in the descaling agent storage box 200 but lower than the air exhaust assembly 500. Because the shell 13 is transparent or translucent, the user may read the liquid level in the descaling liquid storage tank 1. When the level of the clean water reaches the predetermined level, the user may release the air exhaust rod 502 to seal the descaling liquid storage tank 1 again and stop the pre-processing procedure.

Because it takes time to form the saturated descaling solution by using the solid descaling agent 9A in the descaling agent storage box 200, a waiting time may be predetermined after the pre-processing procedure is completed. An indicator light be used to alert the user that the saturated descaling solution has not been formed. After waiting for the predetermined time, the user may carry out the descaling function and the indicator light returns to a normal state.

When the descaling function is opened, a large portion of the clean water enters the subsequent elements through the bidet connector main passage 610. Because the bidet connector output passage 620 and the bidet connector input passage 630 are opened, a small portion of the clean water enters the descaling liquid storage tank 1 through the bidet connector output passage 620, the descaling apparatus connector input 420, the water rubber tube 8A, and the descaling liquid inlet 26. The entered clean water first flows upwards and then downwards to squeeze out the saturated descaling solution. The squeezed-out saturated descaling solution enters the bidet connector main passage 610 again through the descaling liquid outlet 21, the internal output pipe 23, the check valve 53, the descaling apparatus connector output 410, and the bidet connector input passage 630. The squeezed-out saturated descaling solution is mixed with the large portion of the clean water and then the mixture enters the subsequent elements to complete the descaling function.

The mixing ratio of the descaling solution to the clean water may be adjusted by changing the diameter ratio of the descaling apparatus connector input 420 to the main passage inlet 611 of the bidet connector main passage 610, e.g. 1:10 or 1:5. Thus, the concentration of the decaling liquid may be adjusted so as to effectively remove the limescales.

When the descaling function is opened, the mixture may flow through the internal pipes of the electronic toilet bidet 5 and be spouted from the nozzle 58. When the mixture is filled with the internal pipes, the water inlet electromagnetic valve 52 may be closed to avoid wasting the saturated descaling solution. The mixture may remain in the internal pipes for a certain amount of time so that the mixture may have a sufficient chemical reaction with the limescales accumulated in the internal pipes. Because only small amount of the mixture is needed to remove the limescales, the foregoing procedures may be repeated for several times until the saturated descaling solution is diluted by the clean water to have a low concentration.

The internal space of the descaling liquid storage tank 1 and the size of the descaling agent storage box 200 may be increased if the installation chamber or the user's operation allows so. Thus, the storage for the saturated descaling solution in the descaling apparatus may be increased. When the descaling function is opened, a time for performing the descaling function may be calculated according to a predetermined mixing ratio of the saturated descaling solution to the clean water and a time for exhausting the saturated descaling solution. Thus, the mixture may be continuously spouted from the nozzle 58 through the internal pipes so as to remove the limescales accumulated in the internal pipes and release the removed limescales by the nozzle 58.

When the descaling procedure is completed, the water inlet electromagnetic valve 52 is opened again to supply new clean water. The new clean water may convey the removed limescales to be released by the nozzle 58. Also, the new clean water helps to dissolve the solid descaling agent residuals completely and clean the descaling liquid storage tank 1.

When the descaling procedure is completed, due to a vacuum effect, some clean water still may remain in the upper portion of the descaling liquid storage tank 1, i.e. the descaling agent chamber 16A. A user may press the air exhaust rod 502 disposed on the box upper lid 230 to open the air exhaust hole 260 so that the descaling agent chamber 16A may be in communication with the external atmosphere. In addition, because the descaling apparatus is usually fixed on the electronic toilet bidet 5 at a position higher than the internal pipes of the electronic toilet bidet 5, the clean water residuals will be released through the internal pipes under the effect of gravity. Thus, when the user uninstalls the descaling apparatus from the electronic toilet bidet 5, no great amount of the clean water residuals will be released from the descaling apparatus connector 400.

For a ceramic integral electronic toilet bidet, the descaling apparatus is usually fixed on the electronic toilet bidet 5 at a lower than the electronic toilet bidet 5. Thus, when the user presses the air exhaust rod 502 after the descaling procedure is completed, the clean water residuals will not be released from the nozzle 58. The user may use a container disposed below the descaling apparatus to avoid the leakage when uninstalling the descaling apparatus.

Finally, the user may unplug the descaling apparatus from the electronic toilet bidet 5 by pulling out the descaling apparatus and then cover the plugging window. Because the descaling apparatus is pulled out, the first check valve 640 and the second check valve 650 are closed by the first check valve spring 643 and the second check valve spring 653. Thus, the bidet connector output passage 620 and the bidet connector input passage 630 are respectively blocked by the first check valve 640 and the second check valve 650. Then, the user may begin the normal flushing procedure.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

I claim:

1. A descaling apparatus of an electronic toilet bidet, the descaling apparatus comprising:
- a descaling liquid storage tank, comprising a descaling agent chamber;
- a descaling agent storage box configured to house solid descaling agent and disposed in the descaling agent chamber; and
- a descaling apparatus connector disposed on the descaling liquid storage tank, the descaling apparatus connector comprising:
  - a first end in fluid communication with a descaling liquid inlet of the descaling agent chamber and a descaling liquid outlet of the descaling agent chamber; and
  - a second end configured to be connected or disconnected to the electronic toilet bidet.

2. The descaling apparatus according to claim 1, wherein an internal space of the descaling agent storage box is in fluid communication with the descaling agent chamber.

3. The descaling apparatus according to claim 1, further comprising:
- an air exhaust assembly disposed on the descaling agent storage box and configured to release air in the descaling liquid storage tank.

4. The descaling apparatus according to claim 3,
- wherein the descaling agent storage box comprises an air exhaust hole,
- wherein the air exhaust assembly comprises:
  - an air exhaust plate disposed in the descaling agent storage box;
  - an air exhaust rod comprising:
    - a first end connected to the air exhaust plate; and
    - a second end extending from the descaling agent storage box through the air exhaust hole; and
  - an air exhaust spring comprising:
    - a first end connected to the second end of the air exhaust rod; and
    - a second end engaged with the descaling agent storage box,
- wherein a diameter of the air exhaust hole is larger than a diameter of the air exhaust rod, and
- wherein the air exhaust plate is configured to cover the air exhaust hole.

5. The descaling apparatus according to claim 4, wherein the air exhaust assembly further comprises an air exhaust sealing ring disposed between an inner surface of the descaling agent storage box and the air exhaust plate.

6. The descaling apparatus according to claim 4,
- wherein the descaling agent storage box further comprises:
  - a box frame comprising a plurality of through holes;
  - a box screen mesh disposed in the box frame; and
  - a box upper lid disposed on the box frame and configured to open and close the descaling agent storage box, and
- wherein the air exhaust assembly is disposed on the box upper lid.

7. The descaling apparatus according to claim 6,
- wherein the box upper lid comprises an air exhaust chamber configured to house the air exhaust assembly, and
- wherein the air exhaust hole is disposed at a bottom of the air exhaust chamber.

8. The descaling apparatus according to claim 1, wherein the descaling liquid storage tank further comprises:

a base;

a shell disposed on the base and having an upward opening; and an outer lid configured to open or close the opening of the shell, and wherein the descaling apparatus connector is disposed on the shell.

9. The descaling apparatus according to claim 8, wherein the shell is transparent or translucent.

10. The descaling apparatus according to claim 1, further comprising a level sensor assembly disposed in the descaling agent storage box.

11. The descaling apparatus according to claim 1, wherein the descaling apparatus connector comprises:

a descaling apparatus connector output connected to and in fluid communication with the descaling liquid outlet of the descaling agent chamber; and a descaling apparatus connector input connected to and in fluid communication with the descaling liquid inlet of the descaling agent chamber.

12. The descaling apparatus according to claim 11, wherein the descaling apparatus connector output comprises an end configured to be connected or disconnected to the electronic toilet bidet, wherein the descaling apparatus connector input comprises an end configured to be connected or disconnected to the electronic toilet bidet, and wherein at least one connector sealing ring is disposed on the end of the descaling apparatus connector output or the end of the descaling apparatus connector input.

13. The descaling apparatus according to claim 11, wherein a descaling apparatus connector locker is disposed on the second end of the descaling apparatus connector.

14. The descaling apparatus according to claim 11, wherein the descaling apparatus connector output comprises an end configured to be connected or disconnected to the electronic toilet bidet, wherein the descaling apparatus connector input comprises an end configured to be connected or disconnected to the electronic toilet bidet, wherein at least one connector output protruding portion is disposed on the end of the descaling apparatus connector output, wherein the at least one connector output protruding portion comprises a connector output groove connected to and in fluid communication with the descaling apparatus connector output, wherein at least one connector input protruding portion is disposed on the end of the descaling apparatus connector input, and wherein the connector input protruding portion comprises a connector input groove connected to and in fluid communication with the descaling apparatus connector input.

15. The descaling apparatus according to claim 11, wherein a level sensor assembly is disposed on the descaling apparatus connector and is communicably coupled to a controller of the electronic toilet bidet.

16. The descaling apparatus according to claim 11, wherein the descaling liquid storage tank further comprises a divider, wherein the descaling liquid outlet and the descaling liquid inlet of the descaling agent chamber are disposed on the divider, and wherein the divider divides the descaling liquid storage tank into the descaling agent chamber and a liquid discharging chamber.

17. A descaling method by using a descaling apparatus of an electronic toilet bidet, the method comprising:

predetermining, by a controller of the electronic toilet bidet, parameters for a pre-processing procedure after a descaling apparatus connector of the descaling apparatus is connected to a bidet connector of the electronic toilet bidet; and in response to a descaling request, performing, by the controller of the electronic toilet bidet, the pre-processing procedure according to the predetermined parameters; and in response to the descaling request, when the pre-processing procedure is completed, resetting, by the controller of the electronic toilet bidet, the parameters for the pre-processing procedure and performing, by the controller of the electronic toilet bidet, a flushing procedure for at least one time until an exit condition is triggered.

18. The descaling method according to claim 17, wherein the pre-processing procedure comprises:

controlling, by the controller of the electronic toilet bidet, an external water supply system to supply clean water to a bidet connector main passage of the bidet connector for a predetermined pre-processing time;

controlling, by the controller of the electronic toilet bidet, the external water supply system to stop supplying the clean water to the bidet connector main passage of the bidet connector for a predetermined suspension time after the predetermined pre-processing time lapses; and resetting, by the controller of the electronic toilet bidet, the parameters for the pre-processing procedure and performing, by the controller of the electronic toilet bidet, the flushing procedure after an air exhaust assembly of the descaling apparatus releases air in a descaling liquid storage tank of the descaling apparatus to an outside of the descaling liquid storage tank.

19. The descaling method according to claim 18, further comprising:

receiving, by the controller of the electronic toilet bidet, liquid level information from a level sensor assembly communicably coupled to the controller of the electronic toilet bidet; and resetting, by the controller of the electronic toilet bidet, the parameters for the pre-processing procedure and performing, by the controller of the electronic toilet bidet, the flushing procedure when the controller of the electronic toilet bidet receives, from the level sensor assembly, the liquid level information indicating that a liquid level reaches a predetermined level, the controller.

20. The descaling method according to claim 17, wherein the flushing procedure comprises controlling an external water supply system to supply clean water to a bidet connector main passage of the bidet connector.

* * * * *